(12) United States Patent
Chen

(10) Patent No.: US 7,538,770 B2
(45) Date of Patent: May 26, 2009

(54) TREE-BASED COMPOSITING SYSTEM

(75) Inventor: Yu-Ling Chen, Epping (AU)

(73) Assignee: Canon Kabushiki Kaisha, Tokyo (JP)

( * ) Notice: Subject to any disclaimer, the term of this patent is extended or adjusted under 35 U.S.C. 154(b) by 524 days.

(21) Appl. No.: 10/995,302

(22) Filed: Nov. 24, 2004

(65) Prior Publication Data

US 2005/0122337 A1 Jun. 9, 2005

(30) Foreign Application Priority Data

Nov. 28, 2003 (AU) .............................. 2003906614

(51) Int. Cl.
    *G06T 15/00* (2006.01)
(52) U.S. Cl. .................. 345/440; 345/421; 345/598; 345/629; 382/240; 700/11; 700/21; 707/102
(58) Field of Classification Search ................ 345/440, 345/421, 598, 620, 629, 619; 700/11, 13, 700/21; 707/100–102; 382/240
See application file for complete search history.

(56) References Cited

U.S. PATENT DOCUMENTS

| 5,745,121 | A | * | 4/1998 | Politis .......................... 345/619 |
| 5,970,496 | A | * | 10/1999 | Katzenberger ............... 707/102 |
| 6,483,519 | B1 | | 11/2002 | Long et al. .................... 345/619 |
| 6,816,619 | B2 | | 11/2004 | Tlaskal et al. ................ 382/240 |
| 6,828,985 | B1 | | 12/2004 | Long et al. .................... 345/620 |
| 6,961,067 | B2 | * | 11/2005 | Moore .......................... 345/589 |
| 2002/0015039 | A1 | | 2/2002 | Moore .......................... 345/421 |
| 2004/0189656 | A1 | | 9/2004 | Moore .......................... 345/589 |

FOREIGN PATENT DOCUMENTS

| AU | 200119716 B2 | 8/2001 |
| AU | 200127985 A1 | 10/2001 |

OTHER PUBLICATIONS

Thomas Porter and Tom Duff, "Compositing Digital Images," Computer Graphics Project, Lucasfilm, Ltd. (vol. 18, No. 3, Jul. 1984), pp. 253-259.

\* cited by examiner

*Primary Examiner*—Phu K Nguyen
(74) *Attorney, Agent, or Firm*—Fitzpatrick, Cella, Harper & Scinto

(57) ABSTRACT

A method of rendering a graphical image described by an expression tree is disclosed. The expression tree has one or more parent nodes and one or more leaf nodes, with each parent node representing a graphical operator and having branches to respective descendent nodes. Each of the leaf nodes represents a graphic object. The method determines regions of one or more pixel locations in an output space of the image, with each region corresponding to a combination in the image of one or more of the graphical objects. Next, for each of the regions, an activity state of corresponding parent nodes is determined using a predefined function for each corresponding operator. The method then generates, in parallel, for each active one of the operators, compositing instructions and pixel generation instructions. The compositing instructions are stored in an operator queue and pixel colors are generated using the pixel generation instructions, with the pixel colors being buffered in an operand queue. Lastly, the generated pixel colors are composited, for each pixel in the region, using the operators defined in the operator queue, to output a composited pixel value for each pixel in the region.

32 Claims, 54 Drawing Sheets

| Edge 84 | Edge 92 |
|---|---|
| X=100 | X=40 |
| NY = 70 | NY =70 |
| DX = 1 | DX = 0 |
| DDX = 0 | DDX = 0 |
| P = 1 | P = 0 |
| u = (-1) | u = (+1) |
| Addr = Irrelevant in this example | Addr = Irrelevant in this example |

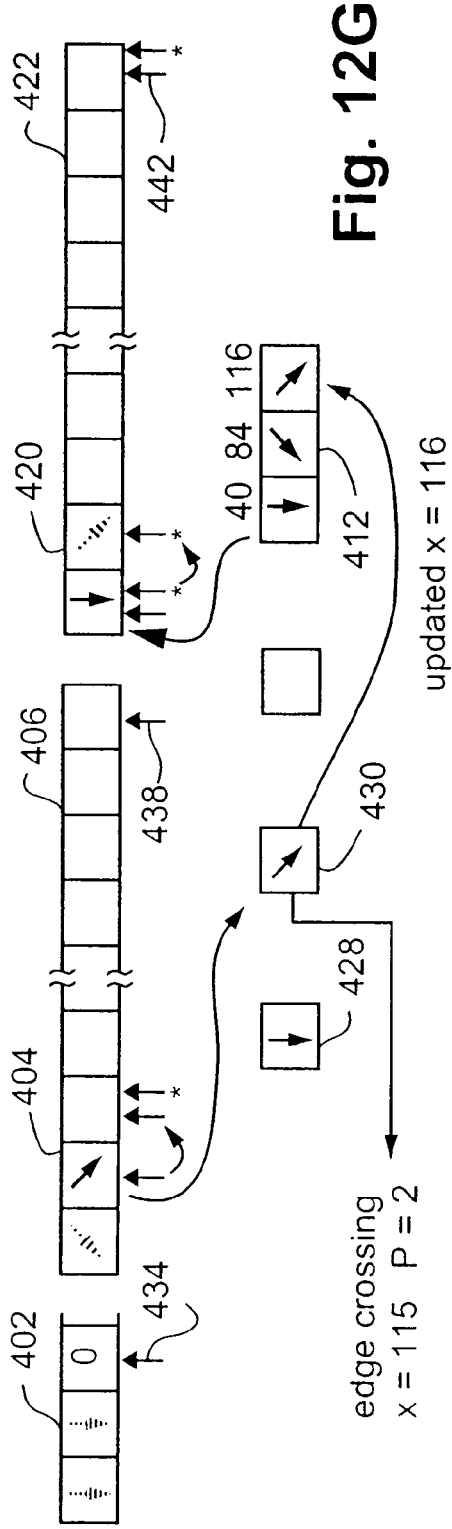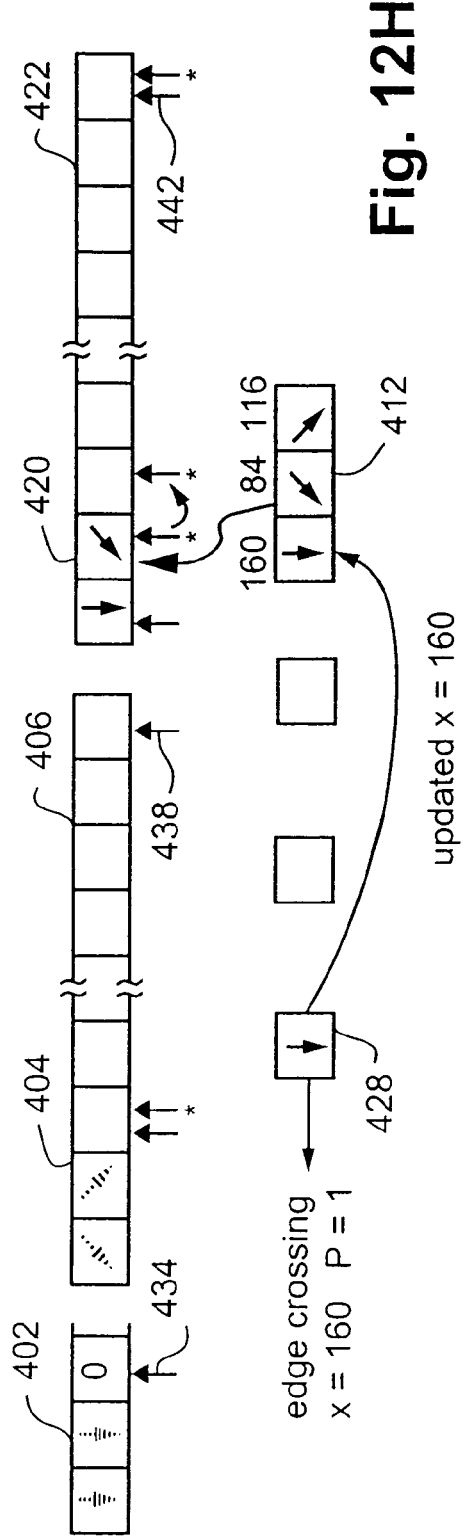

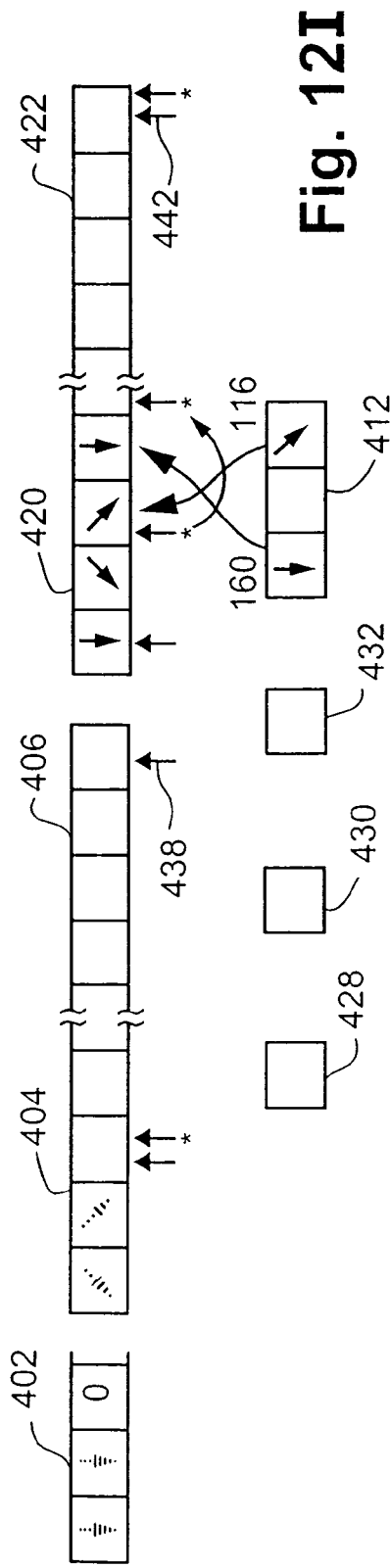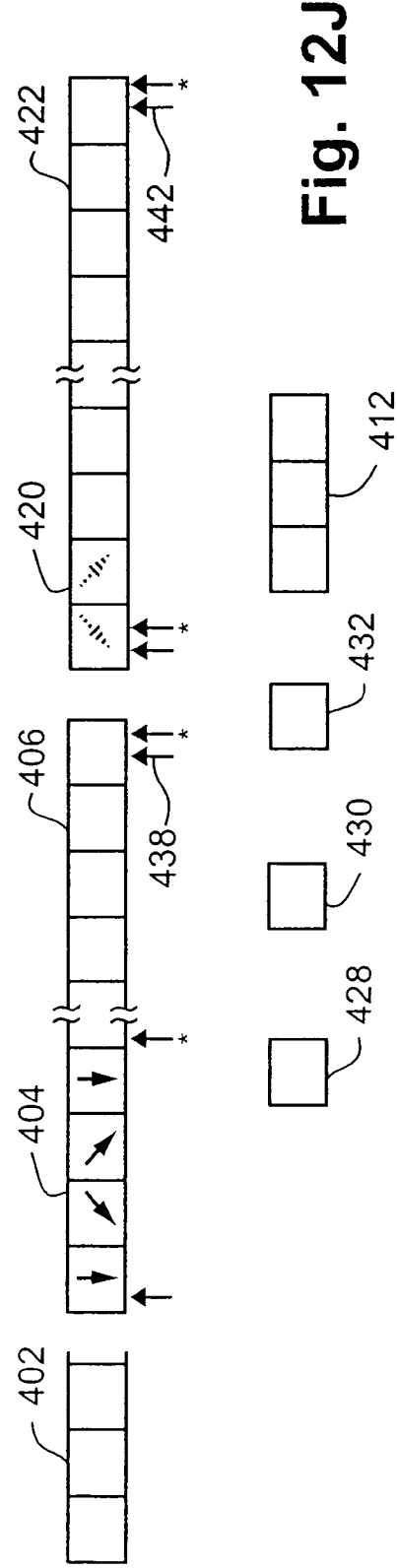

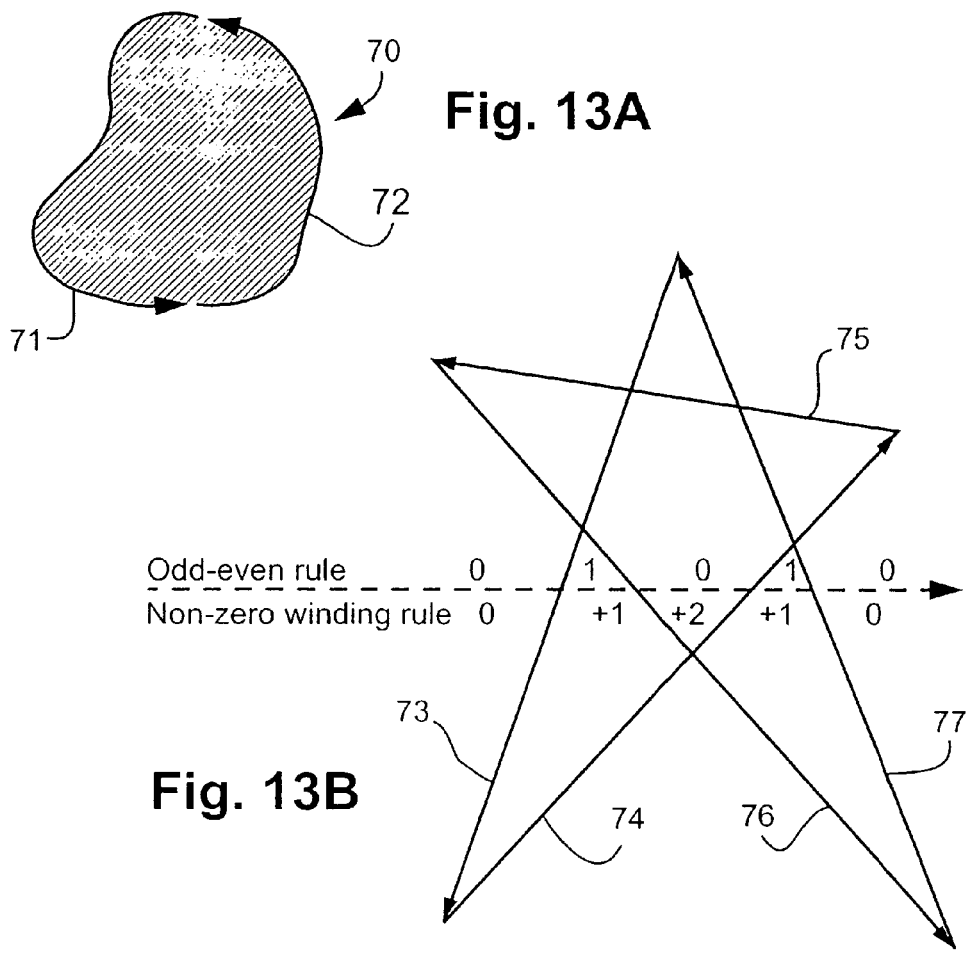
Fig. 13A
Fig. 13B
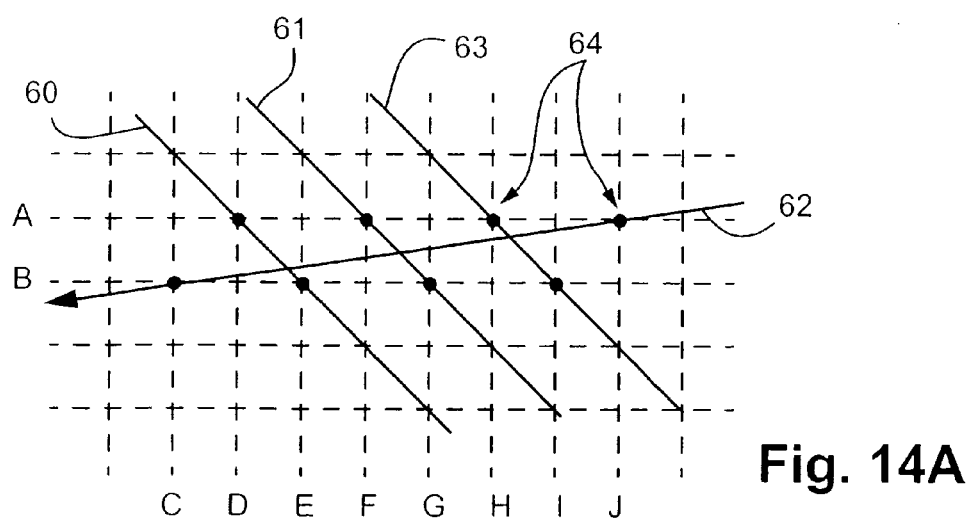
Fig. 14A

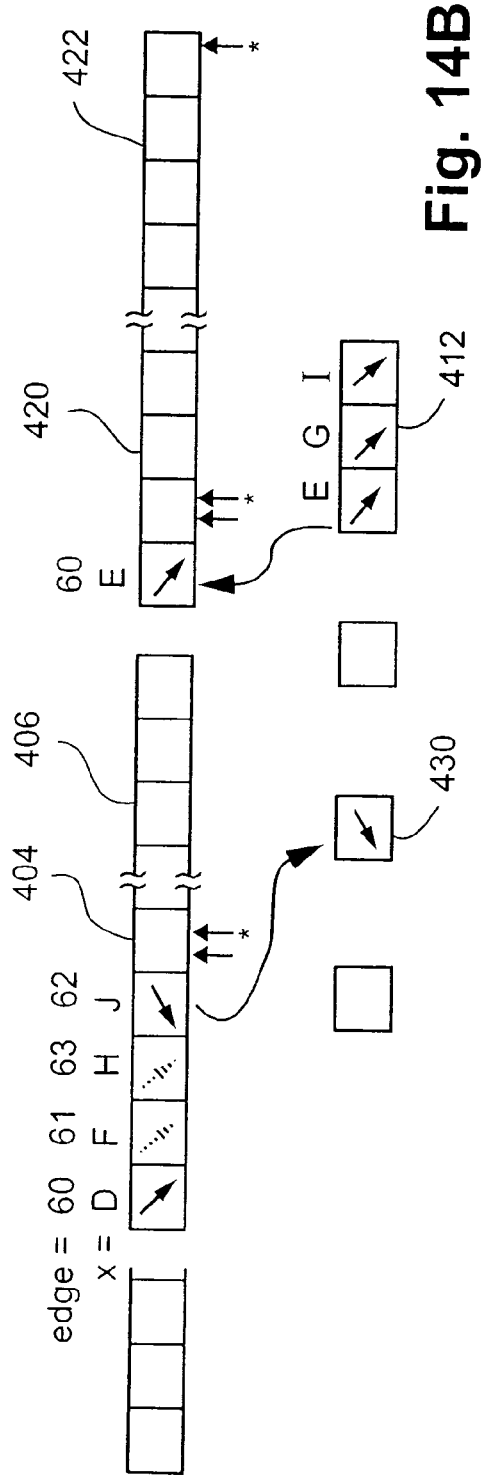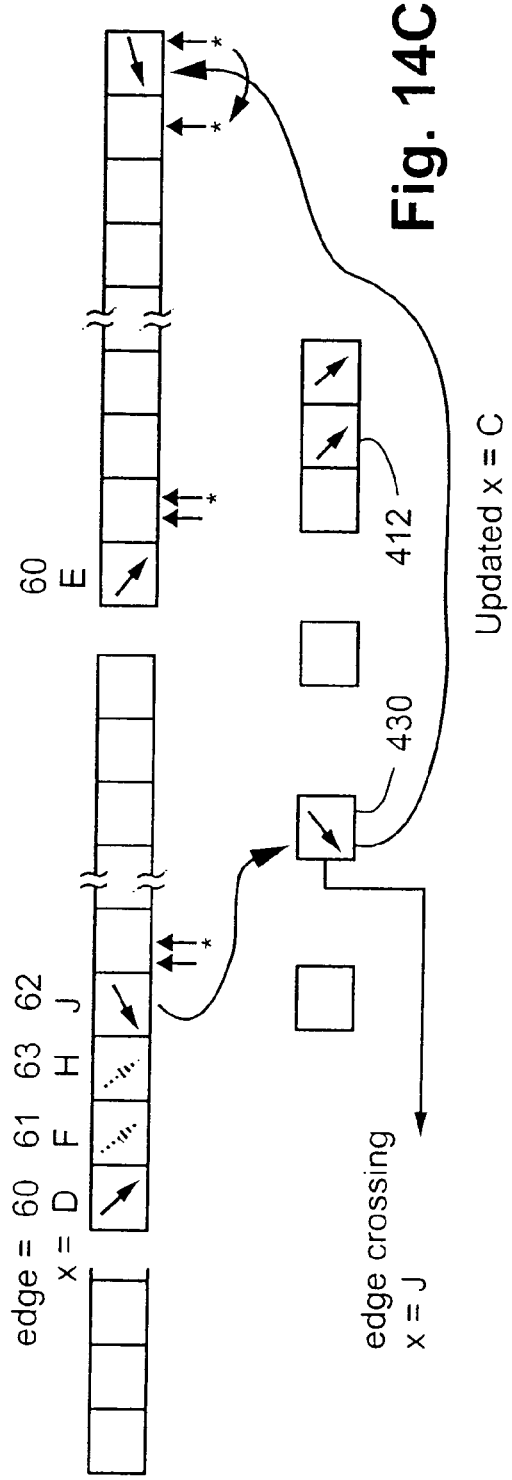

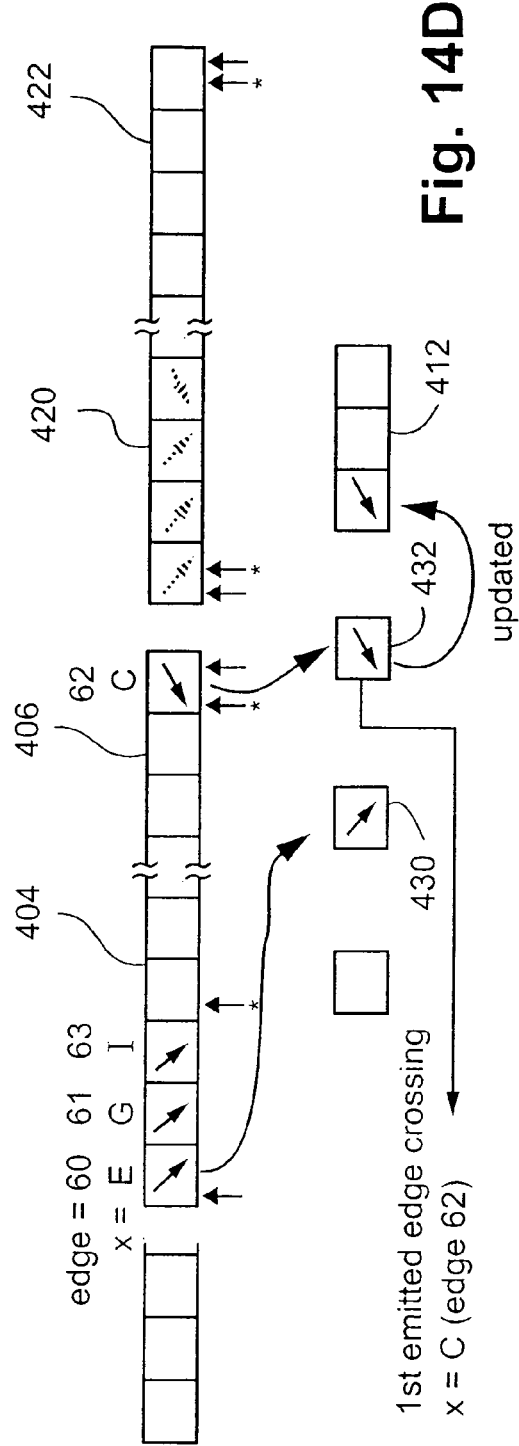

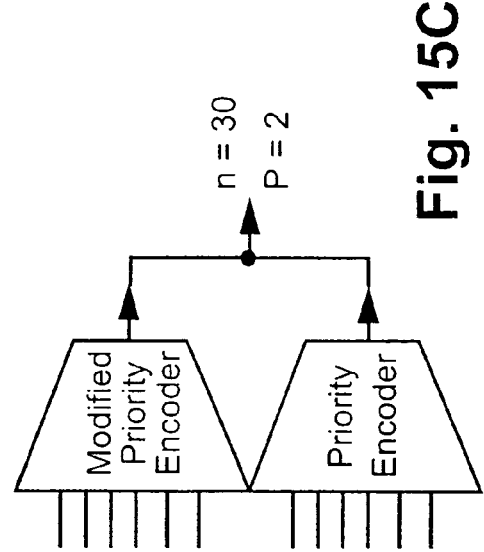
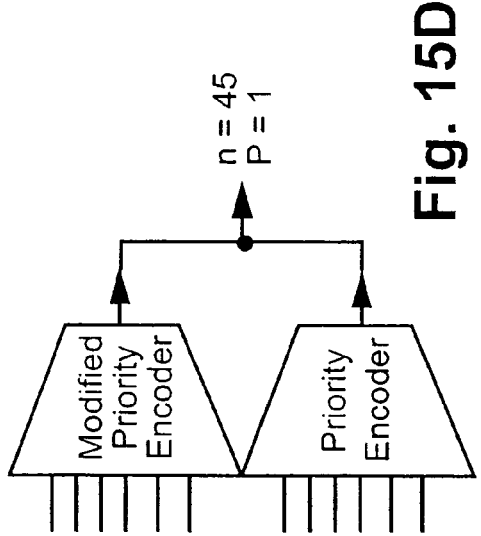
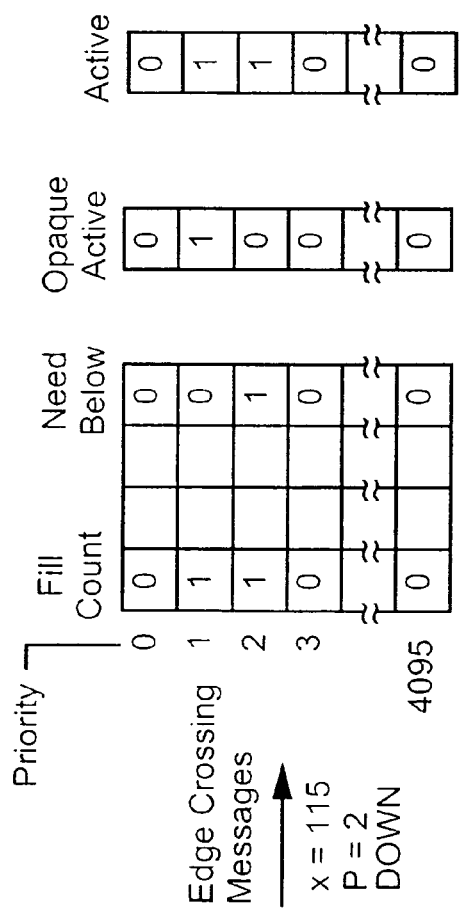
Fig. 15C
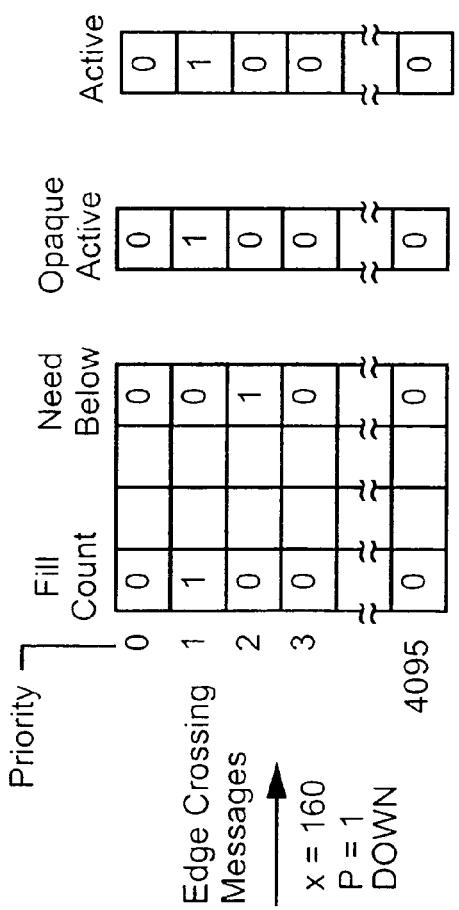
Fig. 15D

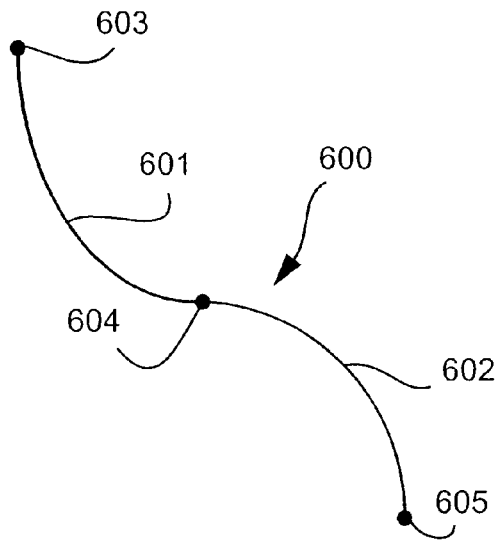
Fig. 16A
(Prior Art)
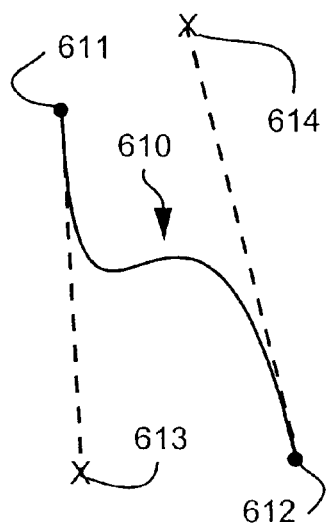
Fig. 16B
(Prior Art)
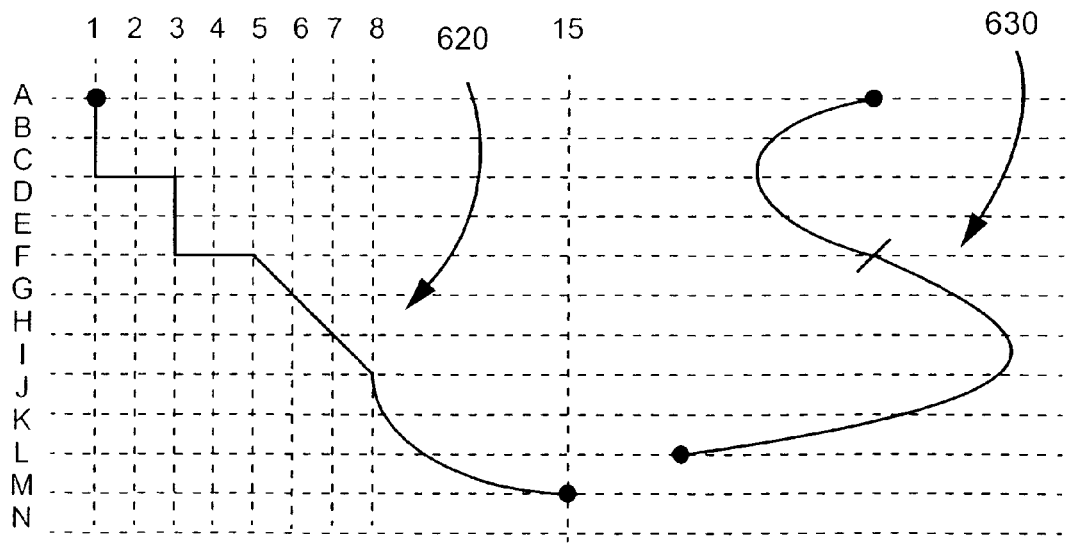
Fig. 16C          Fig. 16D

| FILL COUNT | CLIP COUNT | FILL TYPE | CLIPPER | CLISP_OUT | NEED_BELOW | X_INDEPENDENT | STACK_OP | USE_D_OUT_S | USE_S_OUT_D | USE_S_ROP_D | COLOR_OP | FILL_RULE_IS_ODD_EVEN | ATTRIBUTES | FILL INDEX |
|---|---|---|---|---|---|---|---|---|---|---|---|---|---|---|
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |

| Raster operation code | Operation | Operation Name |
|---|---|---|
| 0x00 | r = 0 | LCO_BLACK |
| 0x01 | r = src & dest | LCO_MASKPEN |
| 0x02 | r = src & ~dest | LCO_MASKPENNOT |
| 0x03 | r = src | LCO_COPYPEN |
| 0x04 | r = ~src & dest | LCO_MASKNOTPEN |
| 0x05 | r = dest | LCO_NOP |
| 0x06 | r = src ^ dest | LCO_XORPEN |
| 0x07 | r = src \| dest | LCO_MERGEPEN |
| 0x08 | r = ~(src \| dest) | LCO_NOTMERGEPEN |
| 0x09 | r = ~(src ^ dest) | LCO_NOTXORPEN |
| 0x0a | r = ~dest | LCO_NOT |
| 0x0b | r = src \| ~dest | LCO_MERGEPENNOT |
| 0x0c | r = ~src | LCO_NOTCOPYPEN |
| 0x0d | r = ~src \| dest | LCO_MERGENOTPEN |
| 0x0e | r = ~(src & dest) | LCO_NOTMASKPEN |
| 0x0f | r = 0xff | LCO_WHITE |
| 0x10 | r = min(src, dest) | LCO_MIN |
| 0x11 | r = max(src, dest) | LCO_MAX |
| 0x12 | r = clamp(src + dest) | LCO_PLUS |
| 0x13 | r = src | LCO_COPYPEN_PREMULTIPLIED |
| 0x14 | r = clamp(src - dest) | LCO_SRC_MINUS_DEST |
| 0x15 | r = dest | LCO_NOP_PREMULTIPLIED |
| 0x16 | r = clamp(dest - src) | LCO_DEST_MINUS_SRC |
| 0x17 | r = clamp(src + dest) where dest is signed | LCO_PLUS_SIGNED_DEST |
| 0x18 | r = threshold(dest, src) | LCO_THRESH_DEST_SRC |
| 0x19 | r = threshold(src, dest) | LCO_THRESH_SRC_DEST |
| 0x1a | r = ~dest | LCO_NOT_DATTR |
| 0x1b | o = luminance(dest; src) | LCO_LUMINANCE |
| 0x1c | r = ~src | LCO_NOTCOPYPEN_SATTR |
| 0x1d | o = ckey(dest; src+/-o) | LCO_CKEY |

Fig. 20A

| Operator | COLOR_OP | ALPHA_OP Flags Set | Diagram |
|---|---|---|---|
| clear | not used | none | 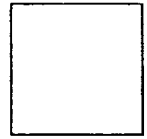 |
| src | LCO_COPYPEN | LAO_USE_S_ROP_D<br>LAO_USE_S_OUT_D | 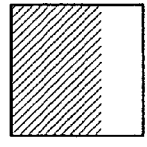 |
| dest | LCO_NOP | LAO_USE_S_ROP_D<br>LAO_USE_D_OUT_S | 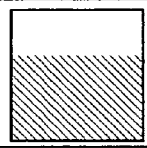 |
| src over dest | LCO_COPYPEN | LAO_USE_S_ROP_D<br>LAO_USE_S_OUT_D<br>LAO_USE_D_OUT_S | 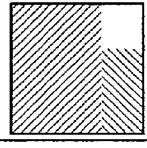 |
| src rover dest<br>(dest over src) | LCO_NOP | LAO_USE_S_ROP_D<br>LAO_USE_S_OUT_D<br>LAO_USE_D_OUT_S | 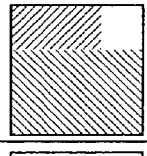 |
| src in dest | LCO_COPYPEN | LAO_USE_S_ROP_D | 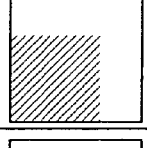 |
| src rin dest<br>(dest in src) | LCO_NOP | LAO_USE_S_ROP_D | 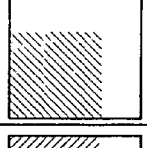 |
| src out dest | not used | LAO_USE_S_OUT_D | 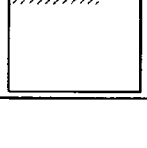 |

Fig. 20B
| Operator | COLOR_OP | ALPHA_OP Flags Set | Diagram |
|---|---|---|---|
| src rout dest (dest out src) | not used | LAO_USE_D_OUT_S |  |
| src atop dest | LCO_COPYPEN | LAO_USE_S_ROP_D LAO_USE_D_OUT_S |  |
| src ratop dest (dest atop src) | LCO_NOP | LAO_USE_S_ROP_D LAO_USE_S_OUT_D | 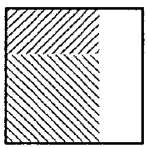 |
| src xor dest | not used | LAO_USE_S_OUT_D LAO_USE_D_OUT_S | 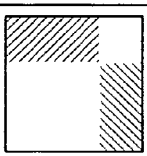 |

| fill | op |
|---|---|
| A | OUT_STACK_STD_OP |
| B | PUSH STACK_STD_OP |

| fill | op | |
|---|---|---|
| - | OUT STACK_POP_SRC | ← Clip in by $A \cap B$ |
| A | PUSH STACK_STD_OP | |
| B | PUSH STACK_STD_OP | ← Clip in by A |

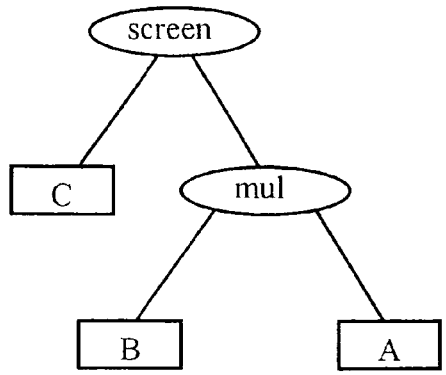
Fig. 26A
(Prior Art)
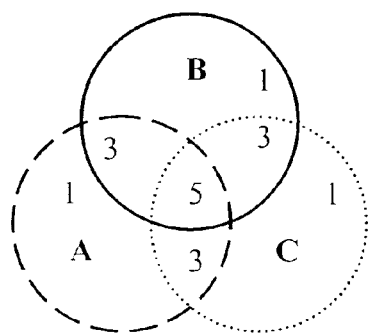
Fig. 26B
(Prior Art)
| fill | op | |
|---|---|---|
| - | SCREEN STACK_POP_SRC | ← Clip in by $C \cap (A \cup B)$ |
| C | PUSH STACK_STD_OP | |
| - | MUL STACK_POP_SRC | ← Clip in by $A \cap B$ |
| B | PUSH STACK_STD_OP | |
| A | PUSH STACK_STD_OP | |
Fig. 26C
(Prior Art)

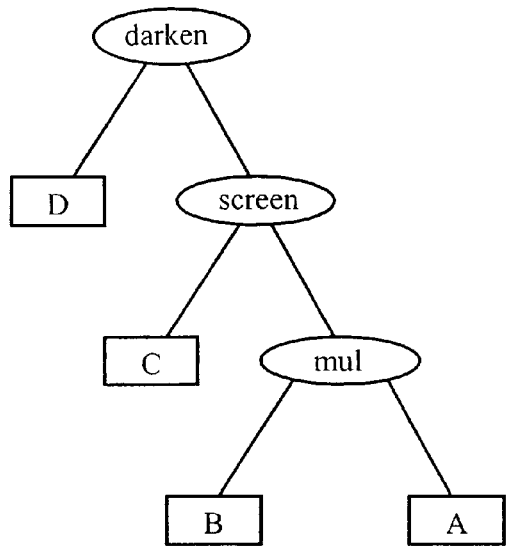
Fig. 27A
(Prior Art)
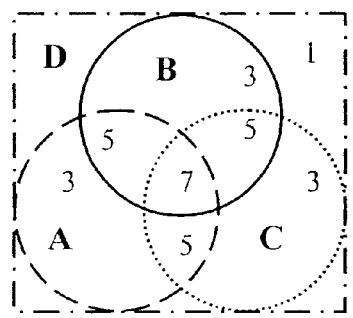
Fig. 27B
(Prior Art)
| fill | op | |
|---|---|---|
| - | DARKEN STACK_POP_SRC | ← Clip in by $D \cap (A \cup B \cup C)$ |
| D | PUSH STACK_STD_OP | |
| - | SCREEN STACK_POP_SRC | ← Clip in by $C \cap (A \cup B)$ |
| C | PUSH STACK_STD_OP | |
| - | MUL STACK_POP_SRC | ← Clip in by $A \cap B$ |
| B | PUSH STACK_STD_OP | |
| A | PUSH STACK_STD_OP | |
Fig. 27C
(Prior Art)

Scanline direction

Pass 1 — · · —  ·
Pass 2 ·············
Pass 3 — — — ·
Pass 4 — · — · —

TREE-BASED COMPOSITING SYSTEM

CROSS-REFERENCE TO RELATED PATENT APPLICATION

This application claims the right of priority under 35 U.S.C. § 119 based on Australian Patent Application No. 2003906614, filed 28 Nov. 2003, which is incorporated by reference herein in its entirety as if fully set forth herein.

FIELD OF THE INVENTION

The present invention relates generally to rendering graphic object based images. In particular, the present invention relates to a method and apparatus for generating instructions for a directed acyclic graph, commonly known as an expression tree. The invention also relates to a method and apparatus for rendering an expression tree into a raster pixel image. The invention also relates to a computer readable medium comprising a computer program for implementing any of the aforesaid methods.

BACKGROUND

When a computer application provides data to a device for printing and/or display, an intermediate description of the page is often given to the device driver software in a page description language, such as PostScript or PCL, which provide descriptions of the objects to be rendered onto the page, rather than a raster image to be printed Equivalently, a set of descriptions of graphics objects may be provided in function calls to a graphics interface, such as the Microsoft Windows™ GDI (Microsoft Corporation), or UNIX™ XII (The Open Group). The page is typically rendered for printing and/or display by an object-based graphics system (or Raster Image Processor).

Most of these object based graphics systems utilize a large area of memory, known to the art as a frame store or a page buffer, to hold a pixel-based image of the page or screen for subsequent printing and/or display. Typically, the outlines of the graphic objects are calculated, filled and written into the frame store. For two-dimensional graphics, objects that appear in front of other objects are simply written into the frame store after the background objects, thereby replacing the background on a pixel by pixel basis. This is commonly known to the art as "Painter's algorithm". Objects are considered in priority order, from the rearmost object to the foremost object. This priority order is sometime called a z-level or layer, indicative of a stack of objects. Typically, each object is rasterized in scan line order and pixels are written to the frame store in sequential runs along each scan line. Some graphics interfaces allow a logical or arithmetic operation to be specified, to be performed between one or more graphics objects and the already rendered pixels in the frame buffer. In these cases the principle remains the same: objects (or groups of objects) are rasterized in scan line order, and the result of the specified operation is calculated and written to the frame store in sequential runs along each scan line.

There are essentially two problems with this technique. The first is that it requires fast random access to all of the pixels in the frame store. This is because each new object could affect any pixel in the frame store. For this reason, the frame store is normally kept in semiconductor random access memory (RAM). For high-resolution color printers the amount of RAM required is very large, typically in excess of 100 Mbytes, which is costly and difficult to run at high speed.

The second problem is that many pixels, which are painted (rendered), are over-painted (re-rendered) by later objects. Painting these pixels with the earlier objects is a waste of time.

One method for overcoming the large frame-store problem is the use of "banding". When banding is used, only part of the fame store exists in memory at any one time. All of the objects to be drawn are retained in a "display list", which is an internal representation of the information required to draw the objects on the page. The display list is considered in object order as above, and only those pixel operations which fall within the fraction of the page which is held in the band are actually performed. After all objects in the display list have been drawn, the band is sent to the printer (or to intermediate storage) and the process is repeated for the next band of the page. There are some penalties with this technique, however. For example, the objects being drawn must be reconsidered many times, once for each band. As the number of bands increases, so does the repetitious examination of the objects requiring rendering. Also, the technique of banding does not solve the problem of the cost of over-painting.

Some other graphic systems consider the image in scan line order. Again, all of the objects on the page are retained in a display list. On each scan line the objects which intersect that scan line are then considered in priority order and for each object, spans of pixels between the intersection points of the object edges with the scan line are filled in a line store. This technique overcomes the large frame store problem, however it still suffers from the over-painting problem.

Other graphic systems utilise pixel-sequential rendering to overcome both the large frame store problem and the overpainting problem. In these systems, each pixel is generated in raster order. Again, all objects to be drawn are retained in a display list. On each scan line, the edges of objects, which intersect that scan line, are held in increasing order of their intersection with the scan line. These points of intersection, or edge crossings, are considered in turn, and used to toggle an array of fields that indicate the activity of the objects in the display list. There is one activity field for each object painting operation that is of interest on the scan line. There is also a field to indicate operations that do not require previously generated data. Between each pair of edges considered, the color data for each pixel, which lies between the first edge and the second edge, is generated by using a priority encoder on the activity flags to determine which operations are required to generate the color, and performing only those operations for the span of pixels between the two edges. In preparation for the next scan line, the coordinate of intersection of each edge is updated in accordance with the nature of each edge, and the edges are sorted into increasing order of intersection with that scan line. Any new edges are also merged into the list of edges.

Graphic systems which use pixel-sequential rendering have significant advantages in that there is no frame store or line store, no unnecessary over-painting, and the object priorities are dealt with in constant order time by the priority encoder, rather than in order N time, where N is the number of priorities.

Australian Patent No. 743218, corresponding in disclosure to U.S. patent application Ser. No. 09/392,741, describes a pixel sequential rendering apparatus and notes that expression trees are often used to describe compositing operations that include variable transparency in the intersection region. Further, that document notes that one difficulty encountered with implementation is that, in many cases, rendering apparatus do not deal adequately with compositing of objects comprising pixels having associated opacity values. A solution proposed therein is to combine leaf and operator instructions into one unified instruction (ie. a level instruction), which contains both leaf and operator instructions in a single command. For a binary operation, this would only require 2 levels. The first level defines the right leaf object with a push operation (COPYPEN with STACK_STD_OP) and the second level defines the left leaf object with the operation to be applied on these 2 objects. The combined left leaf and operator allow the operand to be read and operated on the same clock cycle. This feature works well when both right and left leaves are active. However it complicates the expression tree when the left and right leaves are not the same shape because the simple expression tree will only be correct in the intersecting region.

An example of this is seen FIGS. 25A-25C for the compositing of two different objects. For the expression tree of FIG. 25A, when the objects A and B have the same shape and overlap, a compositing stack representation shown in FIG. 25B is very simple. When however, A and B have different shapes but still overlap, the resulting compositing stack as seen in FIG. 25C, is more complicated.

In this case, it is necessary to use clippings to force the compositing operation to be applied on the correct regions. This is typically achieved by separating the operator into another level and applying a clip to the operator. As the number of levels in the intersecting region becomes 3, the compositing of FIG. 25C will then take 3 clock cycles instead of 2 clock cycles in FIG. 25B.

The clippings can be direct edge clippings if the leaf object itself is a simple closed curve or rectangle. If the object is not a simple closed curve or a rectangle, it is necessary to sacrifice a level just for the clipping operation. This can become very complicated when a number of objects are composited together and the objects are not all active at the same time because they have different shapes. The operation on the top layer will need to be clipped by all objects under it in the priority order. Where the number of active priority levels becomes large, the clippings can become too complicated to manage.

FIGS. 26A-26C show an example of compositing 3 objects which produces four distinct and different areas of overlap. FIG. 26A shows the expression tree, FIG. 26C the corresponding compositing stack and FIG. 26B the resulting rendered image. FIGS. 27A-27C show corresponding representations for an example of compositing 4 objects with different overlapping shapes. The number inside each region in each of FIG. 26B and FIG. 27B indicates the number of clock cycles required to composite the corresponding region. In the region where all objects overlap, the number of clock cycles spent on compositing is seen to be almost double the number of objects.

Australian Patent Publication No. AU-A-35163/01, corresponding to U.S. patent application Ser. No. 09/836,226, describes a method for generating instructions for a directed acyclic graph (ie. an expression tree) comprising one or more parent nodes and one or more leaf nodes. That method generates operator instructions on the parent nodes and leaf instructions on the leaf nodes according to the activity state of that node. The generated instructions are passed through a number of processing stages in sequential order down to a fill generation stage which uses the leaf instructions to generate fill colors for leaf nodes. A sequentially following compositing stage then uses the leaf instructions to push the generated color to a compositing stack. The operator instructions pass through the fill generation stage and then are used by the compositing stage to perform operations defined by the parent nodes.

This method can generate the required instructions for those active nodes in groups of one or more pixel locations without the use of complicated clippings. However when all the objects are the same shape and overlap entirely, this method is less efficient than that described in the aforementioned Australian Patent No. 743218 because the number of clock cycles required for compositing is significantly more. Consider the expression tree in FIG. 28A, which is for the region A∩B∩C∩D of FIG. 28B. A truly optimised number of clock cycles is 4: ie. push A to stack, mul(B, stack), screen(C, stack) and darken(D, stack). The number of clock cycles required by the method of Australian Patent Publication No. AU-A-35163/01 is 7—each node needs a clock cycle.

The above methods have the common inefficiency in sending the redundant operator instructions to the fill generation stage and redundant leaf instructions to the compositing stage. A leaf instruction is only required to push the generated color to the compositing stack.

SUMMARY OF THE INVENTION

It is an object of the present invention to substantially overcome, or at least ameliorate, one or more deficiencies of prior art arrangements.

In accordance with one aspect of the present invention there is disclosed a method of rendering a graphical image described by an expression tree, said expression tree comprising one or more parent nodes and one or more leaf nodes, each said parent node representing a graphical operator and having branches to respective descendent nodes, and each said leaf node representing a graphic object, said method comprising the steps of:

(a) determining regions of one or more pixel locations in an output space of said image, each said region corresponding to a combination in said image of one or more said graphical objects;

(b) determining, for each said region, an activity state of corresponding parent nodes using a predefined function for each corresponding said operator;

(c) generating in parallel, for each active one of said operators, compositing instructions and pixel generation instructions;

(d) storing the compositing instructions in an operator queue and generating pixel colors using the pixel generation instructions, said pixel colors being buffered in an operand queue; and (e) compositing the generated pixel colors, for each pixel in said region, using the operators defined in the operator queue to output a composited pixel value for each pixel in said region.

An activity state of said leaf nodes may be stored in an operand table and an activity state of said parent nodes may be stored in an operator table. The instructions are typically generated during rasterized rendering of said image and the operand table is updated when a scan line crosses into a region of said leaf objects. A change of activity state in the operand table desirably updates a corresponding child activity state in the operator table and said predefined function is called to determine if the corresponding operator is activated.

In one implementation, the compositing of step (e) may be performed using stack operations and generation of said compositing instructions in step (c) comprises the steps of (ca) outputting the number of pixels in said region;

(cb) outputting, for each active operator, an operator with a L and R operand definition;

(cc) determining the state of the R operand using the state of R active and R_is_leaf in the operator table and assigning:

(i) inactive to the R operand state if Ractive is not set;
(ii) stack to the R operand state if R_is_leaf is not set; or otherwise
(iii) a queue to the R operand state; and
(cd) determining the state of L operand using the state of Lactive and L_is_leaf in the operator table and assigning:
(i) inactive to the L operand state if Lactive is not set;
(ii) stack to the L operand state if L_is_leaf is not set; or otherwise
(iii) a queue to the L operand state.

The compositing of step (e) may be performed using stack operations and generation of said pixel generation instructions in step (c) comprises the steps of
(ce) outputting the number of pixels in said region;
(cf) dispatching, for each active operator, the active R operand to a queue with a fill index and fill type; and
(cg) dispatching, for each active operator, the active L operand to a queue with a fill index and fill type.

Step (e) may comprise transcoding said operators and corresponding alpha flags depending on the activity state of the corresponding operand using a preloaded look-up table. Step (d) may comprise continuously generating pixels of each said fill type required for said region after receiving the pixel generation instructions. Step (a) may comprise collapsing said expression tree to reduce complexity when at least one of the leaf nodes represents a graphic object that is not active. An operator with two flat-colored operands may be removed and a corresponding new leaf object is inserted into said expression tree. Step (e) may comprise noting operators associated with a rendering of a previous rendered pixel and for an immediately following pixel in said region advancing compositing on along said expression tree to the 1$^{st}$ operator in the operator queue, which has at least one operand value that is different when compared with the same operator in the previous rendered pixel.

In accordance with another aspect of the present invention there is disclosed a method of generating instructions for rendering a graphical image described by an expression tree, said expression tree comprising one or more parent nodes and one or more leaf nodes, each said parent node representing a graphical operator and having branches to respective descendent nodes, and each said leaf node representing a graphic object, said method comprising the steps of:

providing a first look-up table including a plurality of said graphical operators each associated with two parameters L∩R and L∩R, and a second look-up table including a plurality of said graphical operators each associated with three alpha flags, L_ROP_R, L_OUT_R and R_OUT_L, related to a transparency component of said operator; and for each region of said image, being a combination of one or more said graphical objects:
(a) determining an activity state of the corresponding operator using the two parameters defined in said first look-up table and a predefined function; and
(b) transcoding said operators and generating simplified op-code and three alpha flags using said second look-up table depending on the activity state of said operators.

In accordance with another aspect of the present invention there is disclosed a method of rendering a graphical image described by an expression tree, said expression tree comprising one or more parent nodes and one or more leaf nodes, each said parent node representing a graphical operator and having branches to respective descendent nodes, and each said leaf node representing a graphic object, said method comprising the steps of:

(a) determining regions of one or more pixel locations in an output space of said image, each said region corresponding to a combination in said image of one or more said graphical objects;
(b) determining, for each said region, an activity state of corresponding parent nodes using a predefined function for each corresponding said operator;
(c) generating, for each active one of said operators, pixel generation instructions; and
(d) continuously generating pixels of each fill type required for said region after receiving the pixel generation instructions.

In accordance with another aspect of the present invention there is disclosed a method of rendering a graphical image described by an expression tree, said expression tree comprising one or more parent nodes and one or more leaf nodes, each said parent node representing a graphical operator and having branches to respective descendent nodes, and each said leaf node representing a graphic object, said method comprising the steps of:

(a) determining regions of one or more pixel locations in an output space of said image, each said region corresponding to a combination in said image of one or more said graphical objects, said determining comprising, when at least one of the leaf nodes represents a graphic object that is not active, collapsing said expression tree to reduce complexity;
(b) determining, for each said region, an activity state of corresponding parent nodes using a predefined function for each corresponding said operator;
(c) generating, for each said operator, compositing instructions and pixel generation instructions;
(d) storing the compositing instructions and generating pixel colors using the pixel generation instructions; and
(e) compositing the generated pixel colors, for each pixel in a region, using the compositing instructions to output a composited pixel value for each pixel in said region.

In accordance with another aspect of the present invention there is disclosed a method of rendering a graphical image described by an expression tree, said expression tree comprising one or more parent nodes and one or more leaf nodes, each said parent node representing a graphical operator and having branches to respective descendent nodes, and each said leaf node representing a graphic object, said method comprising the steps of:

(a) determining regions of one or more pixel locations in an output space of said image, each said region corresponding to a combination in said image of one or more said graphical objects, said determining comprising, removing from said expression tree an operator with two flat-colored operands and substituting therefore a corresponding new leaf object;
(b) determining, for each said region, an activity state of corresponding parent nodes using a predefined function for each corresponding said operator;
(c) generating, for each said operator, compositing instructions and pixel generation instructions;
(d) storing the compositing instructions and generating pixel colors using the pixel generation instructions; and
(e) compositing the generated pixel colors, for each pixel in a region, using the compositing instructions to output a composited pixel value for each pixel in said region.

In accordance with another aspect of the present invention there is disclosed a method of rendering a graphical image described by an expression tree, said expression tree comprising one or more parent nodes and one or more leaf nodes, each said parent node representing a graphical operator and having branches to respective descendent nodes, and each said leaf node representing a graphic object, said method comprising the steps of:

(a) determining regions of one or more pixel locations in an output space of said image, each said region corresponding to a combination in said image of one or more said graphical objects;

(b) determining, for each said region, an activity state of corresponding parent nodes using a predefined function for each corresponding said operator;

(c) generating, for each said operator, compositing instructions and pixel generation instructions;

(d) storing the compositing instructions and generating pixel colors using the pixel generation instructions; and (e) compositing the generated pixel colors, for each pixel in a region, using the compositing instructions to output a composited pixel value for each pixel in said region, said compositing comprising noting operators associated with a rendering of a previous rendered pixel and for an immediately following pixel in said region advancing compositing on along said expression tree to the $1^{st}$ operator in the operator queue, which has at least one operand value that is different when compared with the same operator in the previous rendered pixel.

Other aspects of the present invention, including apparatus and computer readable media, are also disclosed.

Arrangements according to the invention can render an expression tree consisting of different shaped graphic objects, and having differing overlap, without the need for complicated clippings on the intersecting areas, and without redundant instructions being sent to the fill generation stage or the compositing stage. Preferably, there are 2 groups of instructions generated in parallel. One group of instructions are fill instructions, which are used to generate fill color for each leaf graphic object. The other group of instructions are compositing instructions for the active operators in the expression tree.

BRIEF DESCRIPTION OF THE DRAWINGS

One or more embodiments of the present invention and aspects of the prior art will now be described with reference to the drawings, in which:

FIGS. 12B to 12J illustrate the edge update routine implemented by the arrangement of FIG. 4 for the example of FIG. 8A;

FIGS. 13A and 13B illustrate the odd-even and non-zero winding fill rules;

FIGS. 14A to 14E illustrate how large changes in X coordinates contribute to spill conditions and bow they are handled;

FIGS. 15A to 15E illustrate the priority filling routine implemented by the arrangement of FIG. 5;

FIGS. 16A to 16D provide a comparison between two prior art edge description formats and that used in the presently described apparatus;

FIG. 18 depicts the level activation table used in a preferred implementation of the Priority Determination Module of FIG. 3;

FIG. 19 shows a table of a number of raster operations;

FIGS. 20A and 20B show a table of the principal compositing operations and their corresponding raster operations and opacity flags;

FIGS. 26A-26C show compositing 3 objects with different shapes;

FIG. 27A-27C show compositing 4 objects with different shapes;

BRIEF DESCRIPTION OF THE TABLES

Figure 1:
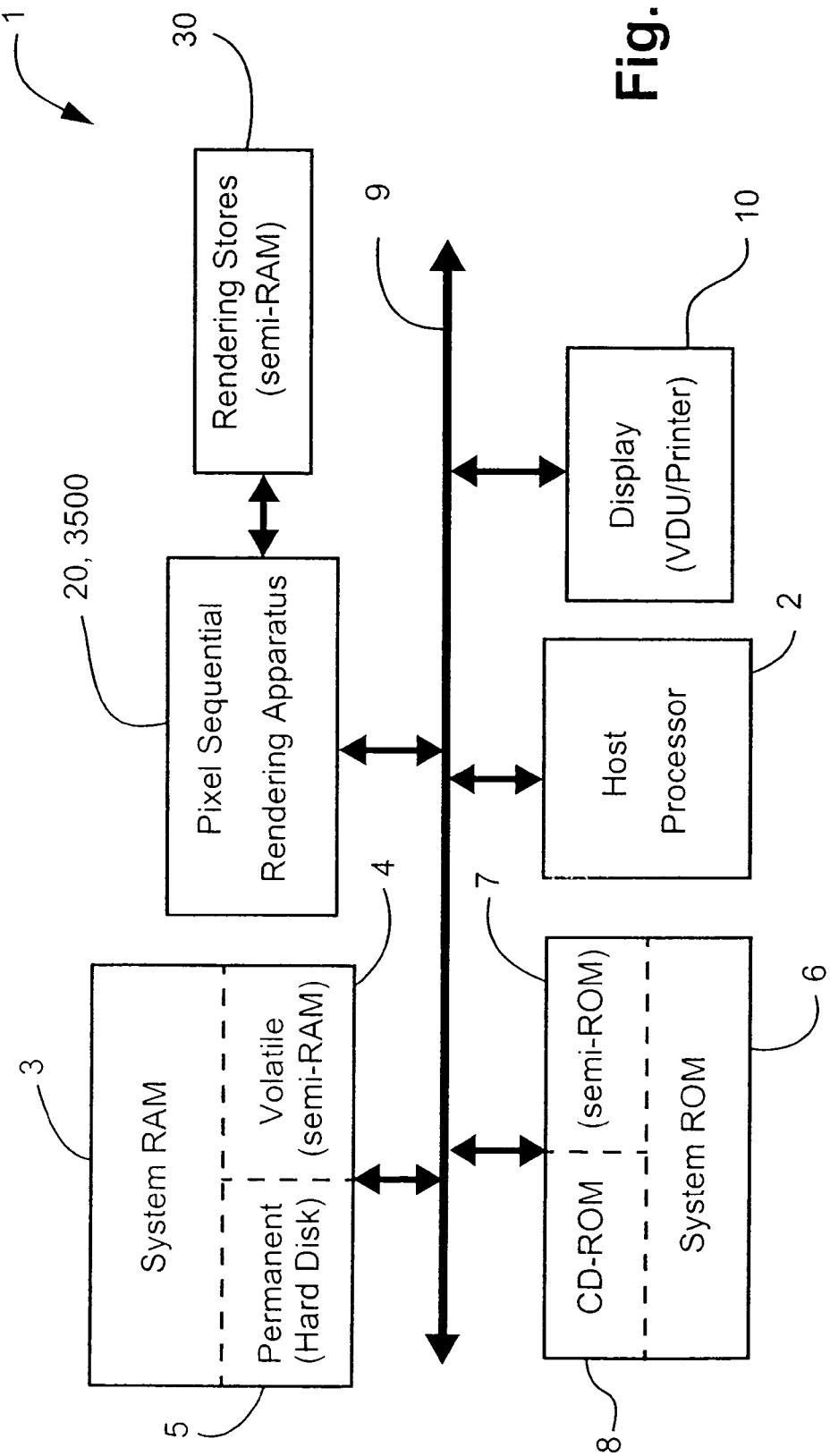
FIG. 1 is a schematic block diagram representation of a computer system incorporating a rendering arrangement.

The description also makes reference to the following tables, which appear at the conclusion of the description and before the claims:

Table 1—Operator activation groups;
Table 2—Compositing Primitives;
Table 3—Operator activation look-up-table;
Table 4—Alpha flags and trans-coded op code look-up-table for compositing;
Table 5—Operator Table cache—initial state of Example 1;
Table 6—Operand Table cache—initial state of Example 1;
Table 7.1—Operand Table after LOAD_OPERAND command;
Table 7.2—Operator Table after LOAD_OPERATOR command;
Table 8.1—Operand Table when all leaves are active;
Table 8.2—Operator Table when all 3 operators are active;
Table 9.1—Initial operator queue in region 1;
Table 9.2—Optimised operator queue in region 1;
Table 10.1—Initial operator queue in region 2;
Table 10.2—Optimised operator queue in region 2;
Table 11.1—Initial operator queue in region 3;
Table 11.2—Optimised operator queue in region 3;
Table 12—Initial operator queue for FIG. 42; and
Table 13—Updated operator queue after compositing the $1^{st}$ pixel.

DETAILED DESCRIPTION INCLUDING BEST MODE

Where reference is made in any one or more of the accompanying drawings to steps and/or features, which have the same reference numerals, those steps and/or features have for the purposes of this description the same function(s) or operation(s), unless the contrary intention appears.

For a better understanding of a pixel sequential rendering system 1, a brief overview of the system 1 is first undertaken in Section 1.0. Then follows a brief discussion in Section 2.0 of the driver software for interfacing between a third party software application and the pixel sequential rendering apparatus 20, 3500 of the system 1. An overview of a prior art pixel sequential rendering apparatus 20 is then discussed in Section 3.0. The salient features of the present disclosure including a pixel sequential rendering apparatus 3500 are described in Section 4.0 and build upon the arrangements described in Sections 1.0, 2.0 and 3.0. As will become apparent, the pixel sequential rendering apparatus 20 includes an instruction execution module 300; an edge tracking module 400; a Priority Determination Module 500; a Pixel Generation Module 600, sometimes called a fill color determination module; a Pixel Compositing Module 700; and a Pixel Output Module 800. A brief overview of these modules is described in Sections 3.1 to 3.6. Substantially corresponding modules adapted according to the present disclosure form the apparatus 3500 described in Section 4.

1.0 Pixel Sequential Rendering System

FIG. 1 illustrates schematically a computer system 1 configured for rendering and presentation of computer graphic object images. The system includes a host processor 2 associated with system random access memory (RAM) 3, which may include a non-volatile hard disk drive or similar device 5 and volatile, semiconductor RAM 4. The system 1 also includes a system read-only memory (ROM) 6 typically founded upon semiconductor ROM 7 and which in many cases may be supplemented by compact disk devices (CD ROM) 8. The system 1 may also incorporate some means 10 for displaying images, such as a video display unit (VDU) or a printer, both, which operate in raster fashion.

The above-described components of the system 1 are interconnected via a bus system 9 and are operable in a normal operating mode of computer systems well known in the art, such as IBM PC/AT type personal computers and arrangements evolved therefrom, Sun Sparcstations and the like.

Also seen in FIG. 1, a pixel sequential rendering apparatus 20, 3500 (or renderer) connects to the bus 9, and is configured for the sequential rendering of pixel-based images derived from graphic object-based descriptions supplied with instructions and data from the system 1 via the bus 9. The apparatus 20, 3500 may utilise the system RAM 3 for the rendering of object descriptions although preferably the rendering apparatus 20 may have associated therewith a dedicated rendering store arrangement 30, typically formed of semiconductor RAM.

Image rendering operates generally speaking in the following manner. A render job to be rendered is given to the driver software by third party software for supply to the pixel sequential renderer 20, 3500. The render job is typically in a page description language or in a sequence of function calls to a standard graphics application program interface (API), which defines an image comprising objects placed on a page from a rearmost object to a foremost object to be composited in a manner defined by the render job. The driver software converts the render job to an intermediate render job, which is then fed to the pixel sequential renderer 20, 3500. The pixel sequential renderer 20, 3500 generates the color and opacity for the pixels one at a time in raster scan order. At any pixel currently being scanned and processed, the pixel sequential renderer 20, 3500 composites only those exposed objects that are active at the currently scanned pixel. The pixel sequential renderer determines that an object is active at a currently scanned pixel if that pixel lies within the boundary of the object. The pixel sequential renderer 20, 3500 achieves this by reference to a fill counter associated with that object. The fill counter keeps a running fill count that indicates whether the pixel lies within the boundary of the object. When the pixel sequential renderer 20, 3500 encounters an edge associated with the object it increments or decrements the fill count depending upon the direction of the edge. The renderer 20, 3500 is then able to determine whether the current pixel is within the boundary of the object depending upon the fill count and a predetermined winding count rule. The renderer 20, 3500 determines whether an active object is exposed with reference to a flag associated with that object. This flag associated with an object indicates whether or not the object obscures lower order objects. That is, this flag indicates whether the object is partially transparent, and in which case the lower order active objects will thus make a contribution to the color and opacity of the current pixel. Otherwise, this flag indicates that the object is opaque in which case active lower order objects will not make any contribution to the color and opacity of the currently scanned pixel. The pixel sequential renderer 20, 3500 determines that an object is exposed if it is the uppermost active object, or if all the active objects above the object have their corresponding flags set to transparent. The renderer 20, 3500 then composites these exposed active objects to determine and output the color and opacity for the currently scanned pixel.

The driver software, in response to the page, also extracts edge information defining the edges of the objects for feeding to the edge tracking module. The driver software also generates a linearized table of priority properties and status information (herein also called a level activation table) of the expression tree of the objects and their compositing operations which is fed to a priority determination module. The level activation table contains one record for each object on the page. In addition, each record contains a field for storing a pointer to an address for the fill of the corresponding object in a fill table. This fill table is also generated by the driver software and contains the fill for the corresponding objects, and is fed to a pixel generation module (sometimes referred to as a fill color determination module). The level activation table together with the fill table are devoid of any edge information and effectively represent the objects, where the objects are infinitively extending. The edge information is fed to an edge tracking module, which determines, for each pixel in raster scan order, the edges of any objects that intersect a currently scanned pixel. The edge tracking module passes this information onto the priority determination module. Each record of the level activation table contains a counter, which maintains a fill count associated with the corresponding object of the record. The priority determination module processes each pixel in a taster scan order. Initially, the fill counts associated with all the objects are zero, and so all objects are inactive. The priority determination module continues processing each pixel until it encounters an edge intersecting that pixel. The priority determination module updates the fill count associated with the object of that edge, and so that object becomes active. The priority determination module continues operating in this fashion updating the fill count of the objects and so activating and de-activating the objects. The priority determination module 500 also determines whether these active objects are exposed or not, and consequently whether they make a contribution to the currently scanned pixel. In the event that they do, the pixel determination module generates a series of messages which ultimately instructs a pixel compositing module to composite the color and opacity for these exposed active objects in accordance with the compositing operations specified for these objects in the level activation table so as to generate the resultant color and opacity for the currently scanned pixel. These series of messages do not at that time actually contain the color and opacity for that object but rather an address to the fill table, which the fill determination module uses to determine the color and opacity of the object.

For ease of explanation the location (ie. priority level or z-order) of the object in the order of the objects from the rearmost object to the foremost is herein referred to as the object's priority. Preferably, a number of non-overlapping objects that have the same fill and compositing operation, and that form a contiguous sequence in the order of the objects, may be designated as having the same priority. Most often, only one priority level is required per object. However, some objects may require several instructions, and thus the object may require several priority levels. For example, a character with a color fill may be represented by, a bounding box (B) on a first level having the color fill, a one-bit bitmap (S) which provides the shape of the character on a second level, and the same bounding box (B) on a third level having the color fill, where the levels are composited together ((B xor Page) and S) xor B to produce the color character. For fundamental objects, there is a one-to-one relationship with priority levels.

The pixel sequential renderer 20, 3500 also utilizes clip objects to modify the shape of other objects. The renderer 20, 3500 maintains an associated clip count for the clip in a somewhat similar fashion to the fill count to determine whether the current pixel is within the clip region.

2.0 Software Driver

A software program, hereafter referred to as the driver, is loaded and executed on the host processor 2 for generating instructions and data for the pixel-sequential graphics rendering apparatus 20, 3500, from data provided to the driver by a third-party application The third-party application may provide data in the form of a standard language description of the objects to be drawn on the page, such as PostScript and PCL, or in the form of function calls to the driver through a standard software interface, such as the Windows GDI or X-11.

The driver software separates the data associated with an object, supplied by the third-party application, into data about the edges of the object, any operation or operations associated with painting the object onto the page, and the color and opacity with which to fill pixels which fall inside the edges of the object.

The driver software partitions the edges of each object into edges which are monotonic increasing in the Y-direction, and then divides each partitioned edge of the object into segments of a form suitable for the edge module described below. Partitioned edges are sorted by the X-value of their starting positions and then by Y. Groups of edges starting at the same Y-value remain sorted by X-value, and may be concatenated together to form a new edge list, suitable for reading in by the edge module when rendering reaches that Y-value.

The driver software sorts the operations, associated with painting objects, into priority order, and generates instructions to load the data structure associated with the priority determination module (described below). This structure includes a field for the fill rule, which describes the topology of how each object is activated by edges, a field for the type of fill which is associated with the object, being painted, and a field, to identify whether data on levels below the current object is required by the operation. There is also a field, herein called clip count, which identifies an object as a clipping object, that is, as an object which is not, itself, filled, but which enables or disables filling of other objects on the page.

The driver software also prepares a data structure (the fill table) describing how to fill objects. The fill table is indexed by the data structure in the priority determination module. This allows several levels in the priority determination module to refer to the same fill data structure.

The driver software assembles the aforementioned data into a job containing instructions for loading the data and rendering pixels, in a form that can be read by the rendering system, and transfers the assembled job to the rendering system. This may be performed using one of several methods known to the art, depending on the configuration of the rendering system and its memory.

3.0 Pixel Sequential Rendering Apparatus

Figure 2:
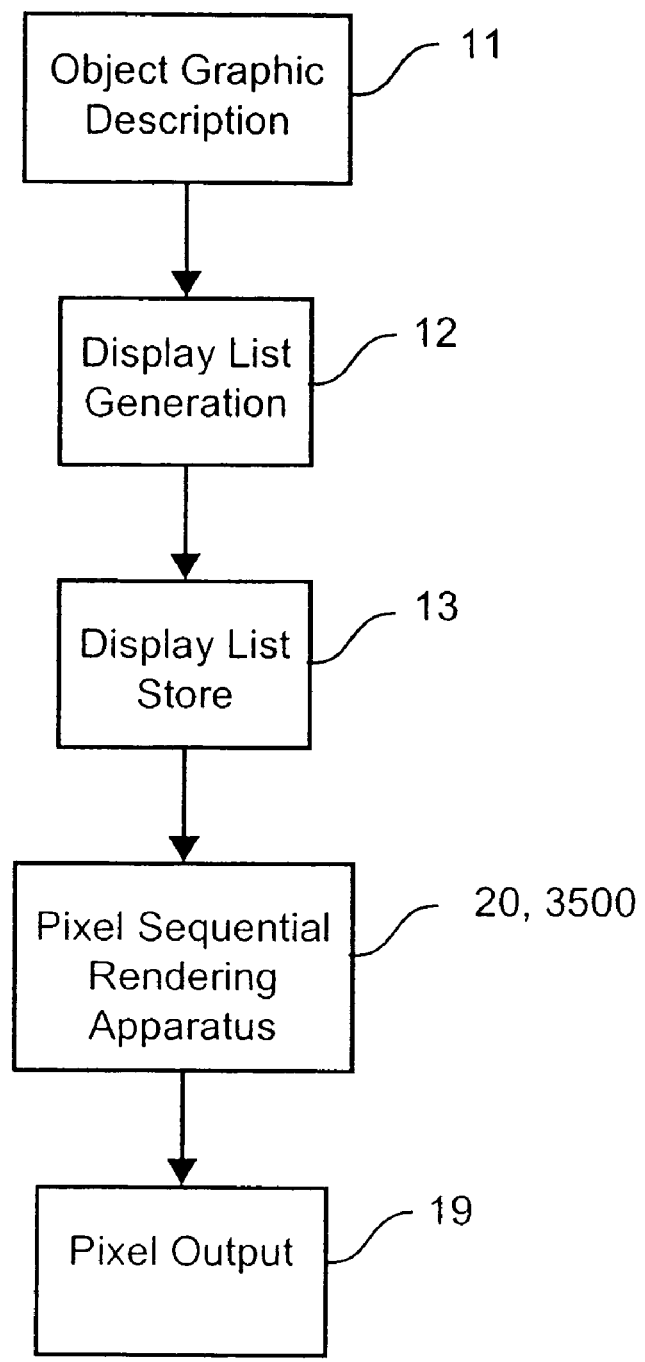
FIG. 2 is a block diagram showing the functional data flow of the rendering arrangement.

Referring now to FIG. 2, a functional data flow diagram of the rendering process is shown. The functional flow diagram of FIG. 2 commences with an object graphic description 11 which is used to describe-those parameters of graphic objects in a fashion appropriate to be generated by the host processor 2 and/or, where appropriate, stored within the system RAM 3 or derived from the system ROM 6, and which may be interpreted by the pixel sequential rendering apparatus 20, 3500 to render therefrom pixel-based images. For example, the object graphic description 11 may incorporate objects with edges in a number of formats including straight edges (simple vectors) that traverse from one point on the display to another, or an orthogonal edge format where a two-dimensional object is defined by a plurality of edges including orthogonal lines. Further formats, where objects are defined by continuous curves, are also appropriate and these can include quadratic polynomial fragments where a single curve may be described by a number of parameters which enable a quadratic based curve to be rendered in a single output space without the need to perform multiplications. Further data formats such as cubic splines and the like may also be used. An object may contain a mixture of many different edge types. Typically, common to all formats are identifiers for the start and end of each line (whether straight or curved) and typically, these are identified by a scan line number thus defining a specific output space in which the curve may be rendered.

For example, FIG. 16A shows a prior art edge description of an edge 600 that is required to be divided into two segments 601 and 602 in order for the segments to be adequately described and rendered. This arises because the prior art edge description, whilst being simply calculated through a quadratic expression, could not accommodate an inflexion point 604. Thus the edge 600 was dealt with as two separate edges having end points 603 and 604, and 604 and 605 respectively. FIG. 16B shows a cubic spline 610 that is described by endpoints 611 and 612, and control points 613 and 614. This format requires calculation of a cubic polynomial for render purposes and thus is expensive of computational time.

FIGS. 16C and 16D show examples of edges applicable to the described arrangement. An edge is considered as a single entity and if necessary, is partitioned to delineate sections of the edge that may be described in different formats, a specific goal of which is to ensure a minimum level of complexity for the description of each section.

In FIG. 16C, a single edge 620 is illustrated spanning between scan lines A and M. An edge is described by a number of parameters including start_x, start_y, one or more segment descriptions that include an address that points to the next segment in the edge, and a finish segment used to terminate the edge. Preferably, the edge 620 may be described as having four step segments, a vector segment, and a quadratic segment. A step segment is simply defined as having a x-step value and a y-step value. For the four step segments illustrated, the segment descriptions are [0,2], [+2,0], [0, 2] and [+2,0]. Note that the x-step value is signed thereby indicating the direction of the step, whilst the y-step value is unsigned as such is always in a raster scan direction of increasing scan line value The next segment is a vector segment which typically requires parameters start_x (X), start_y (Y), num_of_scan_ lines (NY) and slope (DX). In this example, because the vector segment is an intermediate segment of the edge 620, the start_x and start_y may be omitted because such arise from the preceding segment(s). The parameter num_of_s-can_ lines (NY) indicates the number of scan lines the vector segment lasts. The slope value (DX) is signed and is added to the x-value of a preceding scan line to give the x-value of the current scan line, and in the illustrated case, DX=+1. The next segment is a quadratic segment which has a structure corresponding to that of the vector segment, but also a second order value (DDX) which is also signed and is added to DX to alter the slope of the segment.

FIG. 16D shows an example of a cubic curve which includes a description corresponding to the quadratic segment save for the addition of a signed third-order value (DDDX), which is added to DDX to vary the rate of change of slope of the segment. Many other orders may also be implemented.

It will be apparent from the above that the ability to handle plural data formats describing edge segments allows for simplification of edge descriptions and evaluation, without reliance on complex and computationally expensive mathematical operations. In contrast, in the prior art system of FIG. 16A, all edges, whether orthogonal vector or quadratic were required to be described by the quadratic form.

The operation of the rendering arrangement will be described with reference to the simple example of rendering an image 78 shown in FIG. 8A which is seen to include two graphical objects, in particular, a partly transparent blue-colored triangle 80 rendered on top of and thereby partly obscuring an opaque red colored rectangle 90. As seen, the rectangle 90 includes side edges 92, 94, 96 and 98 defined between various pixel positions (X) and scan line positions (Y). Because the edges 96 and 98 are formed upon the scan lines (and thus parallel therewith), the actual object description of the rectangle 90 can be based solely upon the side edges 92 and 94, such as seen in FIG. 9A. In this connection, edge 92 commences at pixel location (40, 35) and extends in a raster direction down the screen to terminate at pixel position (40,105). Similarly, the edge 94 extends from pixel position (160, 35) to position (160,105). The horizontal portions of the rectangular graphic object 90 may be obtained merely by scanning from the edge 92 to the edge 94 in a rasterized fashion.

The blue triangular object 80 however is defined by three object edges 82, 84 and 86, each seen as vectors that define the vertices of the triangle. Edges 82 and 84 are seen to commence at pixel location (100, 20) and extend respectively to pixel locations (170, 90) and (30, 90). Edge 86 extends between those two pixel locations in a traditional rasterized direction of left to right. In this specific example because the edge 86 is horizontal like the edges 96 and 98 mentioned above, it is not essential that the edge 86 be defined. In addition to the starting and ending pixel locations used to describe the edges 82 and 84, each of these edges will have associated therewith the slope value in this case +1 and −1 respectively.

Returning to FIG. 2, having identified the data necessary to describe the graphic objects to the rendered, the graphic system 1 then performs a display list generation step 12.

Figure 3:
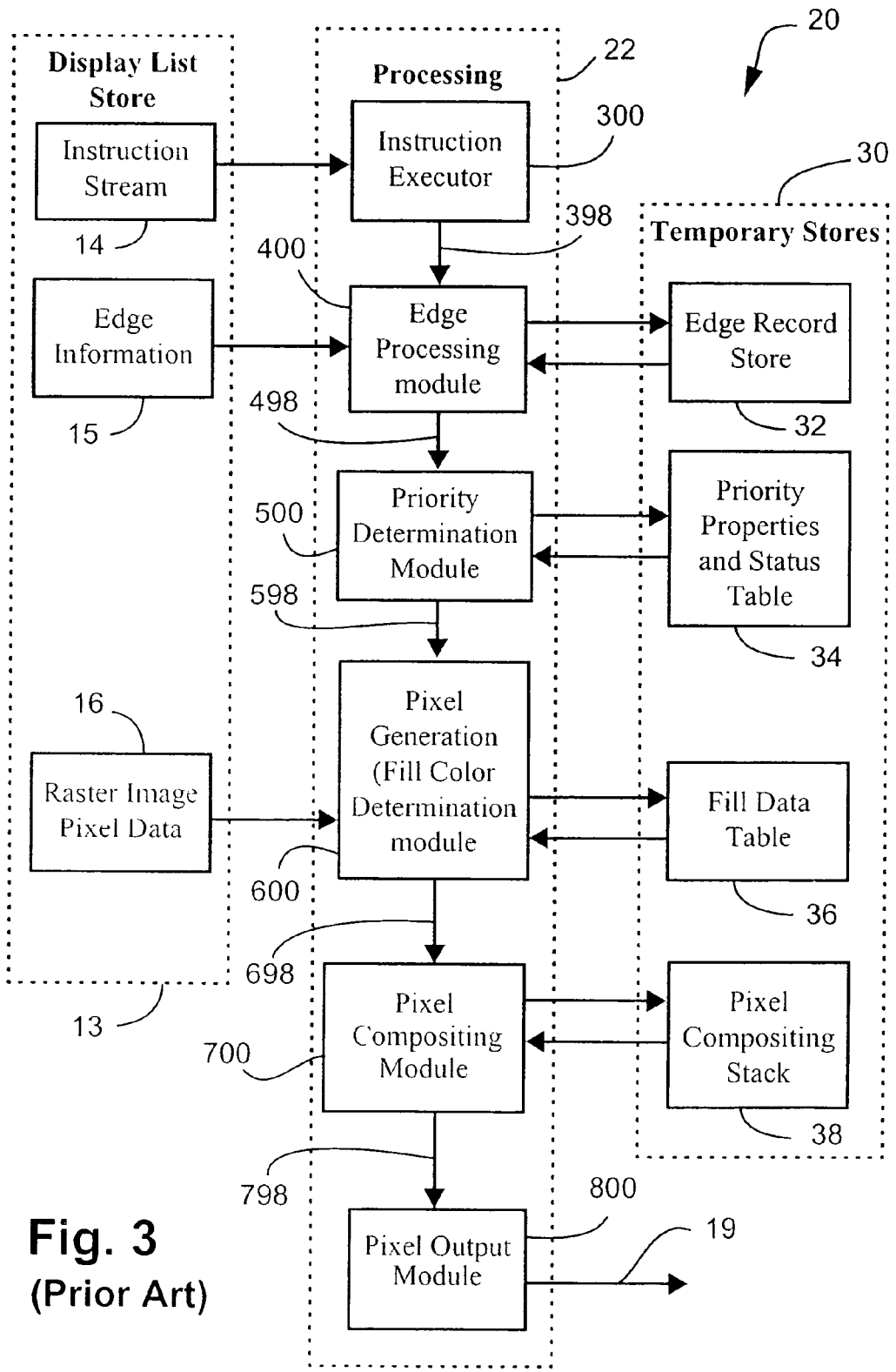
FIG. 3 is a schematic block diagram representation of a prior art pixel sequential rendering apparatus useful in the arrangement of FIG. 2, together with associated display list and temporary stores.

The display list generation 12 is preferably implemented as a software driver executing on the host processor 2 with attached ROM 6 and RAM 3. The display list generation 12 converts an object graphics description, expressed in any one or more of the well known graphic description languages, graphic library calls, or any other application specific format, into a display list. The display list is typically written into a display list store 13, generally formed within the RAM 4 but which may alternatively be formed within the temporary rendering stores 30. As seen in FIG. 3, the display list store 13 can include a number of components, one being an instruction stream 14, another being edge information 15 and where appropriate, raster image pixel data 16.

The instruction stream 14 includes code interpretable as instructions to be read by the pixel sequential rendering apparatus 20 to render the specific graphic objects desired in any specific image. For the example of the image shown in FIG. 8A, the instruction stream 14 could be of the form of:

(1) render (nothing) to scan line 20;
(2) at scan line 20, add two blue edges 82 and 84;
(3) render to scan line 35;
(4) at scan line 35, add two red edges 92 and 94; and
(5) render to completion.

Similarly, the edge information 15 for the example of FIG. 5A may include the following:

(i) edge 84 commences at pixel position 100, edge 82 commences at pixel position 100;
(ii) edge 92 commences at pixel position 40, edge 94 commences at pixel position 160;
(iii) edge 84 runs for 70 scan lines, edge 82 runs for 70 scan lines;
(iv) edge 84 has slope=−1, edge 84 has slope=+1;
(v) edge 92 has slope=0 edge 94 has slope=0.
(vi) edges 92 and 94 each run for 70 scan lines.

Figures 8A, 8B:
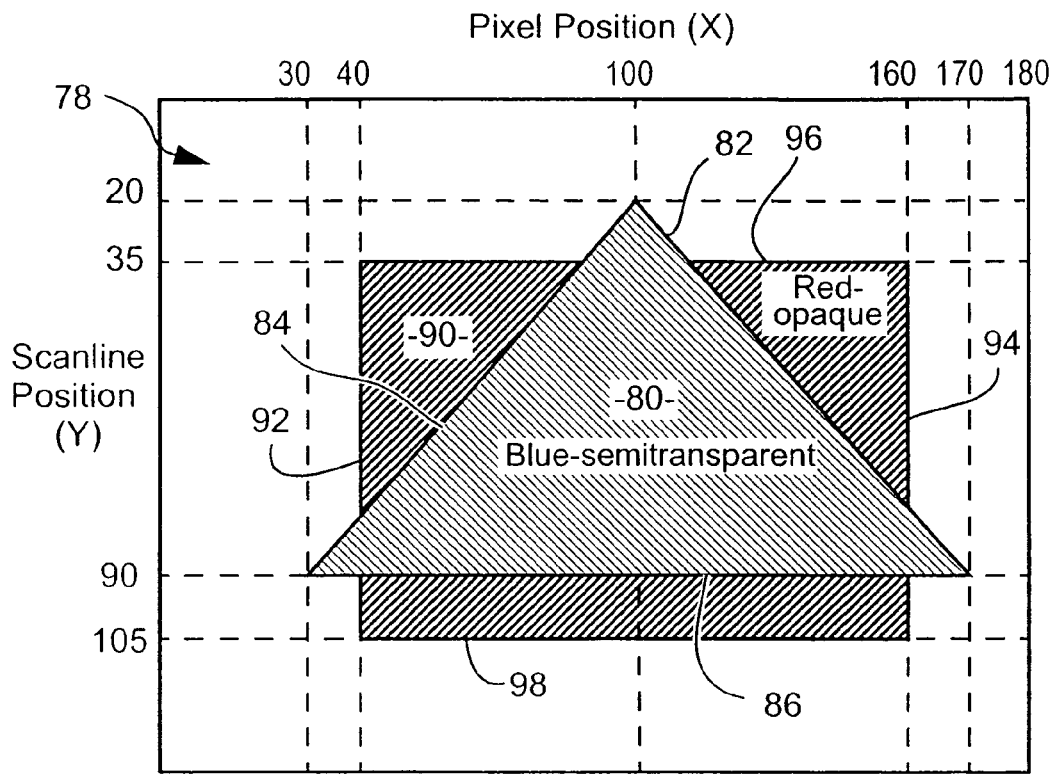
FIG. 8A illustrates a two-object image used as an example for explaining the operation of the rendering arrangement.
FIG. 8B shows a table of a number of edge records of the two-object image shown in FIG. 8A.
Figure 9A:
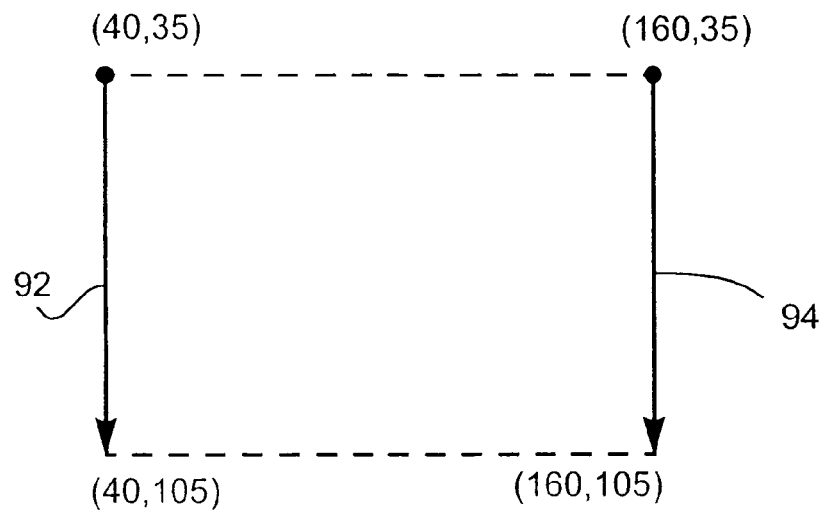
FIGS. 9A and 9B illustrate the vector edges of the objects of FIG. 8A.

It will be appreciated from the above example of the instruction stream 14 and edge information 15 and the manner in which each are expressed, that in the image 78 of FIG. 8A, the pixel position (X) and the scan line value (Y) define a single 2-dimensional output space in which the image 78 is rendered. Other output space configurations however can be realised using the principles of the present disclosure.

FIG. 8A includes no raster image pixel data and hence none need be stored in the store portion 16 of the display list 13, although his feature will be described later.

The display list store 13 is read by a pixel sequential rendering apparatus 20. The pixel sequential rendering apparatus 20 is typically implemented as an integrated circuit and converts the display list into a stream of raster pixels which can be forwarded to another device, for example, a printer, a display, or a memory store.

Although the pixel sequential rendering apparatus 20 is described as an integrated circuit, it may be implemented as an equivalent software module executing on a general purpose processing unit, such as the host processor 2.

FIG. 3 shows the configuration of the pixel sequential rendering apparatus 20, the display list store 13 and the temporary rendering stores 30. The processing stages 22 of the pixel-sequential rendering apparatus 20 are pipelined and include an Instruction Executor 300, an Edge Processing Module 400, a Priority Determination Module 500, a Pixel Generation Module 600, a Pixel Compositing Module 700, and a Pixel Output Module 800. The processing operations use the temporary stores 30 which, as noted above, may share the same device (eg. magnetic disk or semiconductor RAM) as the display list store 13, or may be implemented as individual stores for reasons of speed optimisation. The Edge Processing Module 400 uses an edge record store 32 to hold edge information which is carried forward from scan-line to scan-line. The Priority Determination Module 500 uses a priority properties and status table 34 to hold information about each priority, and the current state of each priority with respect to edge crossings while a scan-line is being rendered. The Pixel Generation Module 600 generates pixel values and uses a fill data table 36 to hold information required to determine the fill color of a particular priority at a particular position The Pixel Compositing Module 700 uses a pixel compositing stack 38 to hold intermediate results during the determination of an output pixel that requires the colors from multiple priorities to determine its value. The display list store 13 and the other stores 32-38, detailed above may be implemented in RAM or any other data storage technology.

The processing steps shown in the arrangement of FIG. 3 take the form of a processing pipeline 22. In this case, the modules of the pipeline may execute simultaneously on different portions of image data in parallel, with messages passed between them as described below. In another arrangement, each message described below may take the form of a synchronous transfer of control to a downstream module, with upstream processing suspended until the downstream module completes the processing of the message.

Figure 35A:
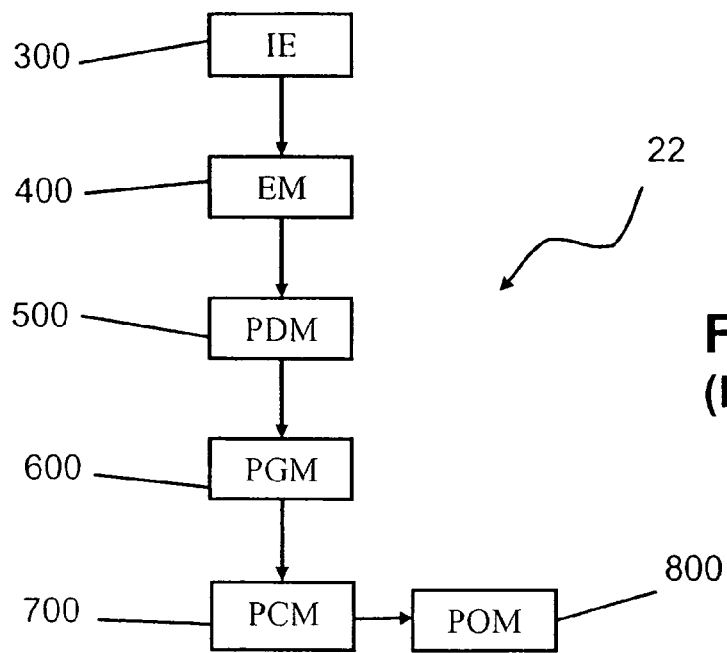
FIG. 35A is a simplified representation of the prior art system of FIG. 3.
Figure 35B:
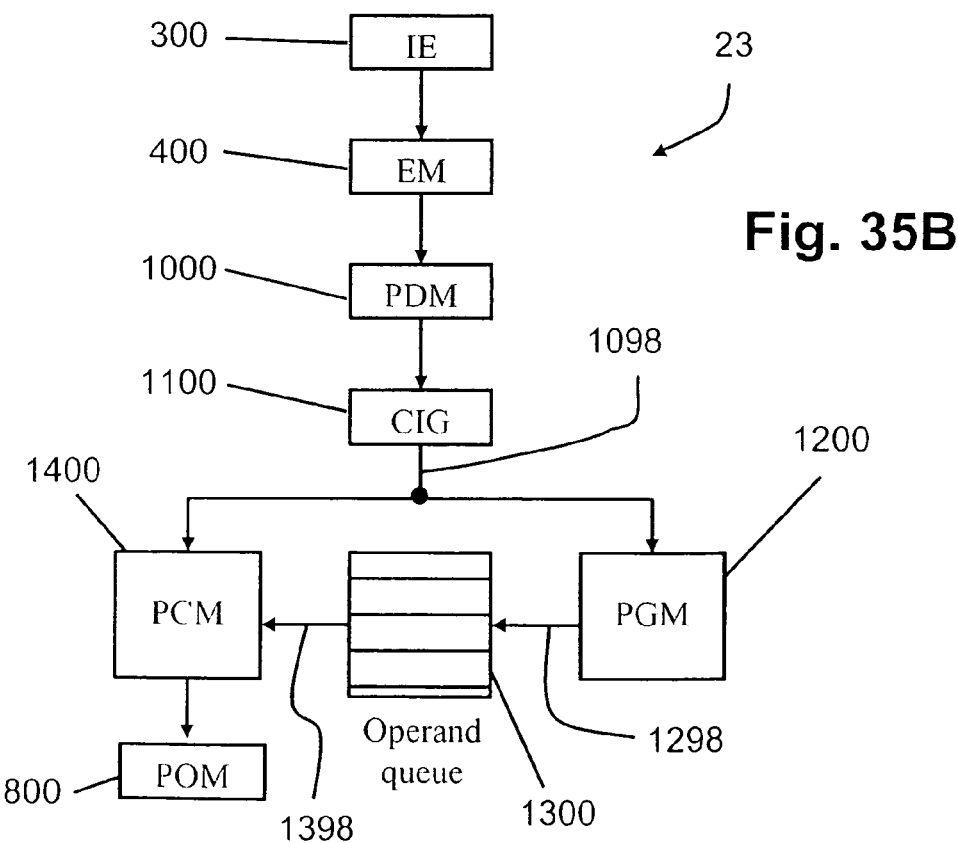
FIG. 35B shows a pixel sequential rendering apparatus according to the present disclosure and comparatively depicting the characteristic structural differences with the representation of FIG. 35A.

The processing pipeline 22 of FIG. 3 is substantially reproduced in FIG. 35A in a manner which can be compared directly with a presently disclosed processing pipeline 23 of FIG. 35B. Where correspondingly illustrated components appear correspondingly numbered, the corresponding function applies.

3.1 Instruction Executor

The Instruction Executor 300 reads and processes instructions from the instruction stream 14 and formats the instructions into messages that are transferred via an output 398 to the other modules 400, 500, 600 and 700 within the pipeline 22. Preferably, the instruction stream 13 may include the following instructions:

LOAD_PRIORITY_PROPERTIES: This instruction is associated with data to be loaded into the priority properties and status table 34, and an address in that table to which the data is to be loaded. When this instruction is encountered by the Instruction Executor 300, the Instruction Executor 300 issues a message for the storage of the data in the specified location of the priority properties and status table 34. This may be accomplished by formatting a message containing this data and passing it down the processing pipeline 22 to the Priority Determination Module 500 which performs the store operation.

LOAD_FILL_DATA: This instruction is associated with fill data associated with an object to be loaded into the fill data table 36, and an address in that table to which the data is to be loaded. When this instruction is encountered by the Instruction Executor 300, the Instruction Executor 300 issues a message for the storage of the data at the specified address of the fill data table 36. This may be accomplished by formatting a message containing this data and passing it down the processing pipeline 22 to the Pixel Generation Module which performs the store operation.

LOAD_NEW_EDGES_AND_RENDER: This instruction is associated with an address in the display list store 13 of new edges 15 which are to be introduced into the rendering process when a next scan line is rendered. When this instruction is encountered by the Instruction Executor 300, the Instruction Executor 300 formats a message containing this data and passes it to the Edge Processing Module 400. The Edge Processing Module 400 stores the address of the new edges in the edge record store 32. The edges at the specified address are sorted on their initial scan line intersection coordinate before the next scan line is rendered In one arrangement, they are sorted by the display list generation process 12. In another arrangement, they are sorted by the pixel-sequential rendering apparatus 20.

SET_SCAN_LINE_LENGTH: This instruction is associated with a number of pixels which are to be produced in each rendered scan line. When this instruction is encountered by the Instruction Executor 300, the Instruction Executor 300 passes the value to the Edge Processing Module 400 and the Pixel Output Module 800.

SET_OPACITY_MODE: This instruction is associated with a flag, which indicates whether pixel compositing operations will use an opacity channel, also known in the art as an alpha or transparency channel. When this instruction is encountered by the Instruction Executor 300, the Instruction Executor 300 passes the flag value in the Pixel Output Module 800.

SET_BUF: This instruction sets the address of external memory buffers used by the pixel sequential rendering apparatus 20. Preferably, at least the input, output and spill buffers of the Edge Processing Module 400 are stored in external memory.

The Instruction Executor 300 is typically formed by a microcode state machine that maps instructions and decodes them into pipeline operations for passing to the various modules. A corresponding software process may alternatively be used.

3.2 Edge Tracking Module

Figure 4:
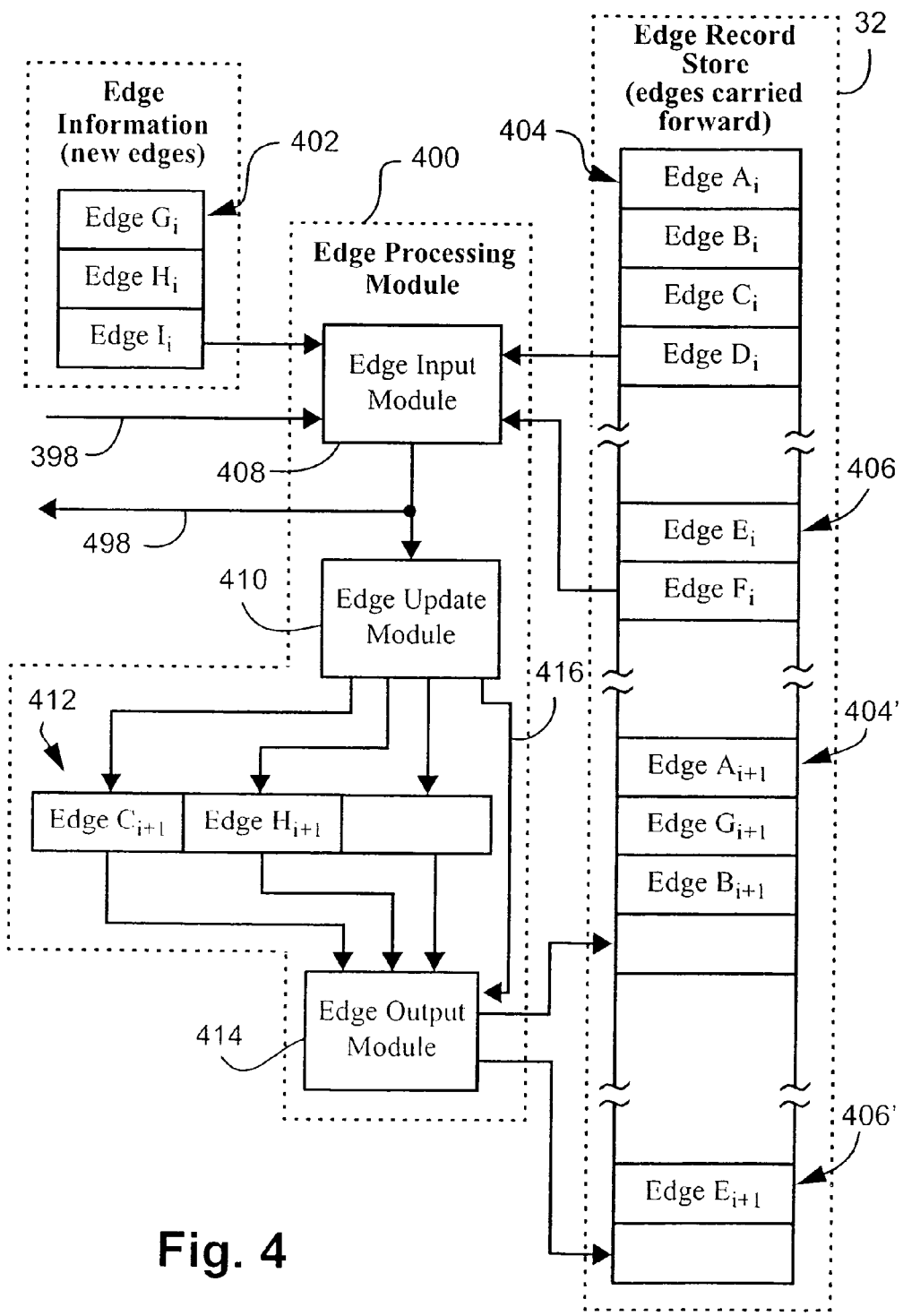
FIG. 4 is a schematic functional representation of the Edge Processing Module 400 of FIG. 3.

The operation of the Edge Processing Module 400 during a scan line render operation will now be described with reference to FIG. 4. The initial condition for the rendering of a scan line is the availability of three lists of edge records. Any or all of these lists may be empty. These lists are a new edge list 402, obtained from the edge information 15 and which contains new edges as set by the LOAD_NEW_EDGES_AND_RENDER instruction, a main edge list 404 which contains edge records carried forward from the previous scan line, and a spill edge list 406 which also contains edge records carried forward from the previous scan line.

Figure 12A:
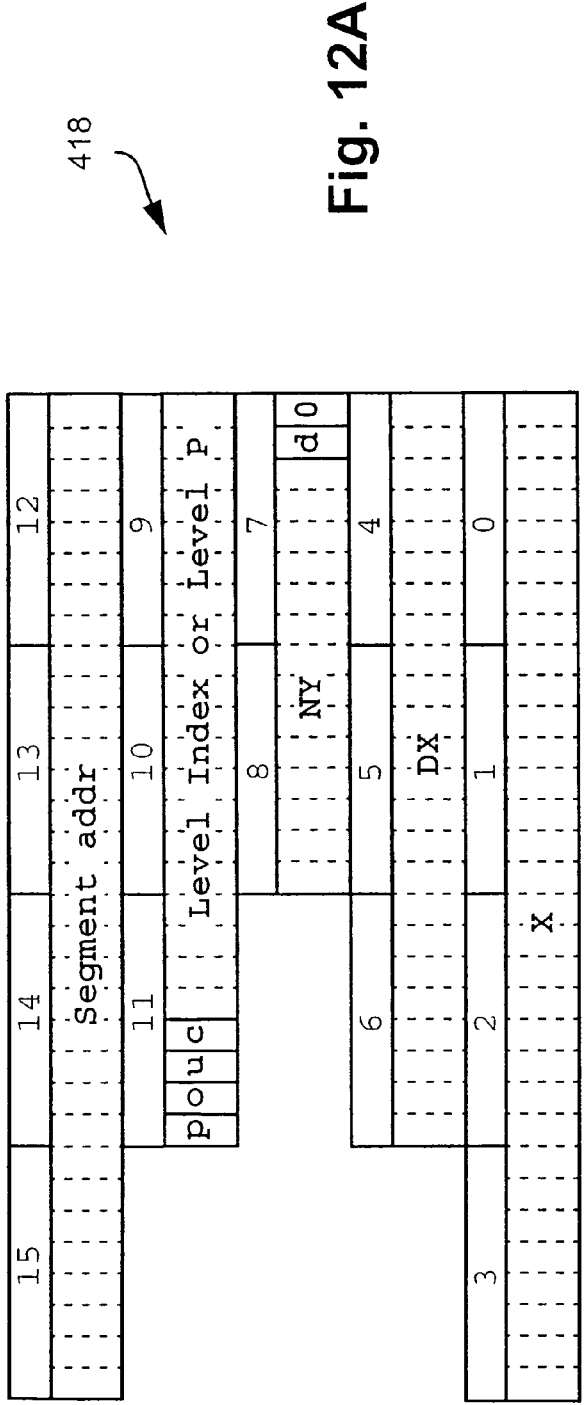
FIG. 12A depicts the format of an active edge record created by the Edge Processing Module 400 of FIG. 4.

Turning now to FIG. 12A, there is shown the data format of such an edge record, which may include:

(i) a current scan line intersection coordinate (referred to here as the X coordinate), (ii) a count (referred to herein as NY) of how many scan lines a current segment of this edge will last for (in some arrangements this may be represented as a Y limit), (iii) a value to be added to the X coordinate of this edge record after each scan line (referred to here as the DX), (iv) a priority level number (P) or an index (P) to a list of priority numbers, (v) an address (addr) of a next edge segment in the list; and (vi) a number of flags, marked p, o, u, c and d. The flag d determines whether the edge affects the clipping counter or the fill counter. The flag u determines whether the fill counter is incremented or decremented by the edge. The remaining flags are not significant in the rendering process and need not be described.

Such a data format may accommodate vectors, and orthogonally arranged edges. The format may also include a further parameter herein called DDX, which is a value to be added to the DX value of this edge record after each scan line. The latter enables the rendering of edges describing quadratic curves. The addition of further parameters, DDDX for example, may allow such an arrangement to accommodate cubic curves. In some applications, such as cubic Bezier spline, a 6-order polynomial (ie: up to DDDDDDX) may be required. The flag (u) indicates whether a winding count is to be incremented or decremented by an edge. The winding count is stored in a fill counter and is used to determine whether a currently scanned pixel is inside or outside the object in question.

In the example of the edges 84 and 94 of FIG. 8A, the corresponding edge records at scan line 20 could read as shown in the Table of FIG. 8B.

In this description, coordinates which step from pixel to pixel along a scan line being generated by the rendering process will be referred to as X coordinates, and coordinates which step from scan line to scan line will be referred to as Y coordinates. Preferably, each edge list contains zero or more records placed contiguously in memory. Other storage arrangements, including the use of pointer chains, are also possible. The records in each of the three lists 402, 404 and 406 are arranged in order of scan line intersection, this being the X coordinate. This is typically obtained by a sorting process, initially managed by an edge input module 408 which receives messages, including edge information, from the Instruction Executor 300. It is possible to relax the sort to only regard the integral portion of each scan line intersection coordinate as significant. It is also possible to relax the sort further by only regarding each scan line intersection coordinate, clamped to the minimum and maximum X coordinates which are being produced by the current rendering process. Where appropriate, the edge input module 408 relay messages to modules 500, 600 and 700 downstream in the pipeline 22 via an output 498.

The edge input module 408 maintains references into, and receives edge data from, each of the three lists 402, 404, and 406. Each of these references is initialised to refer to the first edge in each list at the start of processing of a scan line. Thereafter, the edge input module 408 selects an edge record from one of the three referenced edge records such that the record selected is the one with the least X coordinate out of the three referenced records. If two or more of the X-records are equal, each is processed in any order and the corresponding edge crossings output in the following fashion. The reference, which was used to select that record, is then advanced to the next record in that list. The edge just selected is formatted into a message and sent to an edge update module 410. Also, certain fields of the edge, in particular the current X, the priority numbers, and the direction flag, are formatted into a message which is forwarded to the Priority Determination Module 500 via an output 498 of the Edge Processing Module 400. Arrangements that use more or fewer lists than those described here are also possible.

Upon receipt of an edge, the edge update module 410 decrements the count of how many scan lines for which a current segment will last. If that count has reached zero, a new segment is read from the address indicated by the next segment address. A segment preferably specifies;

(i) a value to add to the current X coordinate immediately the segment is read, (ii) a new DX value for the edge, (iii) a new DDX value for the edge, and (iv) a new count of how many scan lines for which the new segment will last.

If there is no next segment available at the indicated address, no further processing is performed on that edge. Otherwise, the edge update module 410 calculates the X coordinate for the next scan line for the edge. This typically would involve taking the current X coordinate and adding to it the DX value. The DX may have the DDX value added to it, as appropriate for the type of edge being handled. The edge is then written into any available free slot in an edge pool 412, which is an array of two or more edge records. If there is no free slot, the edge update module 410 waits for a slot to become available. Once the edge record is written into the edge pool 412, the edge update module 410 signals, via a line 416 to an edge output module 414, that a new edge has been added to the edge pool 412.

As an initial condition for the rendering of a scan line, the edge output module 414 has references to each of a next main edge list 404' and a next spill edge list 406'. Each of these references is initialised to the location where the, initially empty, lists 404' and 406' may be built up. Upon receipt of the signal 416 indicating that an edge has been added to the edge pool 412, the edge output module 414 determines whether or not the edge just added has a lesser X coordinate than the edge last written to the next main edge list 404' (if any). If this is true, a "spill" is said to have occurred because the edge cannot be appended to the main edge list 404 without violating its ordering criteria. When a spill occurs, the edge is inserted into the next spill edge list 406', preferably in a manner that maintains a sorted next spill edge list 406'. For example this may be achieved using a insertion sorting routine. In some arrangements the spills may be triggered by other conditions, such as excessively large X coordinates.

If the edge added to the edge pool 412 has an X coordinate greater than or equal to the edge last written to the next main edge list 404' (if any), and there are no free slots available in the edge pool 412, the edge output module 414 selects the edge from the edge pool 412 which has the least X coordinate, and appends that edge to the next main edge list 404', extending it in the process. The slot in the edge pool 412 that was occupied by that edge is then marked as free.

Once the edge input module 408 has read and forwarded all edges from all three of its input lists 402, 404 and 406, it formats a message which indicates that the end of scan line has been reached and sends the message to both the Priority Determination Module 500 and the edge update module 410. Upon receipt of that message, the edge update module 410 waits for any processing it is currently performing to complete, then forwards the message to the edge output module 414. Upon receipt of the message, the edge output module 414 writes all remaining edge records from the edge pool 412 to the next main edge list 404' in X order. Then, the reference to the next main edge list 404' and the main edge list 404 are exchanged between the edge input module 408 and the edge output module 414, and a similar exchange is performed for the next spill edge list 406' and the spill edge list 406. In this way the initial conditions for the following scan line are established.

Rather than sorting the next spill edge list 406' upon insertion of edge records thereto, such edge records may be merely appended to the list 406', and the list 406' sorted at the end of the scan line and before the exchange to the current spill list 406 becomes active in edge rasterization of the next scan line.

It can be deduced from the above that edge crossing messages are sent to the Priority Determination Module 500 in scan line and pixel order (that is, they are ordered firstly on Y and then on X) and that each edge crossing message is labelled with the priority level to which it applies.

FIG. 12A depicts a specific structure of an active edge record 418 that may be created by the Edge Processing Module 400 when a segment of an edge is received. If the first segment of the edge is a step (orthogonal) segment, the X-value of the edge is added to a variable called "X-step" for the first segment to obtain the X position of the activated edge. Otherwise, the X-value of the edge is used. The Xstep value is obtained from the segment data of the edge and is added once to the Xedge value of the next segment to obtain the X position of the edge record for that next segment. This means that the edges in the new edge record will be sorted by Xedge+Xstep. The Xstep of the first segment should, therefore, be zero, in order to simplify sorting the edges The Y-value of the first segment is loaded into the NY field of the active edge record 418. The DX field of the active edges copied from the DX field identifier of vector or quadratic segments, and is set to zero for a step segment. A u-flag as seen in FIG. 12A is set if the segment is upwards heading (see the description relating to FIG. 13A). A d-flag is set when the edge is used as a direct clipping object, without an associated clipping level, and is applicable to closed curves. The actual priority level of the segment, or a level address is copied from the corresponding field of the new edge record into a level field in the active edge record 418. The address of the next segment in the segment list is copied from the corresponding field of the new edge record into a segment address field (segment addr) of the active edge record 418. The segment address may also be used to indicate the termination of an edge record.

It will be appreciated from FIG. 12A that other data structures are also possible, and necessary for example where polynomial implementations are used. In one alternative data structure, the 'segment addr' field is either the address of the next segment in the segment list or copied from the segments DDX value, if the segment is quadratic. In the latter case, the data structure has a q-flag which is set if the segment is a quadratic segment, and cleared otherwise. In a further variation, the segment address and the DDX field may be separated into different fields, and additional flags provided to meet alternate implementations.

Figure 12B:
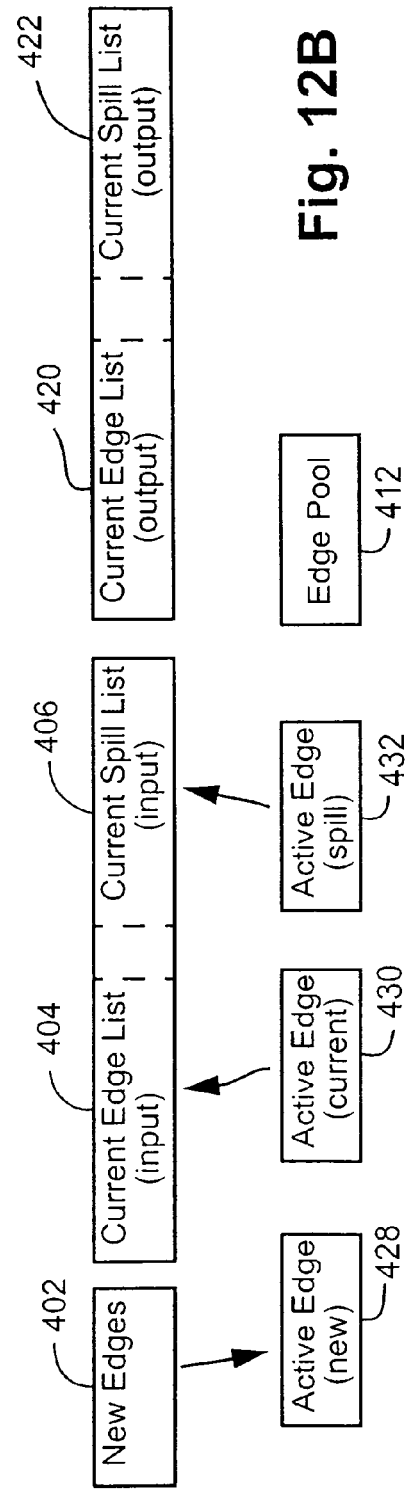
FIG. 12B depicts the arrangement of the edge records used in the Edge Processing Module 400 of FIG. 4.

FIG. 12B depicts the arrangement of the edge records described above and used in the Edge Processing Module 400. A new active edge record 428, a current active edge record 430 and a spill active edge record 432, supplements the edge pool 412. As seen in FIG. 12B, the records 402, 404, 406, 404' and 406' are dynamically variable in size depending upon the number of edges being rendered at any one time. Each record includes a limit value which, for the case of the new edge list 402, is determined by a SIZE value incorporated with the LOAD_EDGES_AND_RENDER instruction. When such an instruction is encountered, SIZE is checked and if non-zero, the address of the new edge record is loaded and a limit value is calculated which determines a limiting size for each of the lists 402, 404, 406, 404' and 406'.

Although the described arrangement utilizes arrays and associated pointers for the handling of edge records, other implementations, such as linked lists for example may be used. These other implementations may be hardware or software-based, or combinations thereof.

Figure 10:
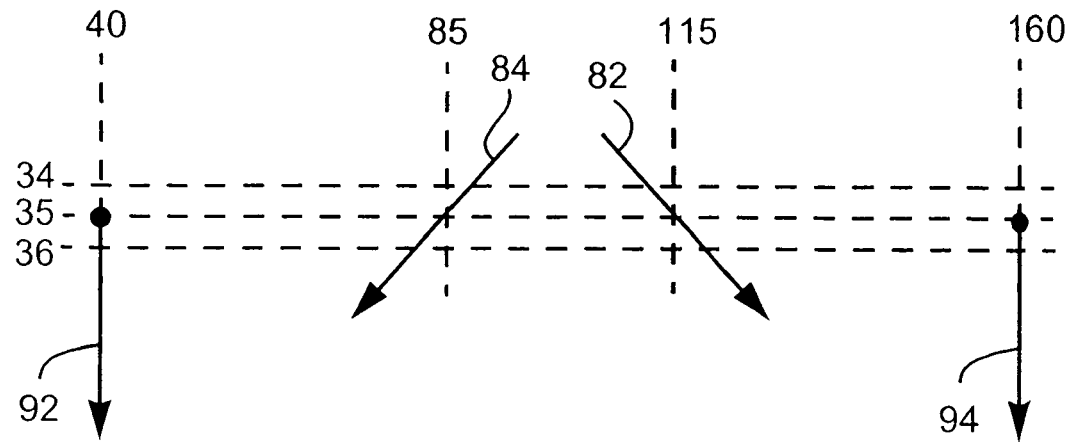
FIG. 10 illustrates the rendering of a number of scan lines of the image of FIG. 8A.
Figure 11:
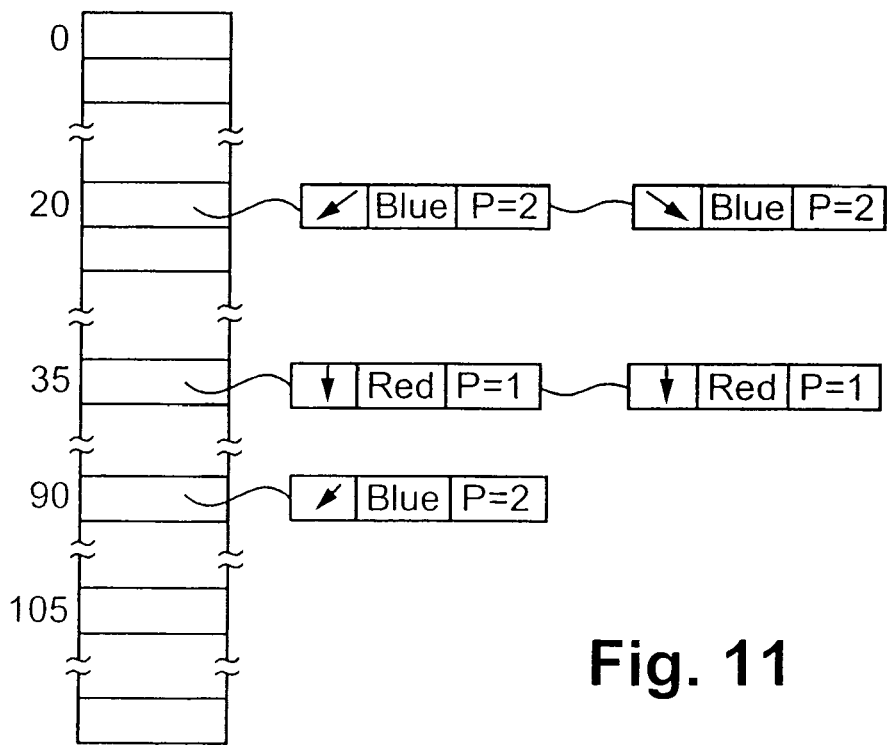
FIG. 11 depicts the arrangement of an edge record for the image of FIG. 8A.

The specific rendering of the image 78 shown in FIG. 8A will now be described with reference to scan lines 34, 35 and 36 shown in FIG. 10. In this example, the calculation of the new X coordinate for the next scan line is omitted for the purposes of clarity, with FIGS. 12C to 12I illustrating the output edge crossing being derived from one of the registers 428, 430 and 432 of the edge poll 412.

Figure 12C:
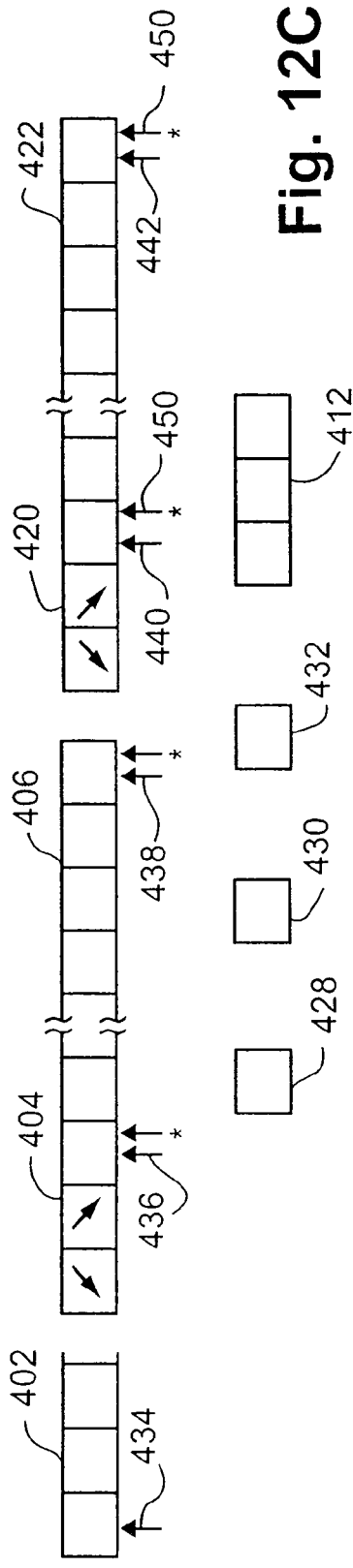

FIG. 12C illustrates the state of the lists noted above at the end of rendering scan line 34 (the top portion of the semi-transparent blue triangle 80). Note that in scan line 34 there are no new edges and hence the list 402 is empty. Each of the main edge lists 404 and next main edge list 404' include only the edges 82 and 84. Each of the lists includes a corresponding pointer 434, 436, and 440 which, on completion of scan line 34, points to the next vacant record in the corresponding list. Each list also includes a limit pointer 450, denoted by an asterisk (*) which is required to point to the end of the corresponding list. If linked lists were used, such would not be required as linked lists include null pointer terminators that perform a corresponding function.

Figure 12D:
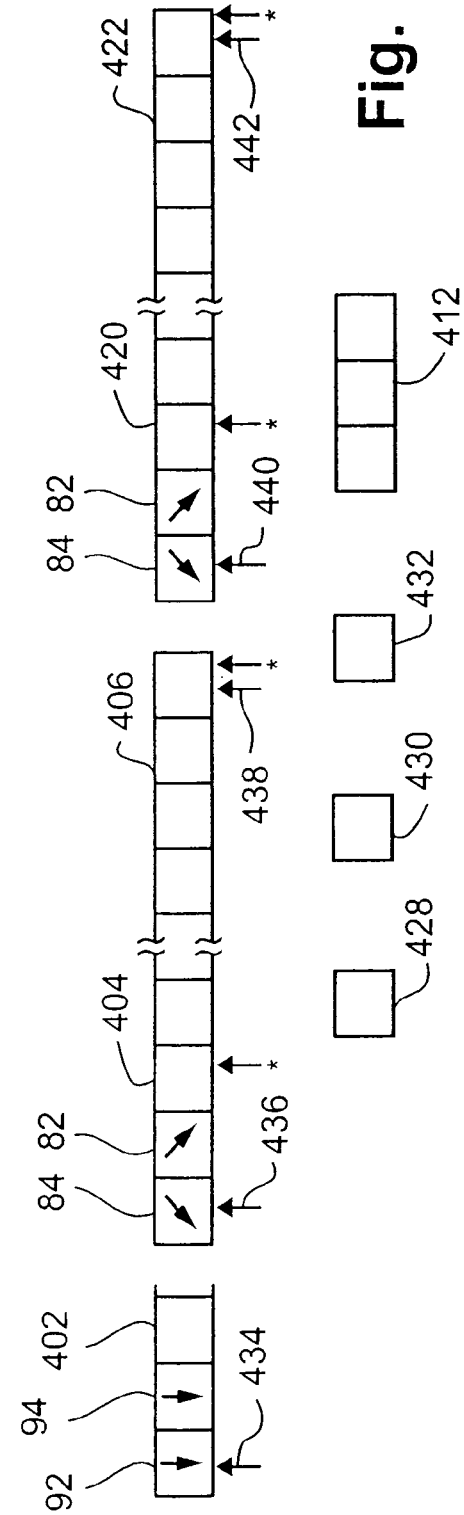

As noted above, at the commencement of each scan line, the next main edge list 404' and the main edge list 404 are swapped and new edges are received into the new edge list 402. The remaining lists are cleared and each of the pointers set to the first member of each list. For the commencement of scan line 35, the arrangement then appears as seen in FIG. 12D. As is apparent from FIG. 12D, the records include four active edges which, from FIG. 10, are seen to correspond to the edges 92, 94, 84 and 82.

Figure 12E:
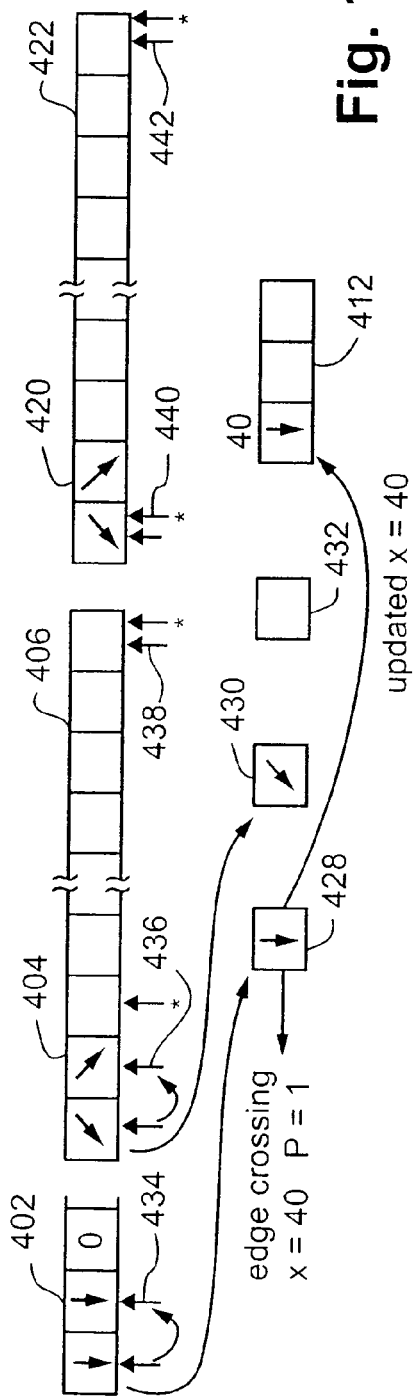

Referring now to FIG. 12E, when rendering starts, the first segment of the new edge record 402 is loaded into an active edge record 428 and the first active edge records of the main edge list 404 and spill edge list 406 are copied to records 430 and 432 respectively. In this example, the spill edge list 406 is empty and hence no loading takes place. The X-positions of the edges within the records 428, 430 and 432 are then compared and an edge crossing is emitted for the edge with the smallest X-position. In this case, the emitted edge is that corresponding to the edge 92 which is output together with its priority value. The pointers 434, 436 and 438 are then updated to point to the next record in the list.

The edge for which the edge crossing was emitted is then updated (in this case by adding DX=0 to its position), and buffered to the edge pool 412 which, in this example, is sized to retain three edge records. The next entry in the list from which the emitted edge arose (in this case list 402) is loaded into the corresponding record (in this case record 428). This is seen in FIG. 12F.

Figure 12F:
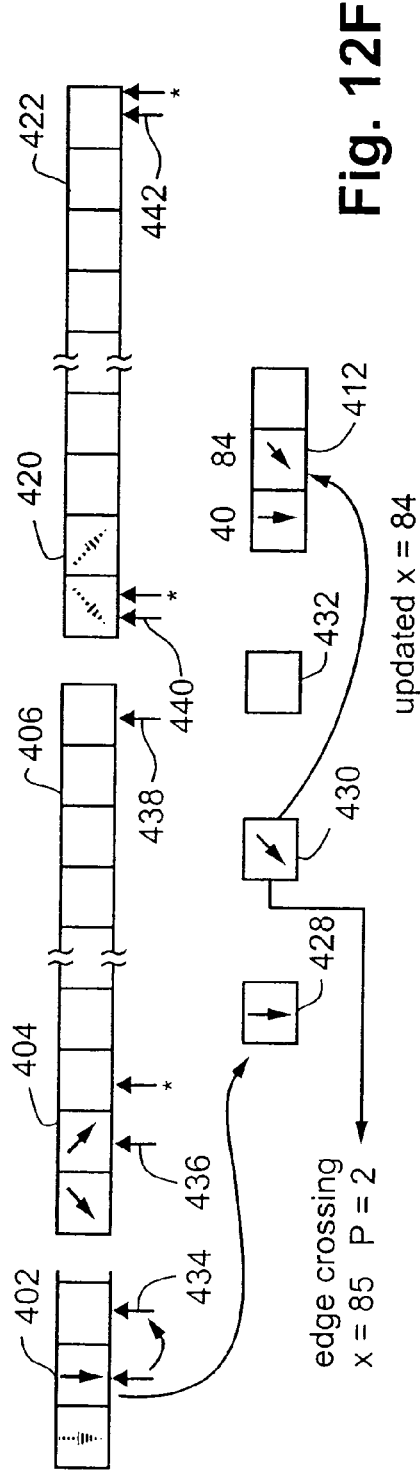

Further, as is apparent from FIG. 12F, a comparison between the registers 428, 430 and 432 again selects the edge with the least X-value which is output as the appropriate next edge crossing (X=85, P=2). Again, the selected output edge is updated and added to the edge pool 412 and all the appropriate pointers incremented. In this case, the updated value is given by X←X+DX, which is evaluated as 84=85−1. Also, as seen, the new edge pointer 434 is moved, in this case, to the end of the new edge list 402.

In FIG. 12G, the next edge identified with the lowest current X-value is again that obtained from the register 430 which is output as an edge crossing (X=115, P=2). Updating of the edge again occurs with the value be added to the edge pool 412 as shown. At this time, it is seen that the edge pool 412 is now full and from which the edge with the smallest X-value is selected and emitted to the output list 404', and the corresponding limited pointer moved accordingly.

As seen in FIG. 12H, the next lowest edge crossing is that from the register 428 which is output (X=160 P=1). The edge pool 412 is again updated and the next small X-value emitted to the output list 404'.

At the end of scan line 35, and as seen in FIG. 12I, the contents of the edge pool 412 are flushed to the output list 404' in order of smallest X-value. As seen in FIG. 12J, the next main edge list 404' and the main edge list 404 are swapped by exchanging their pointers in anticipation of rendering the next scan line 36. After the swapping, it is seen from FIG. 12J that the contents of the main edge list 404 include all edge current on scan line 36 arranged in order of X-position thereby permitting their convenient access which facilitates fast rendering.

Ordinarily, new edges are received by the Edge Processing Module 400 in order of increasing X-position. When a new edge arrives, its position is updated (calculated for the next scan line to be rendered) and this determines further action as follows:
 (a) if the updated position is less than the last X-position output on the line 498, the new edge is insertion sorted into the main spill list 406 and the corresponding limit register updated;
 (b) otherwise, if there is space, it is retained in the edge pool 412.

As is apparent from the foregoing, the edge pool 412 aids in the updating of the lists in an ordered manner in anticipation of rendering the next scan line in the rasterized image. Further, the size of the edge pool 412 may be varied to accommodate larger numbers of non-ordered edges. However, it will be appreciated that in practice the edge pool 412 will have a practical limit, generally dependent upon processing speed and available memory with the graphic processing system. In a limiting sense, the edge pool 412 may be omitted which would ordinarily require the updated edges to be insertion sorted into the next output edge list 404'. However, this situation can be avoided as a normal occurrence through the use of the spill lists mentioned above. The provision of the spill lists allows the described arrangement to be implemented with an edge pool of practical size and yet handle relatively complex edge intersections without having to resort to software intensive sorting procedures. In those small number of cases where the edge pool and spill list are together insufficient to accommodate the edge intersection complexity, sorting methods may be used.

An example of where the spill list procedure is utilised is seen in FIG. 14A where three arbitrary edges 60, 61 and 63 intersect an arbitrary edge 62 at a relative position between scan lines A and B. Further, the actual displayed pixel locations 64 for each of scan lines A, B, are shown which span pixel locations C to J. In the above described example where the edge pool 412 is sized to retain three edge records, it will be apparent that such an arrangement alone will not be sufficient to accommodate three edge intersections occurring between adjacent scan lines as illustrated in FIG. 14A.

FIG. 14B shows the state of the edge records after rendering the edges 60, 61 and 63 on scan line. The edge crossing H is that most recently emitted and the edge pool 412 is full with the updated X-values E, G and I for the edges 60, 61 and 63 respectively for the next scan line, scan line B. The edge 62 is loaded into the current active edge record 430 and because the edge pool 412 is fill, the lowest X-value, corresponding to the edge 60 is output to the output edge list 404'.

In FIG. 14C, the next edge crossing is emitted (X=J for edge 62) and the corresponding updated value determined, in this case X=C for scan line B. Because the new updated value X=C is less than the most recent value X=E copied to the output list 404', the current edge record and its corresponding new updated value is transferred directly to the output spill list 406'.

FIG. 14D shows the state of the edge records at the start of scan line B where it is seen that the main and output lists, and their corresponding spill components have been swapped. To determine the first emitted edge, the edge 60 is loaded into the current active edge register 430 and the edge 62 is loaded into the spill active edge register 432. The X-values are compared and the edge 62 with the least X-value (X=C) is emitted, updated and loaded to the edge pool 412.

Edge emission and updating continues for the remaining edges in the main edge list 404 and at the end of the scan line, the edge pool 412 is flushed to reveal the situation shown in FIG. 14E, where it is seen that each of the edges 60 to 63 are appropriately ordered for rendering on the next scan line, having been correctly emitted and rendered on scan line B.

As will be apparent from the foregoing, the spill lists provide for maintaining edge rasterization order in the presence of complex edge crossing situations. Further, by virtue of the lists being dynamically variable in size, large changes in edge intersection numbers and complexity may be handled without the need to resort to sorting procedures in all but exceptionally complex edge intersections.

Preferably, the edge pool 412 is sized to retain eight edge records and the lists 404, 404' together with their associated spill lists 406, 406' have a base (minimum) size of 512 bytes which is dynamically variable thereby providing sufficient scope for handling large images with complex edge crossing requirements.

3.3 Priority Determination Module

Figure 5:
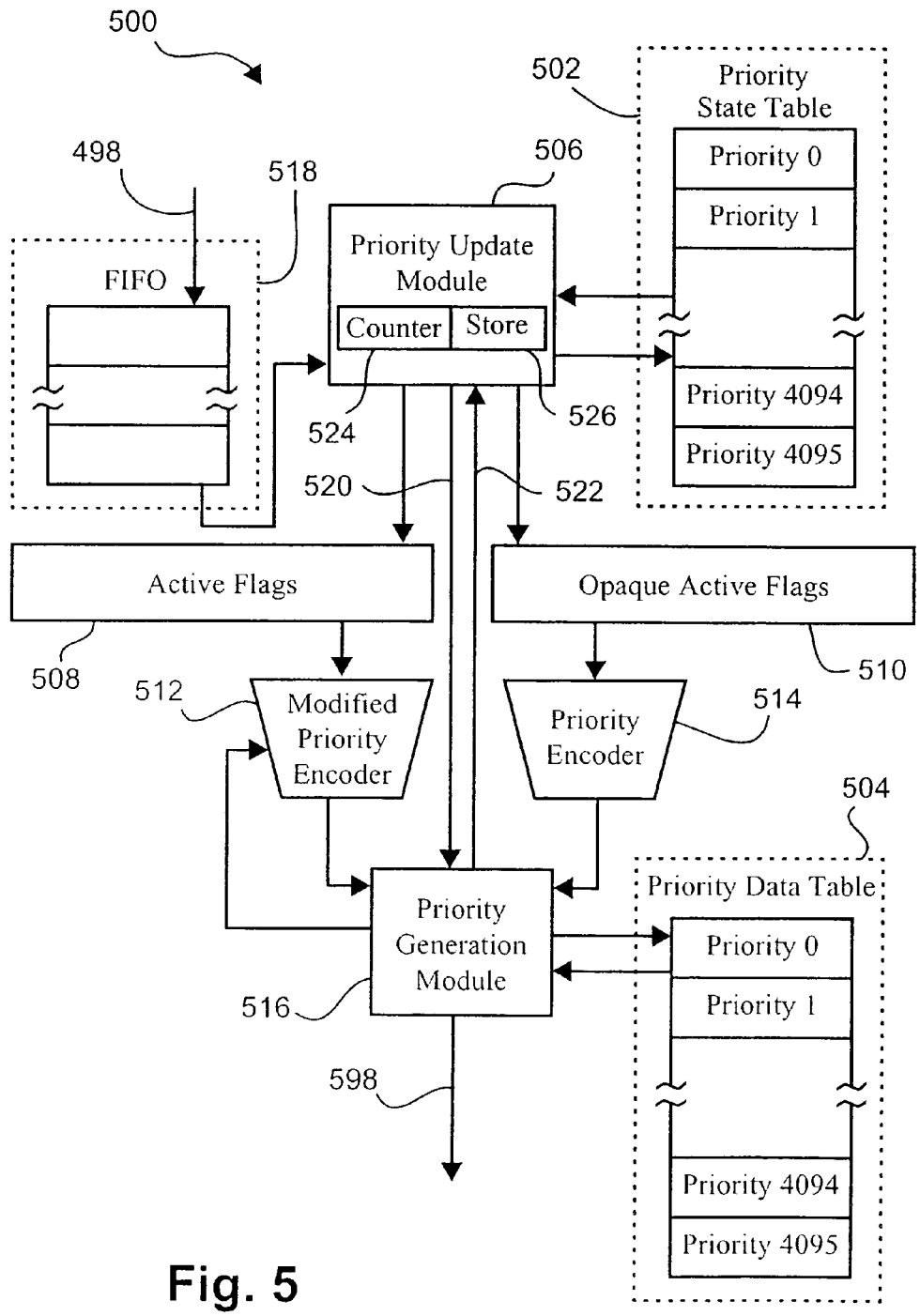
FIG. 5 is a schematic functional representation of the Priority Determination Module 500 of FIG. 3.

The operation of the Priority Determination Module 500 will now be described with reference to FIG. 5. The primary function of the Priority Determination Module 500 is to determine those objects that make a contribution to a pixel currently being scanned, order those contributing objects in accordance with their priority levels, and generate color composite messages for instructing the Pixel Compositing Module 700 to composite the ordered objects to generate the required color and opacity for the current pixel.

The Priority Determination Module 500 receives incoming messages 498 from the Edge Processing Module 400. These incoming messages may include load priority data messages, load fill data messages, edge crossing messages, and end of scan line messages. These messages first pass through a first-in first-out (FIFO) buffer 518 before being read by a priority update module 506. The FIFO 518 acts to de-couple the operation of the Edge Processing Module 400 and the Priority Determination Module 500. Preferably the FIFO 518 is sized to enable the receipt from the Edge Processing Module 400 and transfer of a full scan line of edge-crossings in a single action. Such permits the Priority Determination Module 500 to correctly handle multiple edge-crossings at the same pixel (X) location.

The Priority Determination Module 500 is also adapted to access a priority state table 502, and a priority data table 504. These tables are used to hold information about each priority. Preferably, the priority state and priority data tables 502, 504 are combined in memory as a single level activation table 530, as shown in FIG. 18. Alternatively these tables 502, 504 can be kept separate.

Preferably, the priority properties and status table 34 includes at least the following fields as shown in FIG. 18 for each priority level:

(i) a fill-rule flag (FILL_RULE_IS_ODD_EVEN) which indicates whether this priority is to have its inside versus outside state determined by the application of the odd-even fill rule or the non-zero winding fill rule;

(ii) a fill counter (FILL COUNT) for storing a current fill count which is modified in a manner indicated by the fill rule each time an edge effecting this priority is crossed;

(iii) a clipper flag (CLIPPER) which indicates whether this priority is to be used for clipping or filling;

(iv) a clip type flag (CLISP_OUT) which, for edges which have the clipper flag set, records whether the clipping type is a "clip-in" or a "clip-out";

(v) a clip counter (CLIP COUNT) for storing a current clip count which is decremented and incremented when a clip-in type clip region effecting this priority is entered and exited respectively, and incremented and decremented when a clip-out type clip region effecting this priority is entered and exited respectively; and (vi) a flag (NEED_BELOW) which records whether this priority requires levels beneath it to be calculated first, referred to as the "seed-below" flag.

(vii) a fill table address. (FILL INDEX), which point to an address where the fill of the priority is stored;

(viii) a fill type (FILL TYPE), (ix) a raster operation code (COLOR_OP), (x) an alpha channel operation code (ALPHA_OP) consisting of three flags (LAO_USE_D_OUT_S, LAO_USE_S OUT_D and LAO_USE_S_ROP_D), (xi) a stack operation code (STACK_OP), and (xii) a flag (X_INDEPENDENT) which records whether the color of this priority is constant for a given Y, referred to here as the "x-independent" flag; and (xiii) other information (ATTRIBUTES) of the priority.

Clipping objects are known in the art and act not to display a particular new object, but rather to modify the shape of another object in the image. Clipping objects can also be turned-on and turned-off to achieve a variety of visual effects. For example, the object 80 of FIG. 8A could be configured as a clipping object acting upon the object 90 to remove that portion of the object 90 that lies beneath the clipping object 80. This may have the effect of revealing any object or image beneath the object 90 and within the clipping boundaries that would otherwise be obscured by the opacity of the object 90. The CLIPPER flag is used to identify whether the priority is a clipping object. Also, the CLISP flag is used to determine whether the priority is a clip-in or a clip-out, and the CLIP COUNT is used in a similar fashion to FILL COUNT to determine whether the current pixel is within the clip region.

FIGS. 13A and 13B demonstrate the application of the odd-even and non-zero winding rules, for activating objects. The relevant rule to be used is determined by means of the fill-rule flag FILL_RULE_IS_ODD_EVEN.

For the purposes of the non-zero winding rule, FIG. 13A illustrates how the edges 71 and 72 of an object 70 are allocated a notional direction, according to whether the edges are downwards-heading or upwards-heading respectively. In order to form a closed boundary, edges link nose-to-tail around the boundary. The direction given to an edge for the purposes of the fill-rule (applied and described later) is independent of the order in which the segments are defined. Edge segments are defined in the order in which they are tracked, corresponding to the rendering direction.

FIG. 13B shows a single object (a pentagram) having two downwards-heading edges 73 and 76, and three upwards-heading edges 74, 75 and 77. The odd-even rule operates by simply toggling a Boolean value in the FILL COUNT as each edge is crossed by the scan line in question, thus effectively turning-on (activating) or turning-off (de-activating) an object's color. The non-zero winding rule increments and decrements a value stored in the fill counter FILL COUNT dependent upon the direction of an edge being crossed. In FIG. 13B, the first two edges 73 and 76 encountered at the scan line are downwards-heading and thus traversal of those edge increment the fill counter, to +1 and +2 respectively. The next two edges 74 and 77 encountered by the scan line are upwards-heading and accordingly decrement the fill counter FILL COUNT, to +1 and 0 respectively. The non-zero winding rule operates by turning-on (activating) an object's color when the fill counter FILL COUNT is non-zero, and turning-off (de-activating) the object's color when the fill counter FILL COUNT is zero.

The NEED_BELOW flag for a priority is established by the driver software and is used to inform the pixel generating system that any active priorities beneath the priority in question do not contribute to the pixel value being rendered, unless the flag is set. The flag is cleared where appropriate to prevent extra compositing operations that would otherwise contribute nothing to the final pixel value.

The raster operation code (COLOR_OP), alpha channel operation (ALPHA_OP) and stack operation (STACK_OP) together form the pixel operation (PIXEL_OP), that is to be performed by the Pixel Compositing Module 700 on each pixel where the priority is active and exposed.

Preferably, most of the information contained in the combined table 34 is directly loaded by instructions from the driver software. In particular, the fill-rule flag, the clipper flag, the clip type flag, and the need-below flag, fill table address, fill type, raster operation, code, alpha channel operation code, stack operation code, x_independent flag, and other attributes may be handled in this manner. On the other hand, the fill counter, and clip counter are initially zero and are changed by the Priority Determination Module 500 in response to edge crossing messages.

The Priority Determination Module 500 determines that a priority is active at a pixel if the pixel is inside the boundary edges which apply to the priority, according to the fill-rule for that priority, and the clip count for the priority. A priority is exposed if it is the uppermost active priority, or if all the active priorities above it have their corresponding need-below flags set. In this fashion, pixel values may be generated using only the fill data of the exposed priorities. It is important to note that an object's priority designates the level location of the object in the z-order of the objects from the rearmost object to the foremost object. Preferably, a number of non-overlapping objects that have the same fill and compositing operation, and that form a contiguous sequence, may be designated as having the same priority. This effectively saves memory space in the fill table. Furthermore, the corresponding edge records of objects need only reference the corresponding priority in order to reference the corresponding fill and compositing operation.

Returning now to FIG. 5, the priority update module 506 maintains a counter 524 which records the scan line intersection coordinate up to which it has completed processing. This will be referred to as the current X of the priority update module 506. The initial value at the start of a scan line is zero.

Upon examining an edge crossing message received at the head of the FIFO 518, the priority update module 506 compares the X intersection value in the edge crossing message with its current X. If the X intersection value in the edge crossing message is less than or equal to the current X, the priority update module 506 processes the edge crossing message. Edge crossing message processing comes in two forms. Normal edge processing" (described below) is used when the record in the priority state table 502 indicated by the priority in the edge crossing message has a clipper flag which indicates that this is not a clip priority. Otherwise, "clip edge processing" (described below) is performed.

"Normal edge processing" includes, for each priority in the edge crossing message and with reference to fields of the record of combined table 34 indicated by that priority, the steps of:
  (i) noting the current fill count of the current priority;
  (ii) either:
    (a) if the fill rule of the current priority is odd-even, setting the fill count to zero if it is currently non-zero, else setting it to any non-zero value, or
    (b) if the fill rule of the current priority is non-zero winding, incrementing or decrementing (depending on the edge direction flag) the fill count; and
  (iii) comparing the new fill count with the noted fill count and if one is zero and the other is non-zero performing an "active flag update" (described below) operation on the current priority.

Some arrangements may use a separate edge crossing message for each priority rather than placing a plurality of priorities in each edge crossing message.

An active flag update operation includes first establishing a new active flag for the current priority. The active flag is non-zero if the fill count for the priority in the priority state table 502 is non-zero and the clip count for the priority is zero, else the active flag is zero. The second step in the active flag update operation is to store the determined active flag in an active flags array 508 at the position indicated by the current priority, then if the need-below flag in the priority state table for the current priority is zero, also storing the active flag in an opaque active flags array 510 at the position indicated by the current priority.

"Clip edge processing" includes, with reference to fields of the priority state table record indicated by the first priority in the edge crossing message, the steps of:
  (i) noting the current fill count of the current priority;
  (ii) either:
    (a) if the fill rule of the current priority is odd-even, setting the fill count to zero if it is currently non-zero else setting it to any non-zero value, or
    (b) if the fill rule of the current priority is non-zero winding, incrementing or decrementing (depending on the edge direction flag) the fill count; and
  (iii) comparing the new fill count with the noted fill count and determining a clip delta value of:
    (a) zero, if both the new fill count is zero and the noted fill count is zero, or both the new fill count is non-zero and the noted fill count is non-zero,
    (b) plus one, if the clip type flag of the current priority is clip-out and the noted fill count is zero and the new fill count is non-zero, or the clip type flag of the current priority is clip-in and the noted fill count is non-zero and the new fill count is zero, or otherwise,
    (c) minus one; and
  (iv) for every subsequent priority after the first in the edge crossing message, add the determined clip delta value to the clip count in the record in the priority state stable indicated by that subsequent priority, and if the clip count either moved from non-zero to zero, or from zero to non-zero in that process, performing an active flag, update operation as described above on that subsequent priority. It should be noted that the initial value of each clip count is set by the LOAD_PRIORITY_PROPERTIES instruction described previously. The clip count is typically initialised to the number of clip-in priorities, which affect each priority.

Some arrangements do not associate a priority with a clip, but instead directly increment and decrement the clip count of all priorities given in the edge crossing message. This technique can be used, for example, when clip shapes are simple and do not require the application of a complex fill rule. In this specific application, the clip count of the level controlled by an edge is incremented for an upwards heading edge or decremented for a downwards heading edge. A simple closed curve, described anticlockwise, acts a clip-in, whereas a simple closed curve, described clockwise, acts as a clip-out.

When the X intersection value in the edge crossing message is greater than the current X of the priority update module 506, the priority update module 506 forms a count of how many pixels to generate, being the difference between the X intersection value in the edge crossing message and the current X, this count is formatted into a priority generation message, which is sent via a connection 520 to a priority generation module 516. The priority update module 506 then waits for a signal 522 from the priority generation module 516 indicating that processing for the given number of pixels has completed. Upon receipt of the signal 522, the priority update module 506 sets its current X to the X intersection value in the edge crossing message and continues processing as described above.

Upon receipt of a priority generation message 520, the priority generation module 516 performs a "pixel priority generation operation" (described below) a number of times indicated by the count it has been supplied, thereupon it signals 522 the priority update module 506 that it has completed the operation.

Each pixel priority generation operation includes firstly using a priority encoder 514 (eg. a 4096 to 12 bit priority encoder) on the opaque active flags array 510 to determine the priority number of the highest opaque active flag. This priority (if any) is used to index the priority data table 504 and the contents of the record so referenced is formed into a fill priority message output 598 from the priority generation module 516 and sent to the Pixel Generation Module 600. Further, if a priority was determined by the previous step (ie. there was at least one opaque active flag set), the determined priority is held, and is referred to as the "current priority". If no priority was determined the current priority is set to zero. The priority generation module 516 then repeatedly uses a modified priority encoder 512 on the active flag array 508 to determine the lowest active flag which is greater than the current priority. The priority so determined (if any) is used to index the level activation table 530 and the contents of the record so referenced is formed into a fill priority message. This fill priority message is then sent via the output 598 to the Pixel Generation Module 600, where the determined priority is used to update the current priority. This step is used repeatedly until there is no priority determined (that is, there is no priority flagged in the active flags, which is greater than the current priority). Then the priority generation module 516 forms an end of pixel message which is transferred to the Pixel Generation Module 600. The Priority Determination Module 500 then proceeds to the next pixel to generate another series of fill priority messages in similar fashion.

Figure 22A:
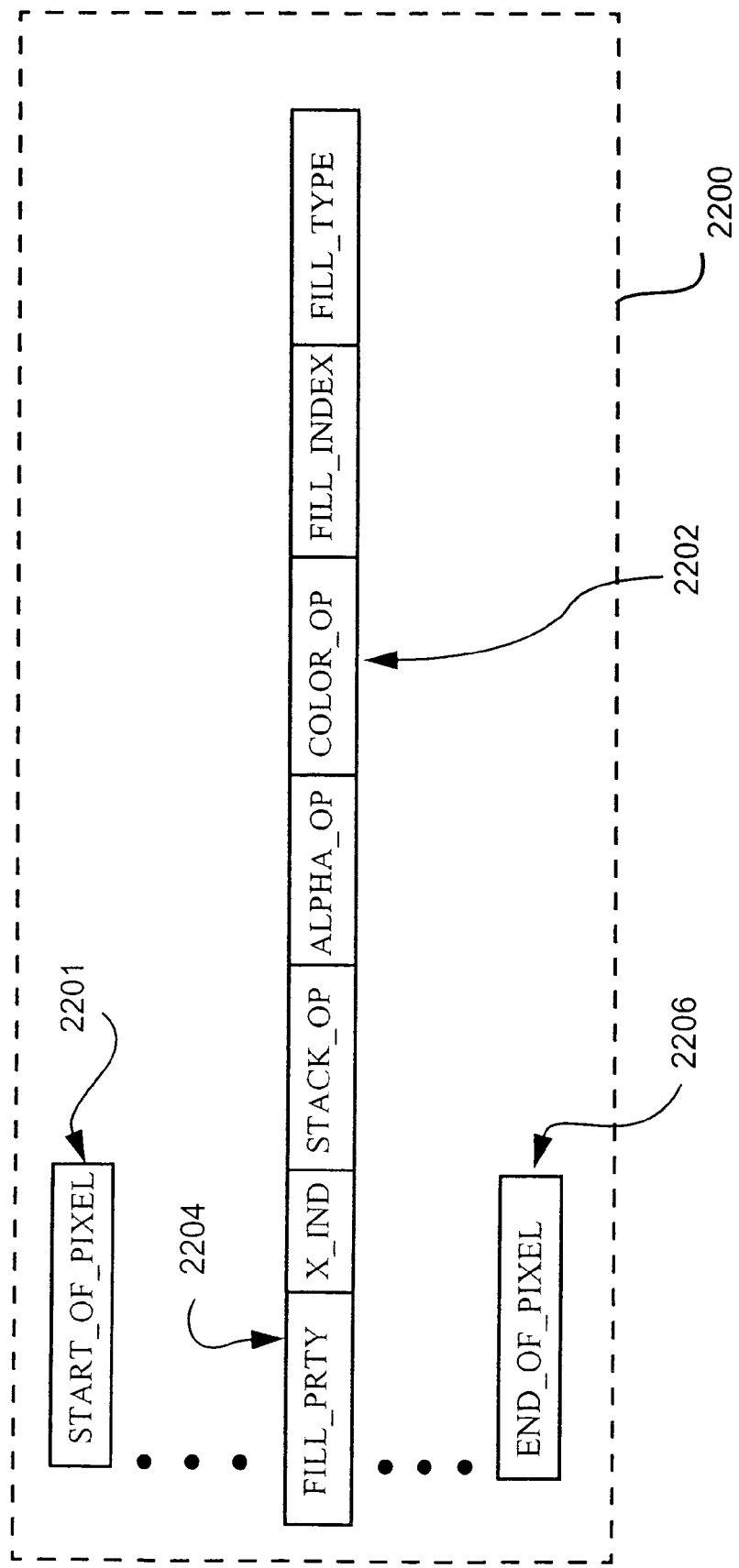
FIG. 22A shows a series of fill priority messages generated by the Priority Determination Module 500.

Turning now to FIG. 22A, there is shown an example of such a series of fill priority messages 2200 generated by the Priority Determination Module 500 for a single current pixel. As described above, these fill priority messages 2202 are first preceded by a START_OF_PIXEL command 2201. The fill priority messages 2202 are then sent in priority order commencing with the lowest exposed active priority level. When there are no more fill priority messages 2202 for the current pixel, the Priority Determination Module 500 then sends an END_OF_PIXEL message 2206.

Each of one these fill priority messages 2202 preferably includes at least the following fields:

(i) An identifier code FILL_PRTY 2204 for identifying the message as a fill priority message. This code also includes an index LEVEL_INDX to the corresponding record in the level activation table 530, and also a code FIRST_PIXEL indicating whether or not this fill priority message belongs to a first pixel in a run of pixels having the same fill priority messages. The Priority Determination Module 500 asserts the FIRST_PIXEL code for all those fill priority messages of a currently scanned pixel that is intersected by an edge as indicated by the edge crossing messages. The FIRST_PIXEL code is de-asserted for all fill priority messages of a currently scanned pixel if there is no edges intersecting that pixel as indicated by the edge crossing messages.

(ii) A fill table address FILL_INDEX, (iii) A fill type FILL_TYPE, (iv) A raster operation code COLOR_OP, (v) An alpha channel operation code Alpha_OP, (vi) A stack operation code STACK_OP, and (vii) A flag X_IND which records whether the color of this priority is constant for a given Y, referred to here as the "x-independent" flag. This flag is asserted when the color for this priority is constant.

The values of fields (ii) to (vii) for the fill priority message are retrieved from the corresponding record in the combined table 34.

Preferably, the priority generation module 516 notes the value of the x-independent flag of each fill priority message that it forwards to the Pixel Generation Module 600 while it processes the first pixel of a sequence. If all the forwarded messages have the x-independent flag specified, all subsequent messages in the span of pixels between adjacent edge intersections can be replaced by a single repeat specification of count minus one. This is done by producing a repeat message which is sent to the Pixel Generation Module 600 in place of all further processing in this sequence. It will be appreciated that if all the fill priority messages of a first pixel in a span of pixels between adjacent edges have their x-independent flag asserted, then the color and opacity of the pixels in the span of pixels will be constant. Thus in these cases, the Pixel Compositing Module 700 need only composite the first pixel in the span of pixels to generate the required constant color and opacity and pass this onto the Pixel Output Module 800. The generated repeat command is then passed to the Pixel Output Module 800 which reproduces the constant color and opacity for the subsequent pixels in the span of pixels from the color and opacity of the first pixel. In this fashion, the number of compositing operations performed by the Pixel Compositing Module 700 is reduced.

As another preferred feature to the basic operation described above, the priority generation module 516 sends the highest opaque priority via the connection 522 to the priority update module 506 after each edge crossing message. The priority update module 506 holds this in a store 526. The Priority Determination Module 500, 506 then, instead of a simple test that the X intersection in the message is greater than the current X, performs a test that the X intersection in the message is greater than the current X and that at least one of the levels in the message is greater than or equal to the highest opaque priority, before producing a fill priority message. By doing this, fewer pixel priority determination operations may be done and longer repeat sequences may be generated.

Figure 9B:
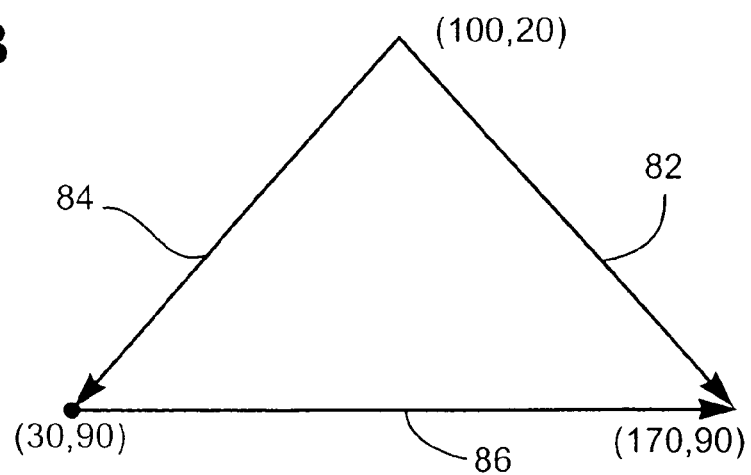

Using the example of the graphic objects shown in FIGS. 5A, 9A and 9B, the priority update process described above can be illustrated, for scan line 35 using the edge crossings seen from FIGS. 12C to 12J, as seen in FIGS. 15A to 15E.

FIGS. 15A to 15E illustrate operation of the priority tables 502 and 504 which, in a preferred implementation are merged into a single table (see FIG. 18), referred to as the level activation table (LAT) 530 and which is depicted together with arrays 508, 510 and encoders 512 and 514.

Figure 15A:
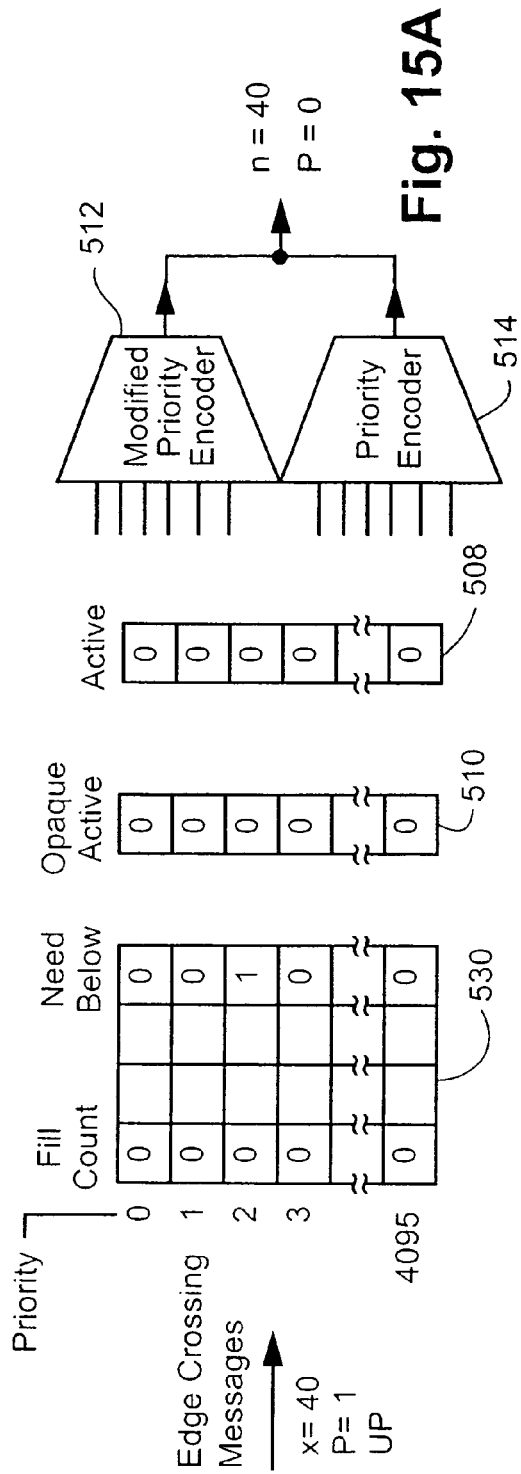

As seen in FIG. 15A, edge crossing messages are received in order for a scan line from the Edge Processing Module 400 and are loaded into the table 530, which is arranged in priority order. The edge crossing messages include, in this example, an incrementing direction according to the non-zero winding rule of the edge traversal. It is possible for no entries in the level activation table 530 to be set.

The level activation table 530 includes column entries for fill count, which are determined from the edge according to the non-zero winding rule or, where appropriate, the odd-even rule. The need-below flag is a property of a priority and is set as part of the LOAD_PRIORITIES_PROPERTIES instruction. The need-below is set for all priority levels when the table 530 is loaded. Other columns such as "clip count" and "fill index table" may be used, but for this example are omitted for simplicity of explanation. Where no level is active the corresponding entries are set to zero. Further, the values of the arrays 510 and 508 are updated from the table 530 after receiving a subsequent edge crossing.

From FIG. 15A, it will be apparent that, for convenience, a number of records have been omitted for clarity. As described previously, the contents of the table 530, where not used in the Priority Determination Module 500, are passed as messages to each of the Pixel Generation Module 600 for pixel generation, and to the Pixel Compositing Module 700 for compositing operations.

The first edge crossing for scan line 35 (FIG. 12E) is seen in FIG. 15A where for P=1, the fill count is updated to the value of the edge according to the non-zero winding rule. The "need-below" flag for this level has been set to zero by the driver software as the object in question is opaque.

Because a previous state of the table 530 was not set, the arrays 510 and 508 remain not set and the priority encoder 514 is disabled from outputting a priority. This is interpreted by priority generation module 516 which outputs a count n=40 (pixels) for a "no object" priority (eg: P=0), being the first, blank, portion of the scan line 35.

Figure 15B:
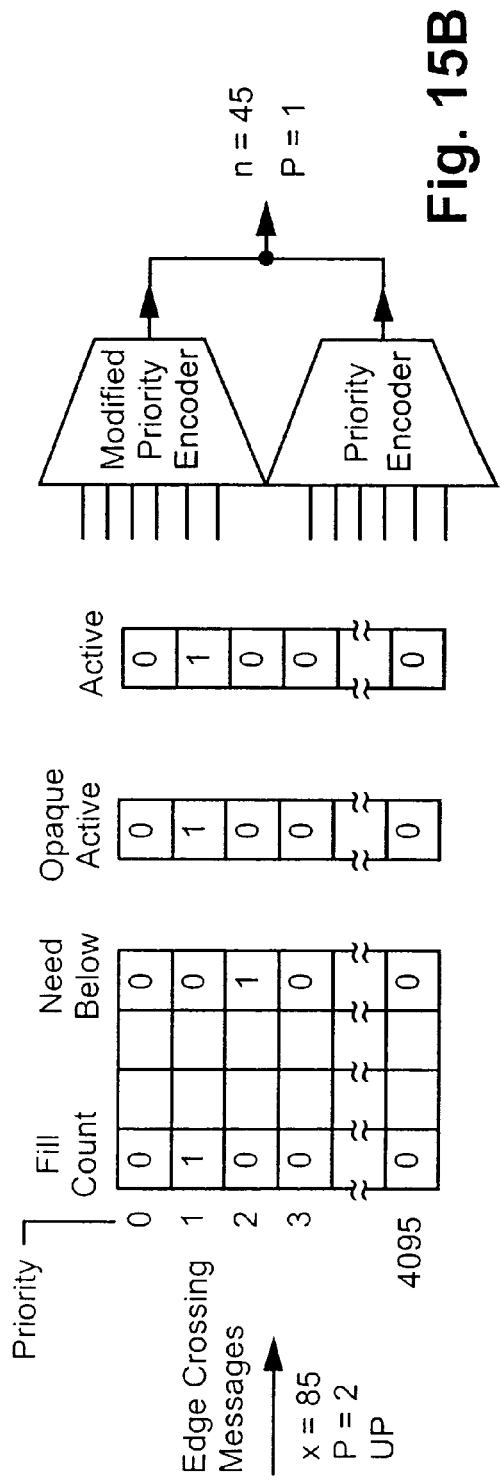

FIG. 15B shows the arrangement when the edge crossing of FIG. 12F is received. The fill count is updated. The arrays 510 and 508 are then set with the previous highest level from the table 530. At this time, the module 516 outputs a count n=45, P=1 representing the edge 96 of the opaque red object 90 before intersection with the semitransparent triangle 80.

FIG. 15C shows the arrangement when the edge crossing of FIG. 12G is received. Note that the fill count has been adjusted downwardly because of the non-zero winding rule. Because the object that is valid prior to receiving the current edge crossing is not opaque, the modified priority encoder 512 is used to select the priority P=2 as the highest active level which is output as is current for n=(115−85)=30 pixels.

FIG. 15D shows the arrangement when the edge crossing of FIG. 12H is received. Note that previously changed "need-below" for P=2 has been transferred to the active array 508, thus permitting the priority encoder to output a value P=1 current for n=(160−115)=45 pixels.

Figure 15E:
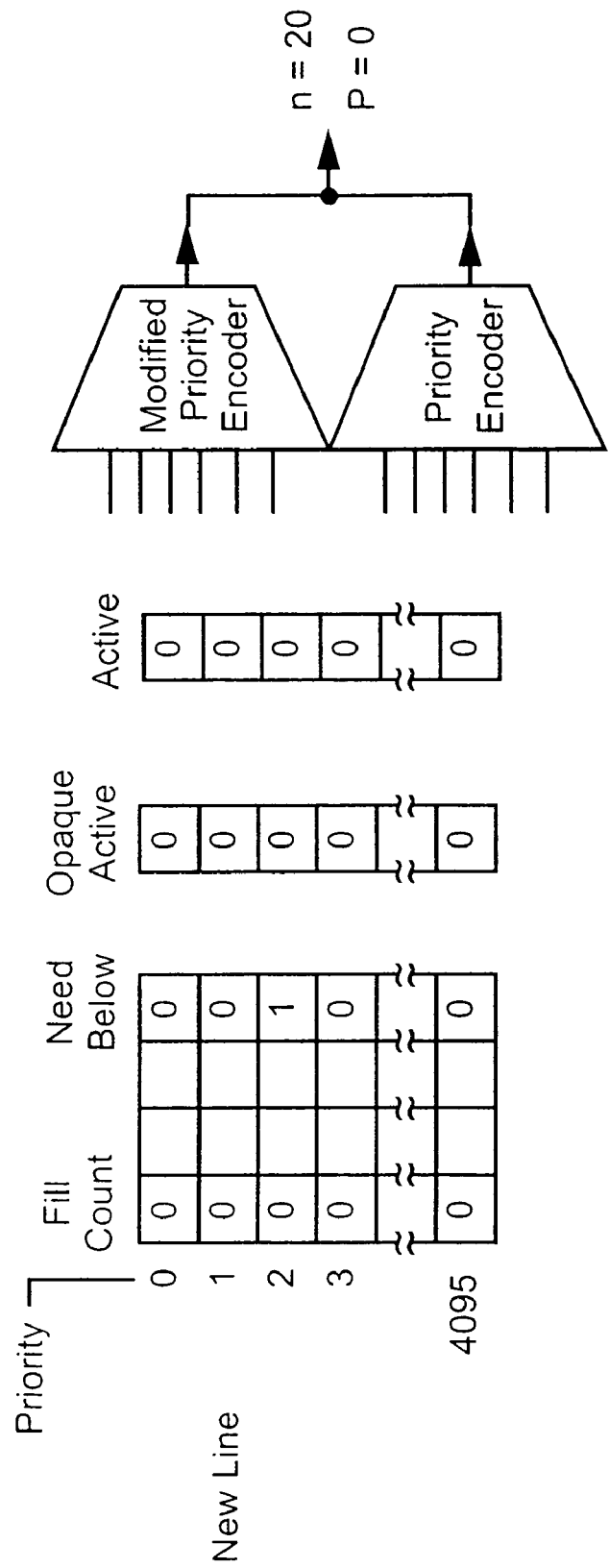

FIG. 15E shows the result when the edge crossing of FIG. 12I is received, providing for an output of P=0 for n=(180−160)=20 pixels.

As such, the priority module 500 outputs counts of pixels and corresponding priority display values for all pixels of a scan line.

3.4 Pixel Generation Module

The next module in the processing pipeline 22 is the Pixel Generation Module 600, which may alternatively referred to as the fill color determination module, the operation of which will now be described With reference to FIG. 6. Incoming messages 598 from the Priority Determination Module 500, which include set fill data messages, repeat messages, fill priority messages, end of pixel messages, and end of scan line messages, first pass to a fill lookup and control module 604. The fill lookup and control module 604 maintains a current X position counter 614 and a current Y position counter 616 for use by various components of the Pixel Generation Module 600.

Upon receipt of an end of scan line message, the fill lookup and control module 604 resets the current X counter 614 to zero and increments the current Y counter 616. The end of scan line message is then passed to the Pixel Compositing Module 700.

Upon receipt of a set fill data message, the fill lookup and control module 604 stores the data in the specified location 602 of the fill data table 36.

Upon receipt of a repeat message, the fill lookup and control module 604 increments the current X counter 614 by the count from the repeat message. The repeat message is then passed to the Pixel Compositing Module 700.

Upon receipt of an end of pixel message 2202, the fill lookup and control module 604 again increments the current X counter 614, and the end of pixel message is then passed to the Pixel Compositing Module 700.

Upon receipt of a fill priority message, the fill lookup and control module 604 performs operations which include.

(i) the fill type from the fill priority message is used to select a record size in the fill data table 36;

(ii) the fill table address from the fill priority message, and the record size as determined above, is used to select a record from the fill data table 36;

(iii) the fill type from the fill priority message is used to determine and select a sub-module to perform generation of the fill color. The sub-modules may include a raster image module 606, a flat color module 608, a linearly ramped color module 610, and an opacity tile module 612;

(iv) the determined record is supplied to the selected sub-module 606-612;

(v) the selected sub-module 606-612 uses the supplied data to determine a color and opacity value;

(vi) the determined color and opacity is combined with remaining information from the fill color message, namely the raster operation code, the alpha channel operation code, the stack operation code, to form a color composite message 2208, which is sent to the Pixel Compositing Module 700 via the connection 698.

Figure 22B:
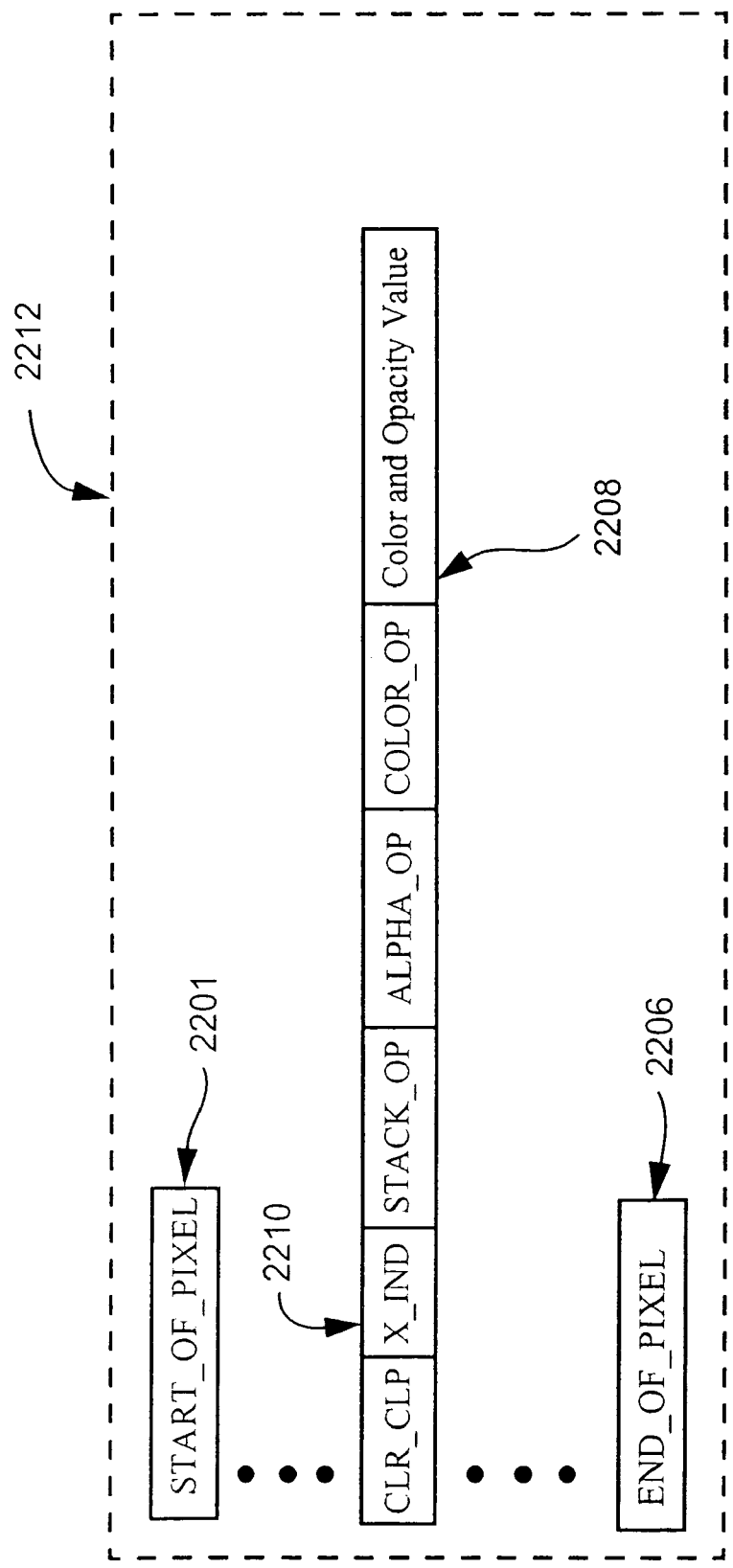
FIG. 22B shows a series of color composite messages generated by the Pixel Generation Module 600.

Thus, a message sequence 2200 of FIG. 22A staring with a start of pixel message 2201 message, then fill priority messages 2202 followed by an end of pixel message 2206 is transformed into a message sequence 2212 of FIG. 22B comprising a start of pixel message 2201, color composite messages 2208 followed by an end of pixel message 2206. These color composite messages 2202 preferably includes the same fields as the fill priority messages 2202, with the following exceptions:

(i) code CLR_CMP 2210 for identifying the message as a color composite message. This CLR_CMP code also includes the index to the corresponding record in the level activation table 530;

(ii) a color and opacity field for containing the color and opacity value of the priority. The latter replaces the fill index and fill type fields of the fill priority messages; and In the preferred arrangement, the determined color and opacity is a red, green, blue and opacity quadruple with 8-bit precision in the usual manner giving 32 bits per pixel. However, a cyan, magenta, yellow and black quadruple with an implied opacity, or one of many other known color representations may alternatively be used. The red, green, blue and opacity case is used in the description below, but the description may also be applied to other cases.

The operation of the raster image module 606, the flat color module 608, the linearly ramped color module 610, and the opacity tile module 612 will now be described.

The flat color module 608 interprets the supplied record as a fixed format record containing three 8-bit color components (typically interpreted as red, green and blue components) and an 8-bit opacity value (typically interpreted as a measure of the fraction of a pixel which is covered by the specified color, where 0 means no coverage, that is complete transparency, and 255 means complete coverage, that is, completely opaque). This color and opacity value is output directly via the connection 698 and forms the determined color and opacity without further processing.

The linearly ramped color module 610 interprets the supplied record as a fixed format record containing four sets of three constants, cx, cy, and d, being associated with the three color and one opacity components. For each of these four sets, a result value r is computed by combining the three constants with the current X count, x, and the current Y count, y, using the formula:

$$r = \text{clamp}(cx*x + cy*y + d)$$

Where the function "clamp" is defined as:

$$\text{clamp}(x) = \begin{cases} 255 & 255 < x \\ \lfloor x \rfloor & 0 <= x <= 255 \\ 0 & x < 0 \end{cases}$$

The four results so produced are formed into a color and opacity value. This color and opacity value is output directly via the connection 698 and forms the determined color and opacity without further processing.

The opacity tile module 612 interprets the supplied record as a fixed format record containing three 8-bit color components, an 8-bit opacity value, an integer X phase, (px), a Y phase, (py), an X scale, (sx), a Y scale, (sy), and a 64 bit mask. These values originate in the display list generation and contained typically in the original page description. A bit address, a, in the bit mask, is determined by the formula:

$$a = ((x/2^{sx} + px) \bmod 8) + ((y/2^{sy} + py) \bmod 8) \times 8$$

The bit at the address "a" in the bit mask is examined. If the examined bit is one, the color and opacity from the record is copied directly to the output of the module 612 and forms the determined color and opacity. If the examined bit is zero, a color having three zero component values and a zero opacity value is formed and output as the determined color and opacity.

The raster image module 606 interprets the supplied record as a fixed format record containing six constants, a, b, c, d, tx, and ty; an integer count of the number of bits (bp1) in each raster line of the raster image pixel data 16 to be sampled; and a pixel type. The pixel type indicates whether the pixel data 16 in the raster image pixel data is to be interpreted as one of:

(i) one bit per pixel black and white opaque pixels;
(ii) one bit per pixel opaque black or transparent pixels;
(iii) 8 bits per pixel grey scale opaque pixels;
(iv) 8 bits per pixel black opacity scale pixels;
(v) 24 bits per pixel opaque three color component pixels; or
(vi) 32 bits per pixel three color component plus opacity pixels.

Many other formats are possible.

The raster image module 606 uses the pixel type indicator to determine a pixel size (bpp) in bits. Then a bit address, a, in the raster image pixel data 16 is calculated having the formula:

$$a = bpp * \lfloor a*x + c*y + tx \rfloor + bp1 * \lfloor b*x + d*y + ty \rfloor$$

A pixel interpreted according to the pixel type from the record 602 is fetched from the calculated address "a" in the raster image pixel data 16. The pixel is expanded as necessary to have three eight bit color components and an eight bit opacity component. By "expanded", it is meant for example, that a pixel from an eight bit per pixel grey scale opaque raster image would have the sampled eight bit value applied to each of the red, green and blue component, and the opacity component set to fully opaque. This then forms the determined color and opacity output 698 to the Pixel Compositing Module 700.

As a consequence, the raster pixel data valid within a displayable object is obtained through the determination of a mapping to the pixel image data within the memory 16. This effectively implements an affine transform of the raster pixel data into the object-based image and is more efficient than prior art methods which transfer pixel data from an image source to a frame store where compositing with graphic object may occur.

As a preferred feature to the above, interpolation between pixels in the raster image pixel data 16 may optionally be performed by first calculating intermediate results p, and q according to the formulae:

$$p = a*x + c*y + tx$$

$$q = b*x + d*y + ty$$

Next the bit addresses, a00, a01, a10, and a11, of four pixels in the raster image pixel data 16 are determined according to the formulae:

$$a00 = bpp * \lfloor p \rfloor + bp1 * \lfloor q \rfloor$$

$$a01 = a00 + bpp$$

$$a10 = a00 + bp1$$

$$a11 = a00 + bp1 + bpp$$

Next, a result pixel component value, r, is determined for each color and opacity component according to the formula:

$$r = \text{interp}(\text{interp}(\text{get}(a00), \text{get}(a01), p), \text{interp}(\text{get}(a10), \text{get}(a11), p), q)$$

where the function "interp" is defined as:

$$\text{interp}(a, b, c) = a + (b - a) * (c - \lfloor c \rfloor)$$

In the above equations, the representation $\lfloor value \rfloor$ = floor (value), where a floor operation involves discarding the fractional part of the value.

The get function returns the value of the current pixel component sampled from the raster image pixel data 16 at the given bit address. Note that for some components of some image types this can be an implied value.

As a preferred feature to the above, image tiling may optionally be performed by using x and y values in the above equations which are derived from the current X and Y counters 614, 616 by a modulus operation with a tile size read from the supplied record.

Many more such fill color generation sub-modules are possible.

3.5 Pixel Compositing Module

The operation of the Pixel Compositing Module 700 will now be described. The primary function of the Pixel Compositing Module is to composite the color and opacity of all those exposed object priorities that make an active contribution to the pixel currently being scanned.

Figure 21:
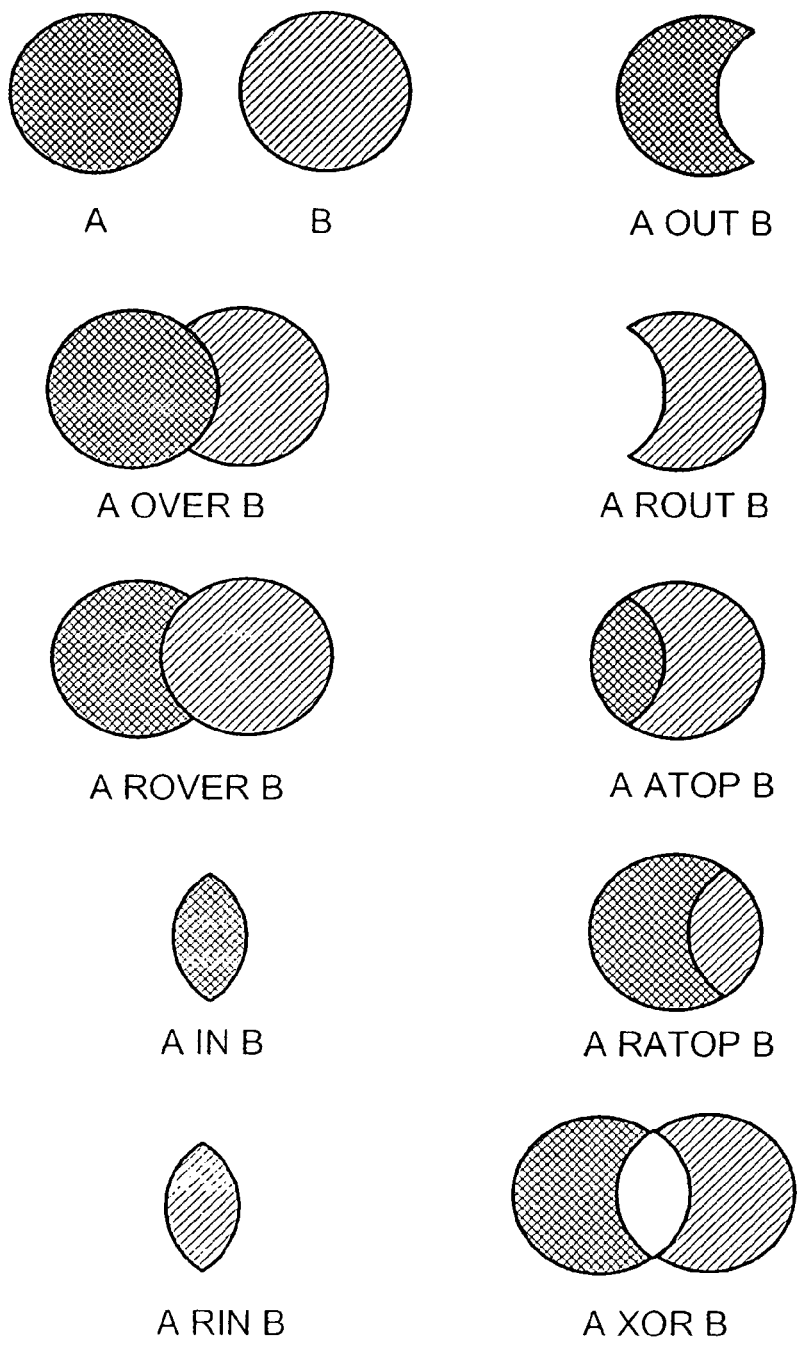
FIG. 21 depicts the result of a number of compositing operations.

Preferably, the Pixel Compositing Module 700 implements a modified form of the compositing approach as described in "Compositing Digital Images", Porter, T: Duff, T; Computer Graphics, Vol 18 No 3 (1984) pp 253-259 (hereafter "Porter & Duff"). Examples of Porter & Duff compositing operations are shown in FIG. 21. However, such an approach is deficient in that it only permits handling a source and destination color in the intersection region formed by the composite, and as a consequence is unable to accommodate the influence of transparency outside the intersecting region. The described arrangement overcomes this by effectively padding the objects with completely transparent pixels. Thus the entire area becomes in effect the intersecting region, and reliable Porter & Duff compositing operations can be performed. This padding is achieved at the driver software level where additional transparent object priorities are added to the combined table. These Porter & Duff compositing operations are implemented utilising appropriate color operations as will be described below in more detail with reference to FIGS. 20A, 20B, and 19.

Preferably, the images to be composited are based on expression trees. Expression trees, being directed acyclic graphs, are often used to describe the compositing operations required to form an image, and typically comprise a plurality of nodes including leaf nodes, unary nodes and binary nodes. A leaf node is the outermost node of an expression tree, has no descendent nodes and represents a primitive constituent of an image. Unary nodes represent an operation which modifies the pixel data coming out of the part of the tree below the unary operator. A binary node typically branches to left and right subtrees; wherein each subtree is itself is an expression tree comprising at least one leaf node. An example of an expression tree is shown in FIG. 17C. The expression tree shown in FIG. 17C comprises four leaf nodes representing three objects A, B, and C, and the page. The expression tree of FIG. 17C also comprises binary nodes representing the Porter & Duff OVER operation. Thus the expression tree represents an image where the object A is composited OVER the object B, the result of which is then composited OVER object C, and the result of which is then composited OVER the page.

Figure 17A:
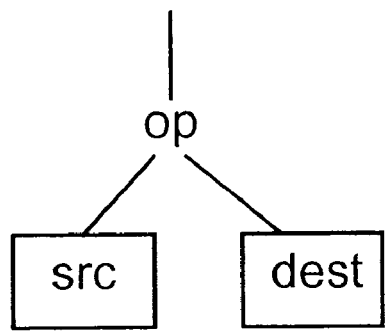
FIGS. 17A and 17B show a simple compositing expression illustrated as an expression tree and a corresponding depiction.
Figure 17B:
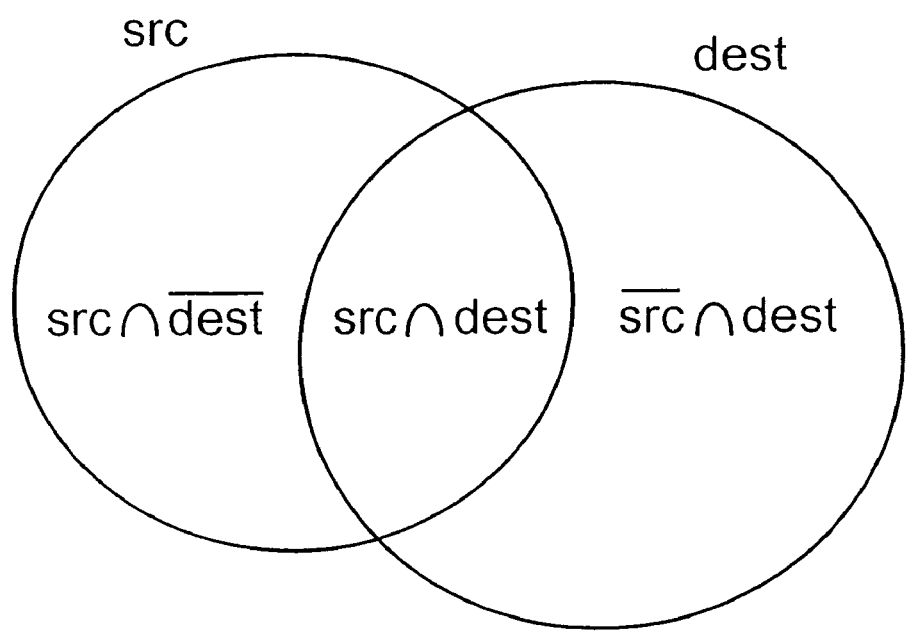
Figure 17C:
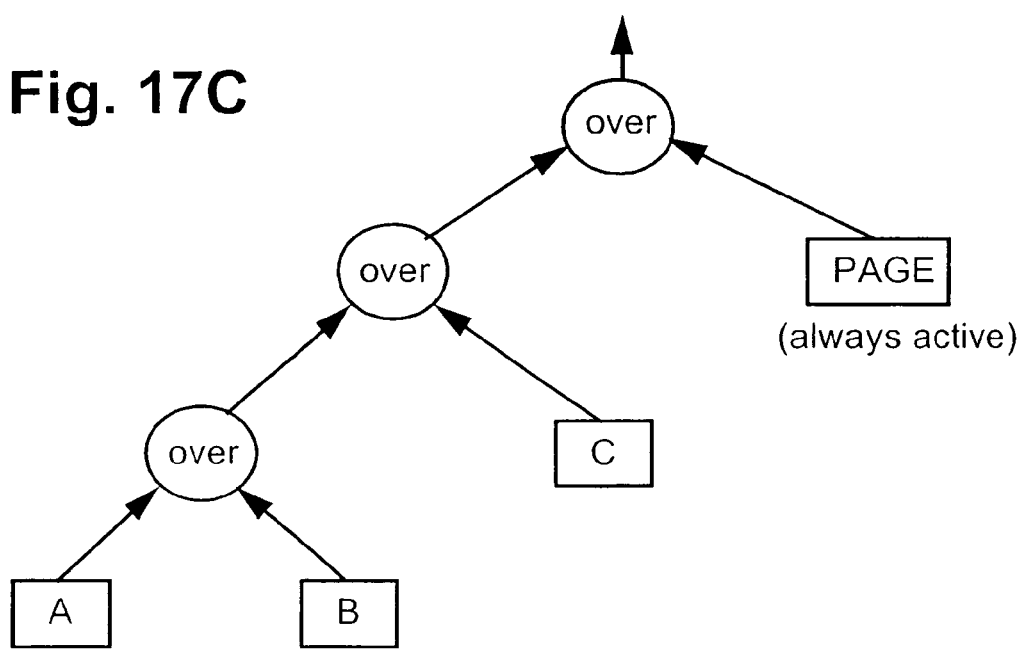
FIG. 17C shows an example of an expression tree.

Turning now to FIGS. 17A and 17B, there is shown a typical binary compositing operation in an expression tree. This binary operator operates on a source object (src) and a destination object (dest), where the source object src resides on the left branch and the destination object (dest) resides on the right branch of the expression tree. The binary operation is typically a Porter & Duff compositing operation. The area src∩dest represents the area on the page where the objects src and dest objects intersect (ie both active), the area $\overline{src}$∩dest where only the src object is active, and the area src∩$\overline{dest}$ where only the dest object is active.

The compositing operations of the expression tree are implemented by means of the pixel compositing stack 38, wherein the structure of the expression tree is implemented by means of appropriate stack operations on the pixel compositing stack 38.

3.5.1 Pixel Compositing Module

Figure 23:
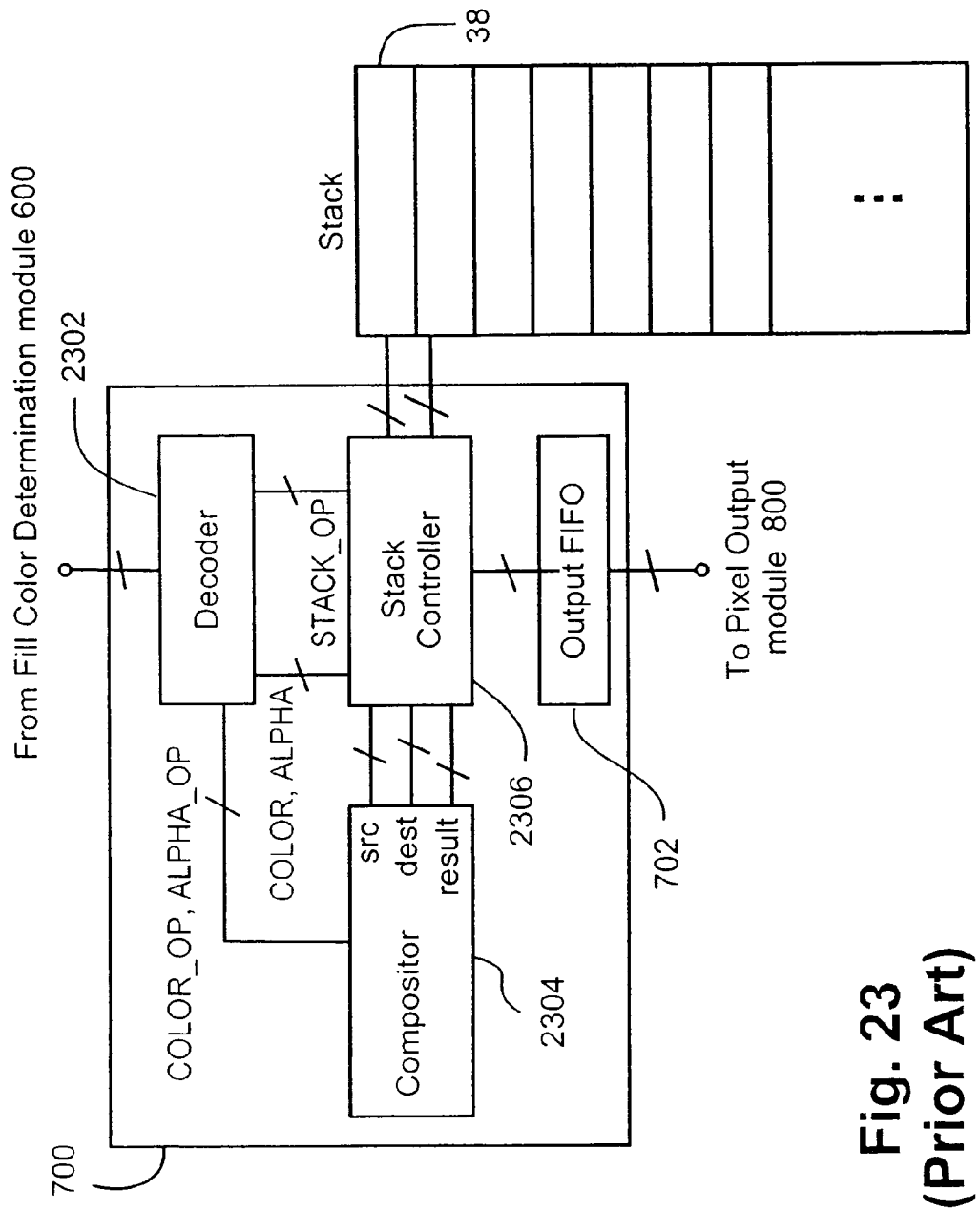
FIG. 23 is a schematic functional representation of the Pixel Compositing Module 700 of FIG. 3.

Turning now to FIG. 23, there is shown the Pixel Compositing Module 700 of FIG. 35A in more detail. The Pixel Compositing Module 700 receives incoming messages from the Pixel Generation Module 600. These incoming messages include repeat messages, series of color composite messages (see FIG. 22B), end of pixel messages, and end of scan line messages, and are processed in sequence.

The Pixel Compositing Module 700 includes a decoder 2302 for decoding these incoming messages, and a compositor 2303 for compositing the colors and opacities contained in the incoming color composite messages. Also included is a stack controller 2306 for placing the resultant colors and opacities on a stack 38, and an output FIFO 702 for storing the resultant color and opacity.

During the operation of the Pixel Compositing Module 700, the decoder 2302, upon the receipt of a color composite message, extracts the raster operation COLOR_OP and alpha channel operation codes ALPHA_OP and passes them to the compositor 2304. The decoder 2302 also extracts the stack operation STACK_OP and color and opacity values COLOR, ALPHA of the color composite message and passes them to the stack controller 2306. Typically, the pixel composing module 700 combines the color and opacity from the color composite message with a color and opacity popped from the pixel compositing stack 38 according to the raster operation and alpha channel operation from the color composite message. It then pushes the result back onto the pixel compositing stack 38. More generally, the stack controller 2306 forms a source (src) and destination (dest) color and opacity, according to the stack operation specified. If at this time, or during any pop operation from the pixel compositing stack, the pixel compositing stack 38 is found to be empty, an opaque white color value is used without any error indication These source and destination colors and opacity are then made available to the compositor 2304 which then performs the compositing operation in accordance with the COLOR_OP and ALPHA_OP codes. The resultant (result) color and opacity is then made available to the stack controller 2306, which stores the result on the stack 38 in accordance with the STACK_OP code. These stack operations are described below in more detail below.

During the operation of the Pixel Compositing Module 700, if the decoder 2302 receives an end of pixel message, it then instructs the stack controller 2306 to pop a color and opacity from the pixel compositing stack 38. If the stack 38 is empty an opaque white value is used. The resultant color and opacity is then formed into a pixel output message which is forwarded to the pixel output FIFO 702. If the decoder 2302 receives a repeat message or an end of scan line message, the decoder 2302 by-passes (not shown) the compositor 2304 and stack controller 2306 and forwards the messages to the pixel output FIFO 702 without further processing.

Figure 24A:
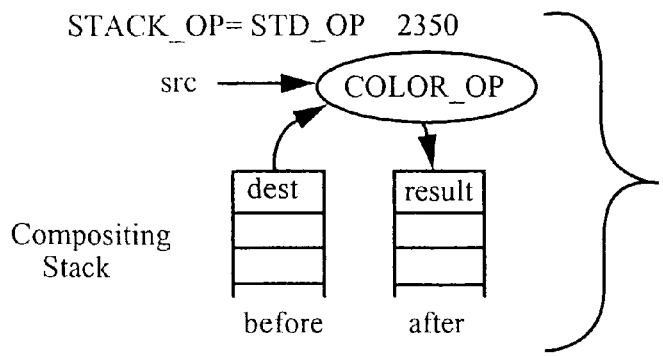
FIGS. 24A-24D show the operation performed on the stack for each of the various stack operation commands in the Pixel Compositing Module 700 of FIG. 3.

FIGS. 24A, B, C, and D show the operation performed on the pixel compositing stack 38 for each of the various stack operation commands STACK_OP in the color composite messages.

FIG. 24A shows the standard operation STD_OP 2350 on the pixel compositing stack 38, where the source color and opacity (src) are obtained from the color composite message, and the destination color and opacity (dest) is popped from the top of the pixel compositing stack 38. The result of the COLOR_OP operation performed by the compositor 2304 is pushed back onto the stack 38.

Figure 24B:
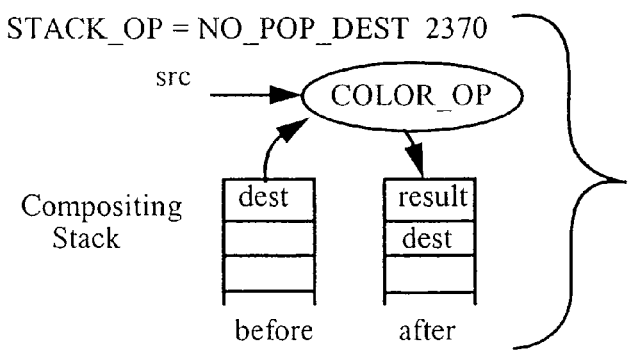

FIG. 24B shows the NO_POP_DEST stack operation 2370 on the pixel compositing stack 38. The source color and opacity (src) is taken from the value in a current composite message for the current operation, and the destination color and opacity (dest) is read from the top of the stack 38. The result of the COLOR_OP operation performed by the compositor 2304 is pushed onto the top of the stack 38.

Figure 24C:
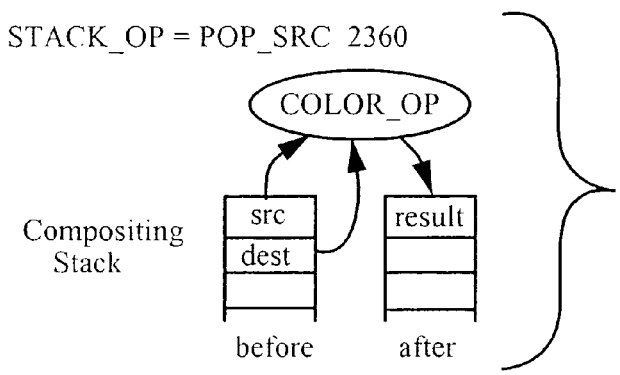

FIG. 24C shows the POP_SRC stack operation 2360, where the source color and opacity are popped from the top of the stack, and the destination color and opacity is popped from the next level down the stack. The result of the COLOR_OP operation performed by the compositor 2304 is pushed onto the top of the stack.

Figure 24D:
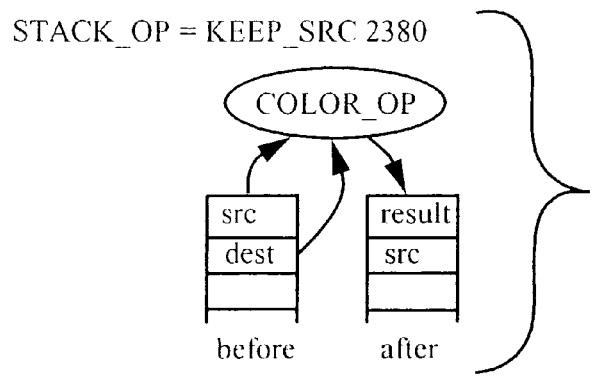

FIG. 24D shows the KEEP_SRC stack operation 2380, where the source color and opacity are popped from the top of the stack, and the destination color and opacity is popped from the next level down the stack. The result of the COLOR_OP operation performed by the compositor 2304 is pushed onto the top of the stack.

Other stack operations can be used.

Figure 7A:
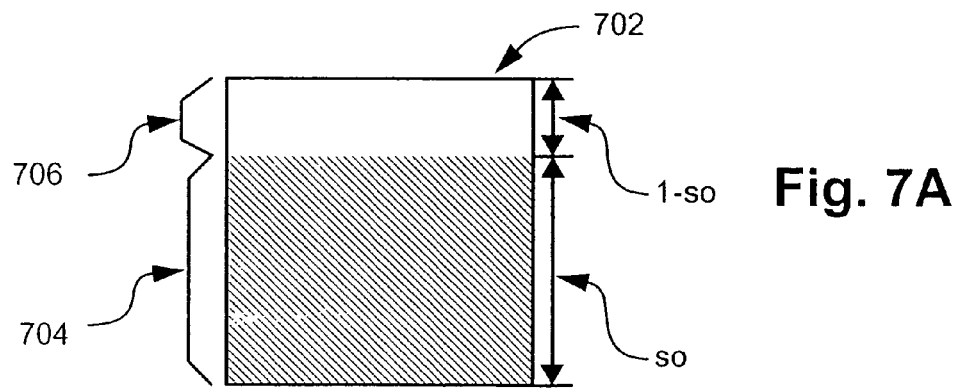
FIGS. 7A to 7C illustrate pixel combinations between source and destination.
Figure 7B:
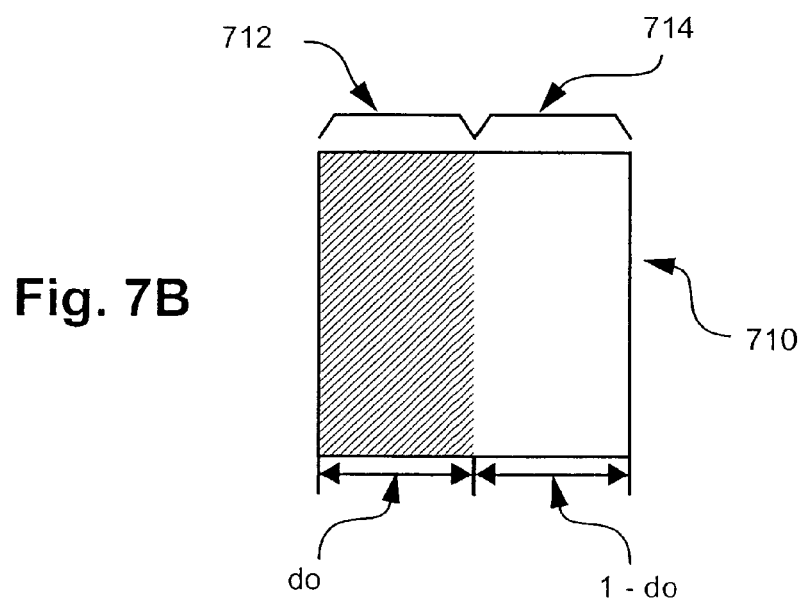
Figure 7C:
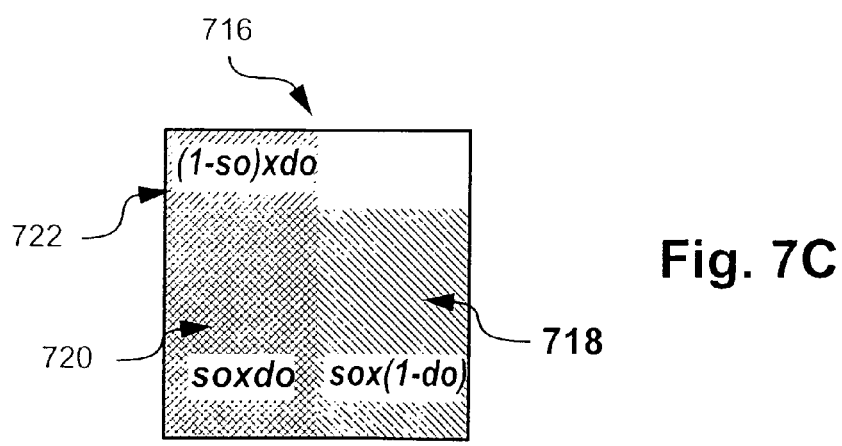

The manner in which the compositor 2304 combines the source (src) color and opacity with the destination (dest) color and opacity will now be described with reference to FIGS. 7A to 7C. For the purposes of this description, color and opacity values are considered to range from 0 to 1, (ie: normalised) although they are typically stored as 8-bit values in the range 0 to 255. For the purposes of compositing together two pixels, each pixel is regarded as being divided into two regions, one region being fully opaque and the other fully transparent, with the opacity value being an indication of the proportion of these two regions. FIG. 7A shows a source pixel 702 which has some three component color value not shown in the Figure and an opacity value, (so). The shaded region of the source pixel 702 represents the fully opaque portion 704 of the pixel 702. Similarly, the non-shaded region in FIG. 7A represents that proportion 706 of the source pixel 702 considered to be fully transparent. FIG. 71 shows a destination pixel 710 with some opacity value, (do). The shaded region of the destination pixel 710 represents the fully opaque portion 712 of the pixel 710. Similarly, the pixel 710 has a fully transparent portion 714. The opaque regions of the source pixel 702 and destination pixel 710 are, for the purposes of the combination, considered to be orthogonal to each other. The overlay 716 of these two pixels is shown in FIG. 7C. Three regions of interest exist, which include a source outside destination 718 which has an area of so*(1−do), a source intersect destination 720 which has an area of so*do, and a destination outside source 722 which has an area of (1−so)*do. The color value of each of these three regions is calculated conceptually independently. The source outside destination region 718 takes its color directly from the source color. The destination outside source region 722 takes its color directly from the destination color. The source intersect destination region 720 takes its color from a combination of the source and destination color.

The process of combining the source and destination color, as distinct from the other operations discussed above is termed a raster operation and is one of a set of functions as specified by the raster operation code from the pixel composite message. Some of the raster operations included in the described arrangement are shown in FIG. 19. Each function is applied to each pair of color components of the source and destination colors to obtain a like component in the resultant color. Many other functions are possible.

The alpha channel operation from the composite pixel message is also considered during the combination of the source and destination color. The alpha channel operation is performed using three flags LAO_USE_D_OUT_S, LAO_USE_S_OUT_D, LAO_USE_S_ROP_D, which respectively identify the regions of interest (1−so)*do, so* (1−do), and so*do in the overlay 716 of the source pixel 702 and the destination pixel 710. For each of the regions, a region opacity value is formed which is zero if the corresponding flag in the alpha channel operation is not set, else it is the area of the region.

The resultant opacity is formed from the sum of the region opacities. Each component of the result color is then formed by the sum of the products of each pair of region color and region opacity, divided by the resultant opacity.

As shown in FIG. 20, the Porter & Duff operations may be formed by suitable ALPHA_OP flag combinations and raster operators COLOR_OP, provided that both operands can be guaranteed to be active together. Because of the way the table is read, if only one of the operands is not active, then the operator will either not be performed, or will be performed with the wrong operand. Thus objects that are to be combined using Porter & Duff operations must be padded out with transparent pixels to an area that covers both objects in the operation. Other transparency operations may be formed in the same way as the Porter & Duff operations, using different binary operators as the COLOR_OP operation.

The resultant color and opacity is passed to the stack controller circuit and pushed onto the pixel compositing stack 38. However, if the stack operation is STACK_KEEP_SRC, the source value is pushed onto the stack before the result of the color composite message is pushed.

When an end of pixel message is encountered, the color and opacity value on top of the stack is formed into a pixel output message, and sent to the Pixel Output Module 800. Repeat pixel messages are passed through the Pixel Compositing Module 700 to the Pixel Output Module 800.

3.6 Pixel Output Module

The operation of the Pixel Output Module 800, seen in FIG. 3, will now be described. Incoming messages are read from the pixel output FIFO, which include pixel output messages, repeat messages, and end of scan line messages are processed in sequence.

Upon receipt of a pixel output message the Pixel Output Module 800 stores the pixel and also forwards the pixel to the output 19. Upon receipt of a repeat message the last stored pixel is forwarded to the output 19 as many times as specified by the count from the repeat message. Upon receipt of an end of scan line message the Pixel Output Module 800 passes the message to the output 19.

The output 19 may connect as required to any device that utilizes pixel image data. Such devices include output devices such as video display units or printers, or memory storage devices such as hard disk, semiconductor RAM including line, band or frame stores, or a computer network. However, as will be apparent from the foregoing, a method and apparatus are described that provide for the rendering of graphic objects with fill functionality demanded by sophisticated graphic description languages without a need for intermediate storage of pixel image data during the rendering process.

4.0 Compositing Optimisation

The complexity and inefficiency of prior art arrangements, such as that described above and summarised in FIG. 35A, in compositing different shaped objects, comes from the lack of knowledge in the prior art Pixel Compositing Module 700 on which object is active and which is not active. Such a compositing approach relies on the prior art Priority Determination Module 500 to send the required operations with correct stack set-up over different regions. This is seen in the prior art examples of FIGS. 25A to 27C discussed above in the "Background" section. However, the prior art Priority Determination Module 500 has no knowledge of what the required operations are over different regions if the corresponding software driver, such as that operable on the stack of FIG. 25C, does not use clippings.

Figures 25A, 25B, 25C:
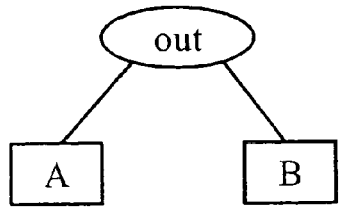
FIGS. 25A-25C show examples of compositing 2 different shaped objects together.
Figure 28A:
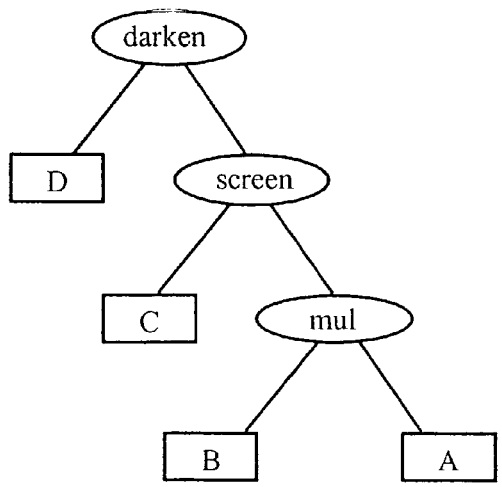
FIGS. 28A and 28B show expression tree changes over different regions, with the expression tree in region A∩B∩C∩D.
Figure 28B:
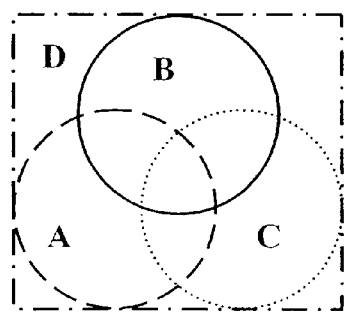

In the compositing approach of the present disclosure, depicted comparatively in FIG. 35B, the Pixel Compositing Module 1400 is imparted with knowledge of the branch activities of each operator, and can then modify the operator depending on the branch activities. Therefore there is no need to use clippings to send different operators over different regions. In FIG. 25C for example, the region A∩B requires the copypen operator, whilst the region A∩B requires the out operator. The determination of which operator is sent down the pipeline to the Pixel Compositing Module 1400 is therefore controlled by clippings.

Figure 29:
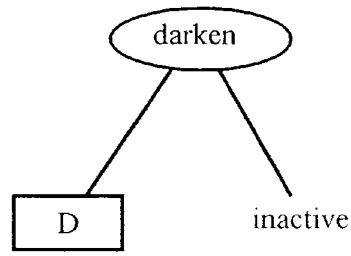
FIG. 29 shows expression tree changes over different regions, with the expression tree in region D∩($\overline{A∩B∩C}$)
Figure 30:
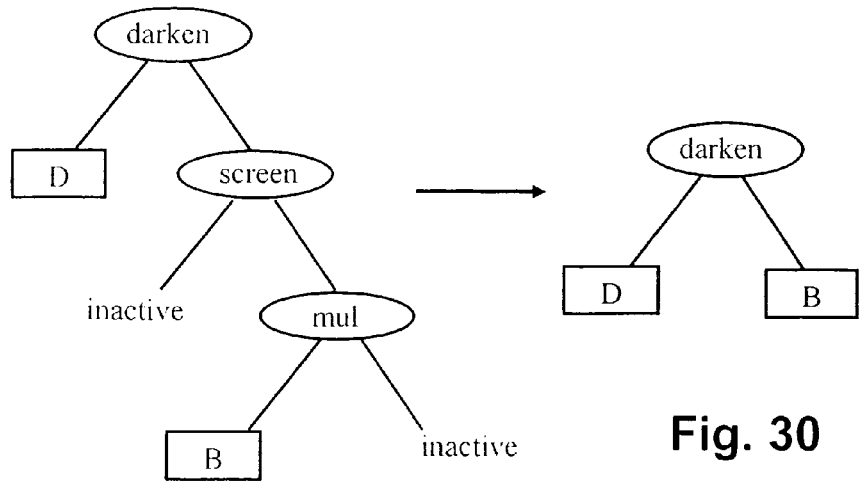
FIG. 30 shows expression tree changes over different regions, with the expression tree in region D∩(B∩($\overline{A∪C}$))

Here reference can again be made to the example in FIGS. 27A-27C. The expression tree of FIG. 27A changes over different regions, as shown in FIG. 29 and FIG. 30. The compositing operation, darken, in region D∩($\overline{A \cup B \cup C}$) can be changed to copypen once the Pixel Compositing Module 1400 detects the right branch is not active. In the D∩(B∩ ($\overline{A \cup C}$)) region, the right branch of mul is not active, so the operation is changed to copypen. The Pixel Compositing Module 1400 can then detect the left branch of screen is also not active, and may change the operator to copypen as well. While there are two (2) copypen in sequence, they can be further squashed to the output tree on the right hand side of FIG. 30. If the Pixel Compositing Module 1400 is capable of fetching 2 operands and 1 operator at the same clock cycle, then only 1 clock cycle is necessary for a compositing operation in region D∩(B∩($\overline{A \cup C}$)), instead of 3 clock cycles according to prior arrangements.

Figure 31:
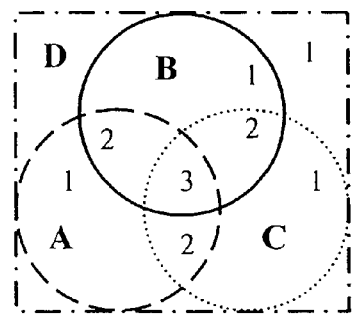
FIG. 31 shows the timing improvement obtained using by optimised expression tree according to the present disclosure.

The same technique can be applied in each region and this will result in the timing improvement shown in FIG. 31, which can be compared directly with FIG. 27B. It will be observed that the number of cycles in region D∩A∩B∩$\overline{C}$ has improved from 5 to 2 and the number of cycles in region D∩A∩B∩C has improved from 7 to 3.

For compositing according to the prior art arrangement (FIG. 35A), the basic rate is essentially 1 cycle for one (each) level. The target optimal should be 1 cycle for one (each) compositing operation. To achieve this target, changes to processing are necessary.

4.1 Optimised Configuration

As seen from FIG. 35B, the rendering processing pipeline 23 differs from the prior art processing pipeline 22 of FIG. 35A in that a Compositing Instruction Generator 100 is provided in the processing pipeline 23 after the Priority Determination Module 1000 and is operable to divide instructions from the Priority Determination Module 1000 into a first group of instructions which are forwarded to the Pixel Generation Module 1200 to enable generation of the fill color for each leaf node graphic object. The Compositing Instruction Generator 1100 also forms a second group of instructions, being compositing instructions for the active operators in the expression tree. With this arrangement, the processing pipeline 23 can render an expression tree having differently shaped graphic objects without the need for complicated clippings on the intersecting areas and redundant instructions being sent to the Pixel Generation Module 1200 and the Pixel Compositing Module 1400. The Pixel Generation Module 1200 interfaces to the Pixel Compositing Module 1400 via an Operand Queue 1300.

Figure 50:
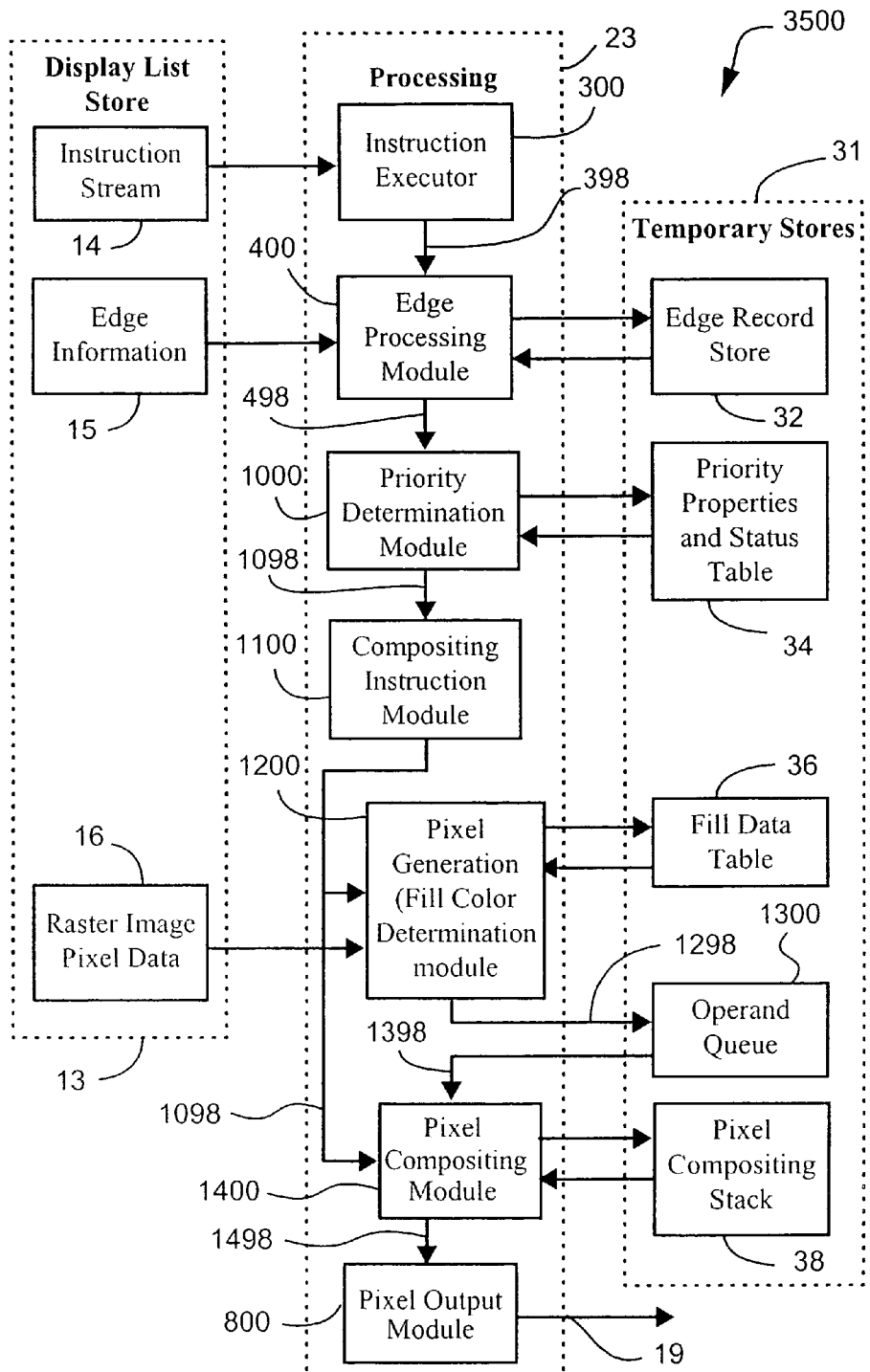
FIG. 50 is a schematic block diagram of the pixel sequential processing apparatus of FIG. 35B but with the detail of FIG. 3.

The reconfiguration of the processing pipeline 23 compared to the processing pipeline 22, requires that the Priority Determining Module 1000, the Pixel Generation Module 1200 and the Pixel Compositing Module 1400 differ in general structure from the correspondingly named modules 500, 600 and 700 of the processing pipeline 22. The other correspondingly named modules of the processing pipeline 23 operate as described previously for the processing pipeline 22. The structure and operation of the modules 1000-1400 will be described in the following sections of this specification. Not illustrated in FIG. 35I, but having the same function and structure as that described in FIG. 3, are the fill table 36, the compositing stack 38, the priority properties and status tables (level activation table) 34 and the edge record store 32. The Operand Queue 1300 may be formed in the temporary stores 20 in a similar fashion or alternatively in dedicated FIFO memory. These structures are more readily seen in FIG. 50 which illustrates the pixel sequential rendering apparatus 3500.

4.2 Src & Dest Become L & R

When the 2 operands of an operator are both leaves, it is desirable to fetch them in the same clock cycle instead of fetching the Tight operand from the stack, to where it had previously been pushed. The Pixel Compositing Module 1400 therefore sees the 2 operands of each operator as Left (L) and Right (R) operand instead of Src and Dest operand. When the operand is the result of an operation, it is then fetched from stack 38. When both operands are the results of an operation, L is fetched first from stack and then R in a predefined order.

4.3 Operator is Separate from Operand

As the Pixel Compositing Module 1400 fetches operator and operand separately, there is no need to combine them. This gives at least 2 advantages. First, it is no longer necessary to push the right leaf operand to the stack 38. Second, complicated clippings are no longer required to limit the operation to be applied only on the intersection region. This will also save space in the Level Activation Table 530 when only an operand or an operator in a level is used. Experiments by the present inventor indicate such seems to be often the case.

4.4 No Stack Operation Codes

As the operator directly defines from where the operand comes, there is no need for stack operation codes (i.e. STACK_OP in FIGS. 24A to 24D). When the operand is a leaf, an index is used to indicate its source. When the operand is the result of an operation, the operand is always obtained from the stack. Since a binary tree is used as the expression tree, the maximum stack depth would be 2 only. This will be explained later.

4.5 Unique Op-Code for each Kind of Operation

Generally an operator becomes active when its operands become active. It is therefore possible to categorize all operators desired to be used into 4 types as shown in Table 1. From Table 1, it can be seen that the majority of operators are in the first group. Only an active operator will be passed to the Pixel Compositing Module 1400. Although most operations in Porter & Duff use copypen or nop only, a different op-code is required to differentiate those operations from raster operations in order to apply a different operator activation-checking rule.

In the first group, the operation is applied when either the L or R operands are active. When L is active and R is inactive, the operation returns the L operand instead of the result of the operation. On other hand, when R is active and L is inactive, the operation returns the R operand instead of the result of the operation. In the second group the operation is applied when both the L and R operands are active.

The actual op-code passed to the Pixel Compositing Module 1400 will be trans-coded depending on the activity state of the L and IR branches. When an OVER operator has an active L operand and an inactive R operand, a transcoding unit of the Pixel Compositing Module 1400 (described later with reference to FIG. 37), whose operation is summarized in Table 4, translates the operator to a Return_L operator (which is equivalent to copypen in the prior art arrangement) with S_OUT_D and S_ROP_D set, and D_OUT_S cleared. When the OVER operator becomes active in the intersection region where both L and R are active, the trans-coding unit translates the operator to a Return_L operator with all Alpha flags set. When the OVER operator moves to the region where L is inactive and R is active, the trans-coding unit translates the operator to a Return_R operator (equivalent to nop in the prior art arrangement), with S_OUT_D cleared, and each of S_ROP_D and D_OUT_S set.

The trans-coding rules are predefined for each operator according to the activity of its branches. This rule set is preloaded to the Pixel Compositing Module 1400. In summary, it is possible to remove the Alpha flags setting (S_OUT_D, S_ROP_D and D_OUT_S) completely from the instruction making the instruction even shorter.

4.6 New Compositing Primitives

There are 3 distinctive compositing primitives, those being Operators, Operands and Clippers. Table 2 lists their definition and usage. The rain reasons these primitives are separated from the priority level in the prior art arrangement are:
1. Clippers are not actually graphic objects, which will appear on the page. Most fields in the Level Activation Table 530 are not used and space is wasted.
2. The only operator associated with a right leaf is Push.
3. When the operand is obtained from the compositing stack 38, the operand definition fields, such as fill index and fill type, in priority level are not used.
4. When a left leaf node of a compositing expression tree is combined with the operator, it complicates the change of operation required upon the change of the activity state of a branch.
5. Clippers are managed by the Edge Processing Module 400 and the associated edge crossings should only be sent to Priority Determination Module 1000 when it is necessary (eg. non-zero winding clip-ins).

Separate commands such as LOAD_OPERATORS, LOAD_OPERANDS and LOAD_CLIPPERS are used to load these primitives. The operators and operands are loaded into the Priority Determination Module 1000 and stored in an Operator Table and an Operand Table, respectively. These tables are shown in Table 5 and Table 6 and may be formed as part of the tables 34 in the temporary stores 30, which in a hardware implementation may be formed as an on-chip cache. The command LOAD_CLIPPERS loads clippers into the Edge Processing Module 400, which will then allow for the accurate determination of the fill count and generate "true" edge crossing for the Priority Determination Module 1000.

4.6.1 Load_Operands

This command loads fill objects into the Operand Table in the Priority Determination Module 1000. Each operand requires the fields defined in Table 2. Operand_level_number is the Operand Table entry index of an operand, and Operand_level_number only matters when Painter's algorithm is used where level_need_below flag is used. The lower Operand_level_number means the graphic object is closer to the bottom of a page. There are 2 extra fields in Table 2, those being Parent and L/R operand. Parent points to the operator where the operand is associated L/R operand is a flag indicating if the operand is a left or right operand.

Each operand has associated edges defining its boundary and is activated when the scan line crosses into the object. The object can be clipped-in or clipped-out by clippers. When an object is activated, the object sets the active state of its parent (operator) and may activate its parent if the activation condition of its parent operator is satisfied.

4.6.2 Load_Operators

This command loads operators into the Operator Table in Priority Determination Module 1000. Each operator requires the fields defined in Table 2. Operator_level_number is the Operator Table entry index of an operator. Operator_level_number defines the order in which operations are to be performed on the expression tree. Therefore it is important to number them according to the operational order. An operator can also be an operand if further operations are required. The parent field points to another operator where the result of this operation is used as an operand. L/R operand indicates if it is a left or right operand.

Figure 32:
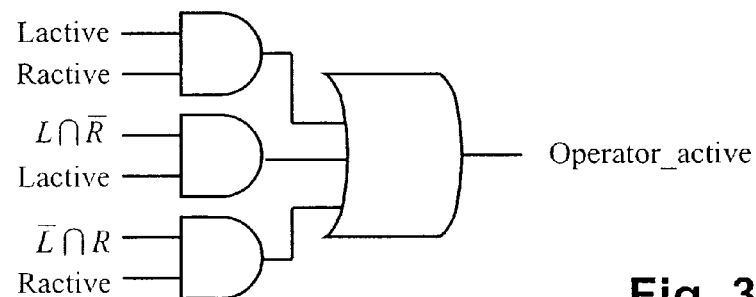
FIG. 32 shows logic for checking Operator node activation used in the Priority Determination Module 1000.

Operator is activated by its active operands. When the branch activity state (Lactive and Ractive) changes, an activation function is called to check if this operator is to be activated. A look-up table (Table 3) of activation conditions for each operator is stored by the software driver using a LOAD_Activation_LVT command. The look-up table remains unchanged across different jobs unless new operators are added. The software driver does not need to send along this information with LOAD_OPERATORS instruction. FIG. 32 shows the activation function as being a logical combination of the branch activity states and the intersecting regions.

The Alpha flags (S_OUT_D, S_ROP_D and D_OUT_S) of instructions previously described (see FIGS. 20A and 20B) are no longer required in the compositing instruction as shown in FIG. 22B. A trans-coding unit (to be described) in Pixel Compositing Module 1400 can deduce these flags according to the operators and branch activity state. This is simply a look-up-table of op-code and branch activity (Lactive and Ractive). The look-up-table (Table 4) is preferably loadable from the software driver and stored in the Pixel Compositing Module 1400. There are two advantages of this. Firstly the instruction is shorter and secondly only meaningful combinations of these flags can be composited.

A Break_point field specifies a break point in multi-passes compositing. This will be explained further in the examples later in this specification. An Attribute_from field defines the source of the resultant attribute. There are 3 settings for this field—from_L, from_R and from_op. When form_L is used, the resultant attribute is from the left operand. When from_R is used, the resultant attribute is from the right operand. When from_op is used, the resultant attribute is the attribute operation result of left and right operand attribute.

4.7 Data Flow

Figure 36:
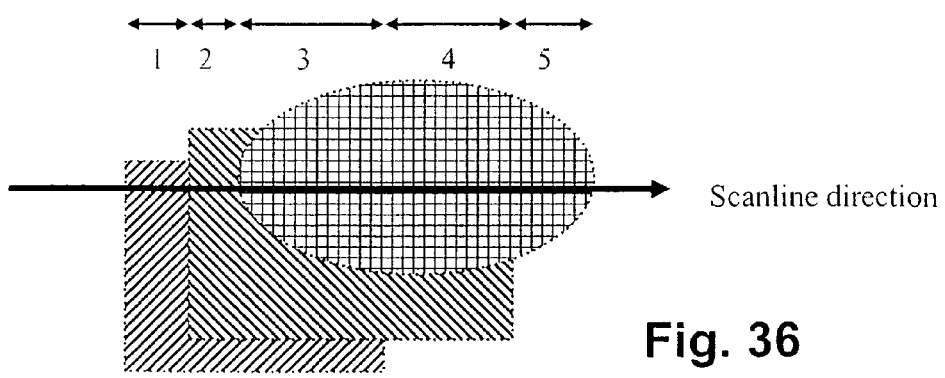
FIG. 36 depicts various compositing regions pertinent to the present disclosure.

The compositing regions in the present optimised approach are the same as those described above, where the number of active levels remains unchanged. FIG. 36 shows 5 compositing regions on that scan line. The difference in the optimised approach of FIG. 35B tom that described above with reference to FIG. 35A is that the number of pixels and levels in a region are passed all the way down to the Pixel Generation Module 1200 and the Pixel Compositing Module 1400 in a single command, instead of this information being sent on a pixel-by-pixel basis. This feature enables Pixel Generation Module 1200 to predict the number of bitmap pixels required for the region and concurrently generating pixels for all fills in the current pass.

After receiving an edge crossing with a different x-value, the Priority Determination Module 1000 passes the number of pixels between the previous edge crossing and the current edge crossing along with a list of active operators to the Compositing Instruction Generator 1100.

Figure 33:
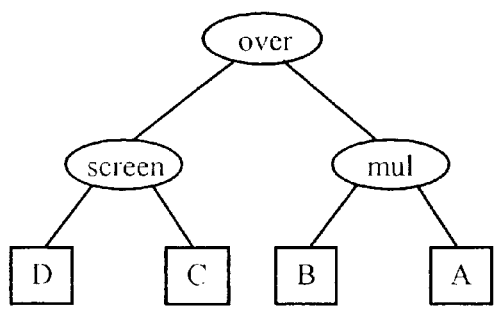
FIG. 33 shows an expression tree for the image of FIG. 34.
Figure 34:
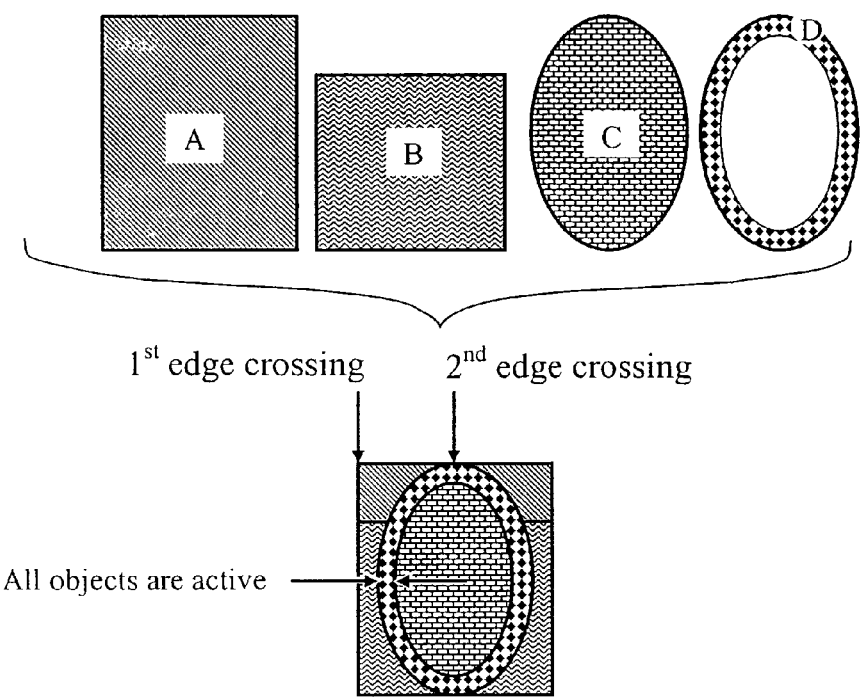
FIG. 34 shows a compositing of the tree in FIG. 33.

The Compositing Instruction. Generator 1100 uses the information in Operator Table and Operand Table to prepare and send compositing instructions to the Pixel Compositing Module 1400 and operand generation instructions to Pixel Generation Module 1200. The expression tree in FIG. 33 can be used as an example, where there are 4 leaves and 3 operators. FIG. 34 shows the leaf objects of FIG. 33 and the manner in which they composite according to the operators. Note the order of composite is from right-to-left across the leaf nodes of the expression tree.

First, the operands and operators are loaded by Priority Determination Module 1000 using the LOAD_OPERANDS and LOAD_OPERATORS commands respectively. The active field in the Operand Table is all cleared initially as shown in Table 7.1. The active, Lactive and Ractive fields in the Operator Table are cleared and the Lchild, L_is_leaf, Rchild and R_is_leaf are un-initialised initially as shown in Table 7.2. L_is_leaf and R_is_leaf are flags indicating that the left and right operands respectively of the operator are leaf nodes. If either flag is set, the corresponding entry Lchild or Rchild points to the associated operand in the operand table.

From FIG. 34, Object A, being the rectangular boundary, is the first object to become active. When the $1^{st}$ edge crossing is received, the Priority Determination Module 1000 operates set the active field in operand_level_number 1. When the $2^{nd}$ edge crossing is received, the Priority Determination Module 1000 updates the Operator Table with the changes of active field in the Operand Table. This in turn sets the Ractive and R_is_leaf field of operator_level_number 1 entry in the Operator Table as object A's parent is operator_level number 1. It also marks the Rchild field 1. When Ractive or Lactive state changes, the logical equation depicted in FIG. 32 will be called to update the active field of operator_level_number 1. The equation uses the output of Operator Activation look-up-table (Table 3) indexed by the mul operator and the state of Ractive and Lactive as inputs. As the mul operator only needs one active operand to be activated, the active field will be set. The Priority Determination Module 1000 then passes the number of pixels between edge crossing 1 and edge crossing 2 and a list of active operators in level ascending order to the Compositing Instruction Generator 1100.

The Compositing Instruction Generator 1100 then generates instructions for the Pixel Compositing Module 1400 and Pixel Generation Module 1200 for all active operators. The Pixel Compositing Module 1400 instruction is "Number of pixels" followed by a sequence of op-code and L & R operand definition pairs. L & R are in one of these states—Q1, Q2, Q3, Q4, stack, inactive. Pixel Generation Module 1200 instruction is "Number of pixels" followed by an operand list. Operand list is a sequence of Queue number, fill_index and fill_type. Queue number is one of Q1, Q2, Q3 or Q4 as there are 4 queues formed in the Operand Queue 1300 between Pixel Generation Module 1200 and the Pixel Compositing Module 1400. Both commands are terminated by CmdEnd.

Figure 45:
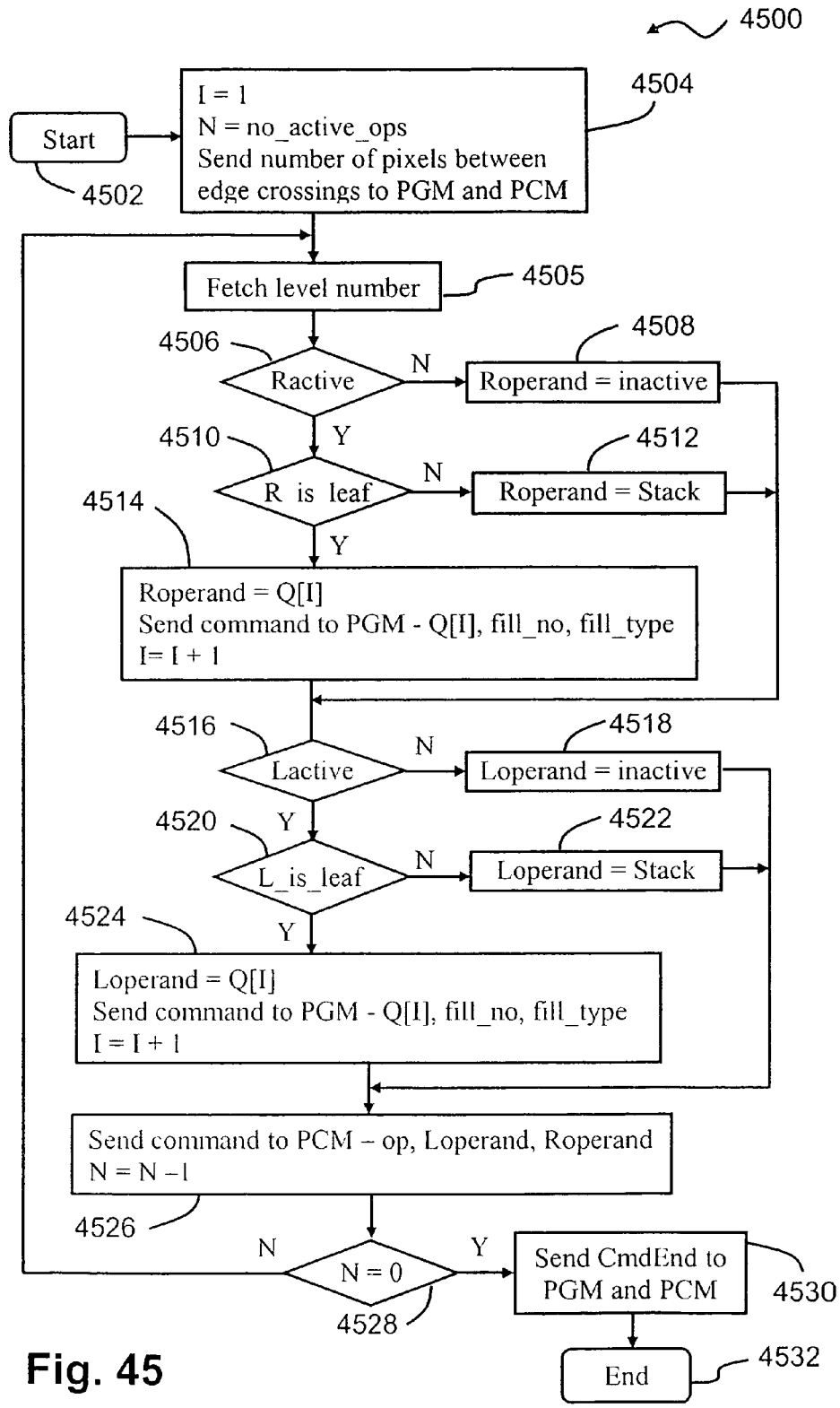
FIG. 45 is a flow chart of operation of the Compositing Instruction Generator 1100.

The Compositing Instruction Generator 1100 uses the state of Lactive, Ractive, L_is_leaf and R_is_leaf in the Operator Table to generate correct state of the L and R operand pairs for the Pixel Compositing Module 1400 instructions and the Pixel Generation Module 1200 pixel generation instructions. A process 4500 by which the Compositing Instruction Generator 1100 operates is shown in FIG. 45 and described below.

After Start entry step 4502, in step 4504, a variable I, which is used as Queue number, is first set to 1. A variable N is set to the number of active operators between 2 edge crossings received from the Priority Determination Module 1000. With this information, the Compositing Instruction Generator 1100 first sends number of pixels between two edge-crossings command to the Pixel Generation Module 1200 and to the Pixel Compositing Module 1400.

The Compositing Instruction Generator 1100 then, in step 4505, fetches the level number of the first active operator from the list sent by Priority Determination Module 1000. The level number is the index into Operator Table. The states of Ractive, R_is_leaf, Lactive and L_is_leaf of the active operator currently being processed are then checked.

In step 4506, the state of Ractive is checked and if not set, Roperand is set to inactive in step 4508 and control passes to step 4516. A similar test is performed on R_is_leaf in step 4510 where, if not set, in step 4512, Roperand is set to stack and control also passes to step 4516. Where each of these variables are set, Roperand is set to Q[I] in step 4514 and the right operand of this active operator is dispatched to Pixel Generation Module 1200 an the value of I is incremented. The index to the operand queue, I, is only incremented when Roperand is a leaf node because the Roperand will be dispatched to the queue.

The Compositing instruction Generator 100 also uses the content of Rchild of the active operator currently being processed to fetch the operand settings from the Operand Table. Only Fill_index and Fill_type is required for Pixel Generation Instructions.

Corresponding steps 4516-4524 are then carried out for the left operand. In step 4526, the states of Roperand and Loperand are both checked, Pixel Compositing Module 1400 command is generated and N is decremented Finally the Compositing Instruction Generator 1100 tests if there are more active operators in the list at step 4528. If there are more active operators in the list, control returns to step 4505 and the same process is executed. Otherwise CmdEnd is sent to the both Pixel Generation Module 1200 and the Pixel Compositing Module 1400 in step 4530 to thereby terminate the task in step 4532.

Returning to the example of FIG. 34, when object A is the only active operand, as operator_level_number 1 is the only active operator, the first set of instructions generated by the Compositing Instruction Generator 1100 for the Pixel Compositing Module 1400 and Pixel Generation Module 1200 are as follows:

Pixel Compositing Module 1400 instruction:
Number of pixels between edge crossing 1 and edge crossing 2
Mul, inactive, Q1
CmdEnd
Pixel Generation Module 1200 instruction:
Number of pixels between edge crossing 1 and edge crossing 2
Q1, A, bitmap
CmdEnd Instructions for other regions can be determined in a similar fashion. When all operands are active as in the region shown in FIG. 34, the Operand Table and Operator Table will appear as shown Table 8.1 and Table 8.2. The instructions of that region, in which all objects are active, for the Pixel Compositing Module 1400 and Pixel Generation Module 1200, are as below:

Pixel Compositing Module 1400 instruction:
Number of pixels in region
Mul Q2, Q1

Screen, Q4, Q3
Over, stack, stack
CmdEnd
Pixel Generation Module 1200 instruction:
Number of pixels in region
Q1, A, bitmap
Q2, B, linear_ramp
Q3, C, bitmap
Q4, D, flat
CmdEnd 4.8 Priority Determination Module 1000

Figure 49:
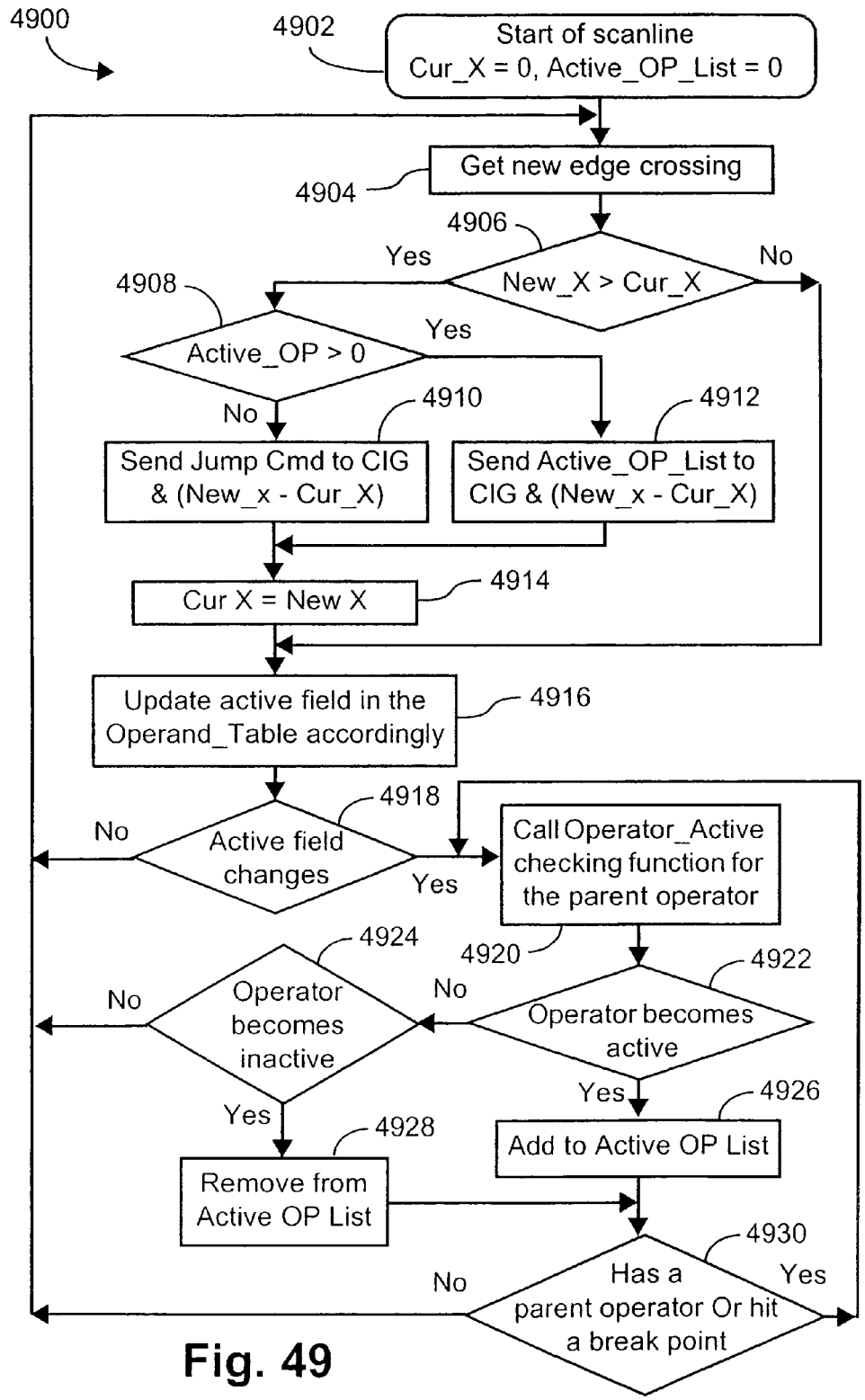
FIG. 49 depicts the command generation data flow between the Priority Determination Module 1000 and the Compositing Instruction Generator 1100.

The main function of the Priority Determination Module 1000 is to pass the number of pixels between the previous edge crossing and the current edge crossing along with a list of active operators to the Compositing Instruction Generator 1100 in level ascending order. A flow chart of the generation of commands for the Compositing Instruction Generator 1100 is shown in FIG. 49. In step 4902, at the start of each scanline, Cur_X, the current edge crossing x coordinate, is set to zero and Active_OP_List is empty. In the next step 4904, the Priority Determination Module 1000 fetches a new edge crossing. The Priority Determination Module 1000 then, in step 4906, checks if New_X, the new edge crossing x coordinate, is greater than Cur_X. If New_X is greater than Cur_X, the Priority Determination Module 1000 checks if Active_OP_List is not empty in step 4908. If Active_OP_List is not empty, the Priority Determination Module 1000 sends Active_OP_List and Number_of_Pixels(New_X−Cur_X) to the Compositing Instruction Generator 1100 in step 4912, otherwise the Priority Determination Module 1000 sends a Jump command and Number_of_Pixels to the Compositing Instruction Generator 1100 in step 4910. The Jump command causes the Compositing Instruction Generator 1100 to output the associated number of background pixels (preferably opaque white). Cur_X is then updated with New_X in step 4914.

If New_X is not greater than Cur_X, or following step 4914, the Priority Determination Module 1000 updates the active field in Operand Table according to edge crossing type, up or down, and fill rule in step 4916. The Priority Determination Module 1000 next in step 4918 checks if the active field of this operand changes. If the active field changes, the Priority Determination Module 1000 calls the Operator_active checking function in FIG. 32 (Operator node activation checking) in step 4920, otherwise the method returns to get the next edge crossing at step 4904.

Next, if the operator becomes active, as determined at step 4922, the operator is added to the Active_OP_List at step 4926, otherwise a check is performed at step 4924 to determine if the operator becomes inactive. If the operator becomes inactive, the operator will be removed from Active_OP_List at step 4928. Then a check is performed to determine if the operator has a parent operator in step 4930. When the operator has a parent operator, the operator will traverse up the tree and update the active state of the parent operator until the traverse reaches the root or hits a break point. When the traverse completes, the Priority Determination Module 1000 goes to get the next edge crossing at step 4904.

Figure 47:
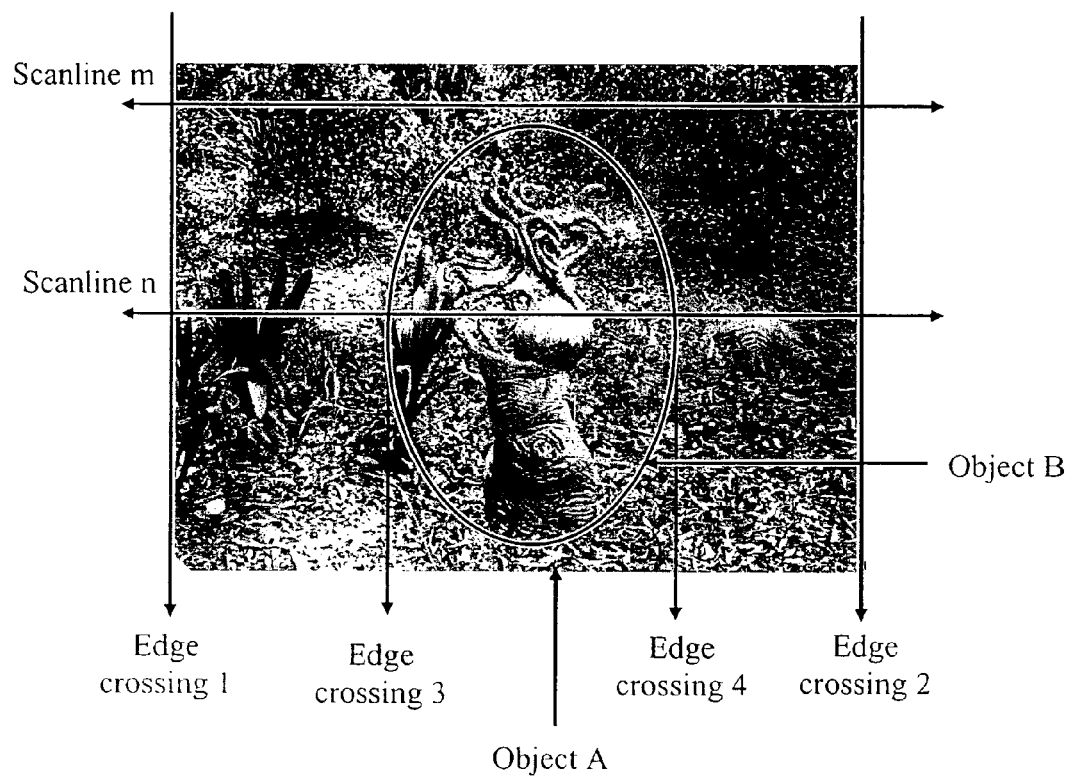
FIG. 47 is a compositing tree example, where operand is active but operator is not active.
Figure 48A:
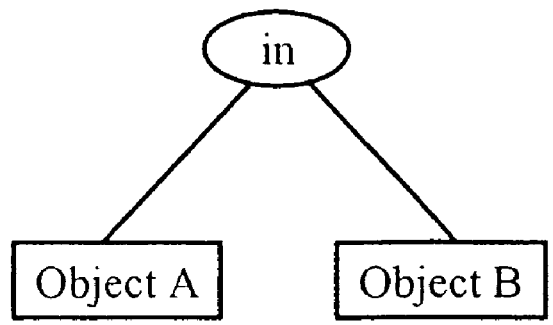
FIGS. 48A and 48B show the compositing tree and result for the example of FIG. 47.
Figure 48B:

There is a situation where there is an active operand but there is no active operator. Such a case is demonstrated in FIG. 47, where object A formed by a bitmap as a left operand, is to be put into object B formed by an oval as a right operand, according to the compositing tree shown in FIG. 48A, to yield the result shown in FIG. 48B. When the $1^{st}$ edge crossing on scanline m is received, the Priority Determination Module 1000 outputs a Jump command because Active_OP_List is empty. The Priority Determination Module 1000 then sets the active field in object A and tests if object A triggers the activation of the IN operator. Since the IN operator requires 2 active operands to become active, Active_OP_List remains empty. When the $2^{nd}$ edge crossing is received, the Priority Determination Module 1000 will send another Jump command since Active_OP_list is still empty. The active field of object A will be cleared and the Priority Determination Module 1000 then fetches the next edge crossing (step 4904). If there are no more edge crossings, the Edge Processing Module 400 will send an End_of_Line command and the Priority Determination Module 1000 will start for the next scan line.

In scanline n, a Jump command is first sent out in edge crossing 1. In edge crossing 3, another Jump command is sent and then the IN operator is activated and added to Active_OP_List. In edge crossing 4, Active_OP_List is sent to the Compositing Instruction Generator 1100 since that list is not empty now. The active field of object B is then updated and the IN is removed from Active_OP_list. In edge crossing 2, another Jump command is sent to the Compositing Instruction Generator 1100 and the active field of object A cleared.

4.9 Pixel Generation Module 1200

Figure 46:
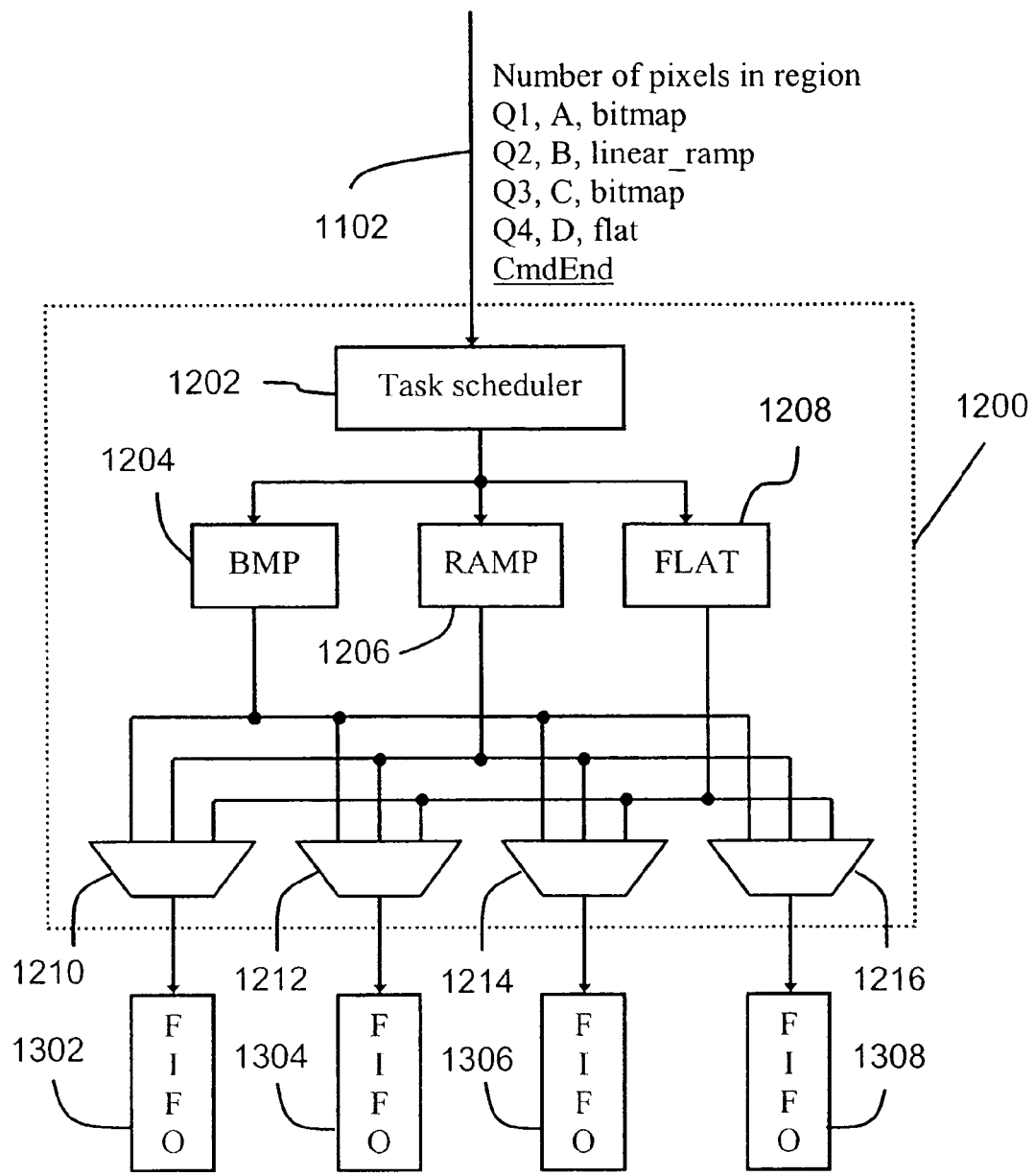
FIG. 46 is a schematic block diagram representation of the Pixel Generation Module 1200 of FIG. 35B.

The Pixel Generation Module 1200 is shown in FIG. 46 and receives input commands from the Compositing Instruction Generator 1100 via a connection 1102, those including (from the example in FIG. 34):
number of pixels in the region;
Q1, A, bitmap;
Q2, B, linear_ramp;
Q3, C, bitmap;
Q4, D, flat; and
CmdEnd.

Figure 6:
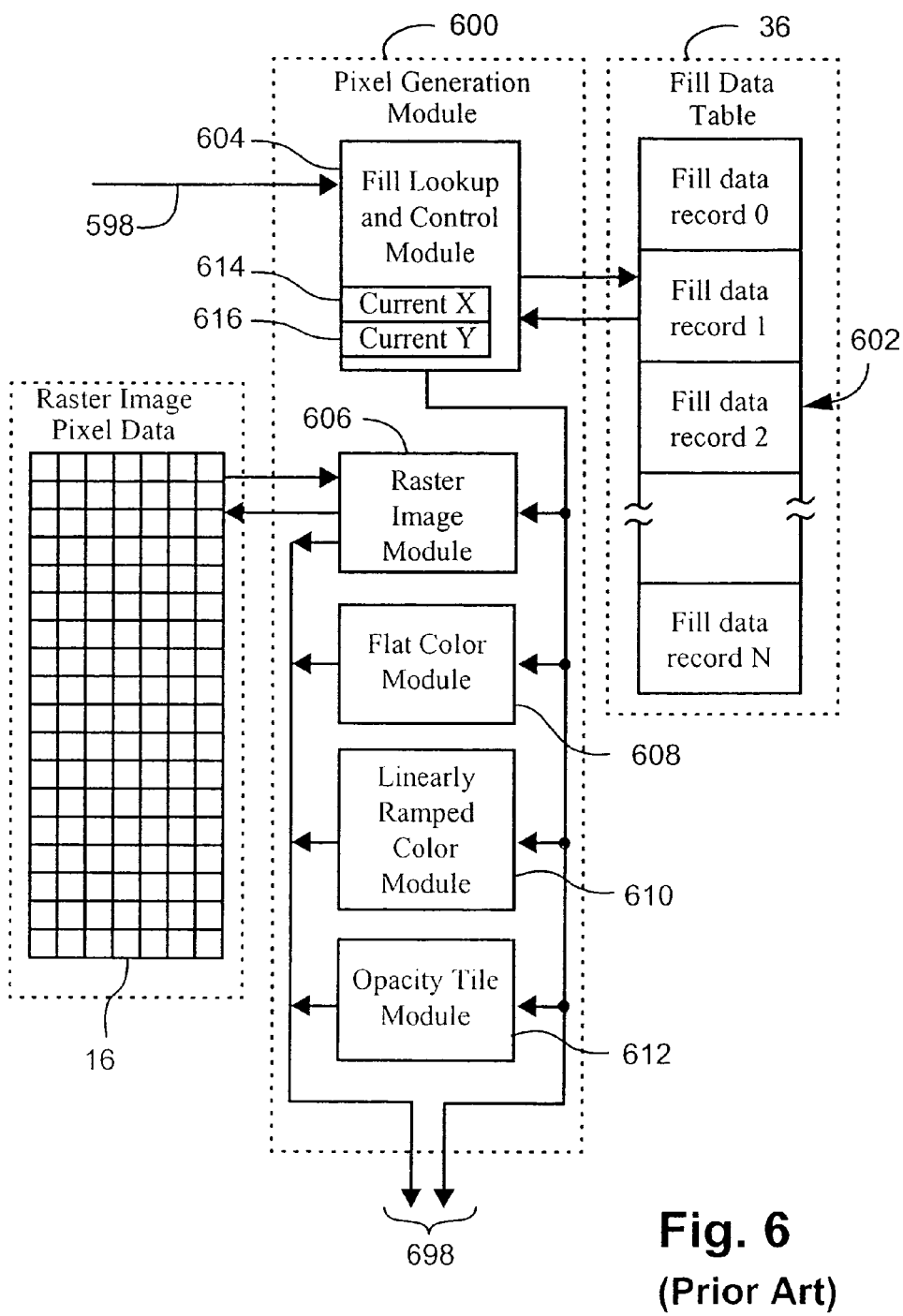
FIG. 6 is a schematic functional representation of the Pixel Generation Module 600 of FIG. 3.

The commands are received into the Pixel Generation Module 1200 by a task scheduler 1202 which interprets the commands and enables a number of pixel generation agents, being bitmap 1204, ramp 1206 and flat 1208, that are configured to work in parallel, instead of one at a time as in the arrangement of FIG. 6. The agents 1204-1208 output to a bank of four multiplexers 1210-1216 which respectively provide outputs of the Pixel Generation Module 1200 to each of four FIFO buffers 1302-1308, which collectively form the Operand Queue 1300. These are seen more clearly in FIG. 37, described below.

4.10 Pixel Compositing Module 1400

Figure 37:
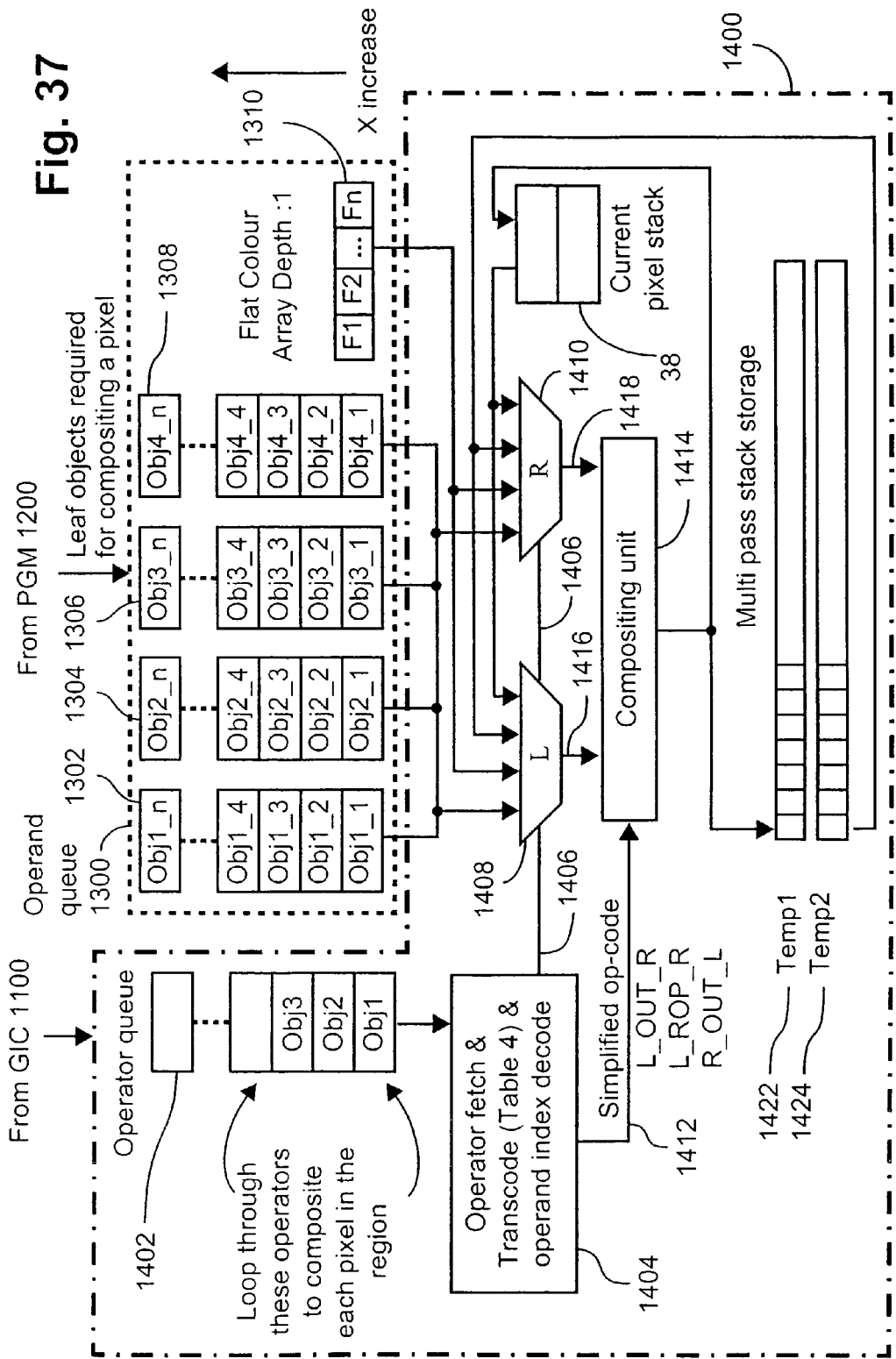
FIG. 37 is a schematic representation of a Pixel Compositing Module 1400 according to the present disclosure and applicable to the arrangement of FIG. 35B.

The Pixel Compositing Module 1400, seen in detail in FIG. 37, composites pixels over a region where all node activities remain unchanged. An operator queue 1402 is provided and supplied by instructions from the Compositing Instruction Generator 1100. The Operand Queue 1300 is supplied by the Pixel Generation Module 1200 and includes the four FIFOs 1302-1308, thereby enabling the handling of four leaf objects simultaneously. The FIFOs 1302-1308 are arranged in order of increasing x-coordinate and supply inputs of left and right operand multiplexers 1408 and 1410. The Operand Queue 1300 also includes a flat color array 1310 having a depth of one and into registers of which flat color values may be stored.

The Operator Fetch/Transcode & Operand Index Decode Module, or more simply a transcoding unit 1404, loops through all operators in the queue 1402 to enable compositing of each pixel in the region. This includes selecting, for operator, one L and one R operand by driving a selection line 1406 to the multiplexers 1408 and 1410. The multiplexer outputs are passed via lines 1416 and 1418 to the compositing unit 1414. Each operand has 6 states (Q1, Q2, Q3, Q4, Stack or inactive). When an operator has only one operand active, the transcoding unit 1404 changes the op-code to return_L (COPYPEN) or return_R(NOP). The transcoding unit 1404 also simplifies the raw op-code to a reduced set as shown in Table 4. The transcoding unit 1404 also uses Table 4 to output the appropriate alpha flags L_OUT_R, L_ROP_R, and R_OUT_L. The transcoding unit 1404 also outputs a simplified op-code 1412 to a compositing unit 1414 which outputs a composited result on a line 1420 to each of the current compositing pixel stack 38 and a multi-pass stack storage 1422. Each of the pixel compositing stack 38 ad the multi-pass storage 1422 output to respective inputs of the multiplexers 1408 and 1410. When both L and R operands are in the stack for the current pixel, L operand is on the top.

4.10.1 Pipelined Multi-stage Compositing

The prior art arrangement of FIG. 35A described in detail earlier, requires very critical timing in compositing because the compositing equation includes a Src and a Dest, where Dest is from the stack. This forms a loop in data path and makes pipelining impossible, and so some complicated PDF operations were unable to be supported.

The compositing approach of FIG. 37 uses L & R as operands. When both L & R operands are leaves, there is no loop in data path and such makes pipelining possible. Compositing has a general equation as below:

$$\alpha_{res}C_{res} = \text{L\_OUT\_R} \cdot (1 - \alpha_R) \cdot \alpha_L \cdot C_L +$$
$$\text{R\_OUT\_L} \cdot (1 - \alpha_L) \cdot \alpha_R \cdot C_R +$$
$$\text{L\_ROP\_R} \cdot \alpha_L \cdot \alpha_R \cdot B(C_L, C_R)$$

where $B(C_L, C_R)$ is a blend function of $C_L$ and $C_R$. The blend can vary from the simplest $C_L$ to $C_L + C_R - C_L \cdot C_R$. Even more complicated blends, not yet foreseen, may be developed.

The resultant opacity $\alpha_{res}$ is given by the equation $$\alpha_{res} = \text{L\_OUT\_R} \cdot (1 - \alpha_R) \cdot \alpha_L +$$
$$\text{R\_OUT\_L} \cdot (1 - \alpha_L) \cdot \alpha_R +$$
$$\text{L\_ROP\_R} \cdot \alpha_L \cdot \alpha_R$$

Figure 38:
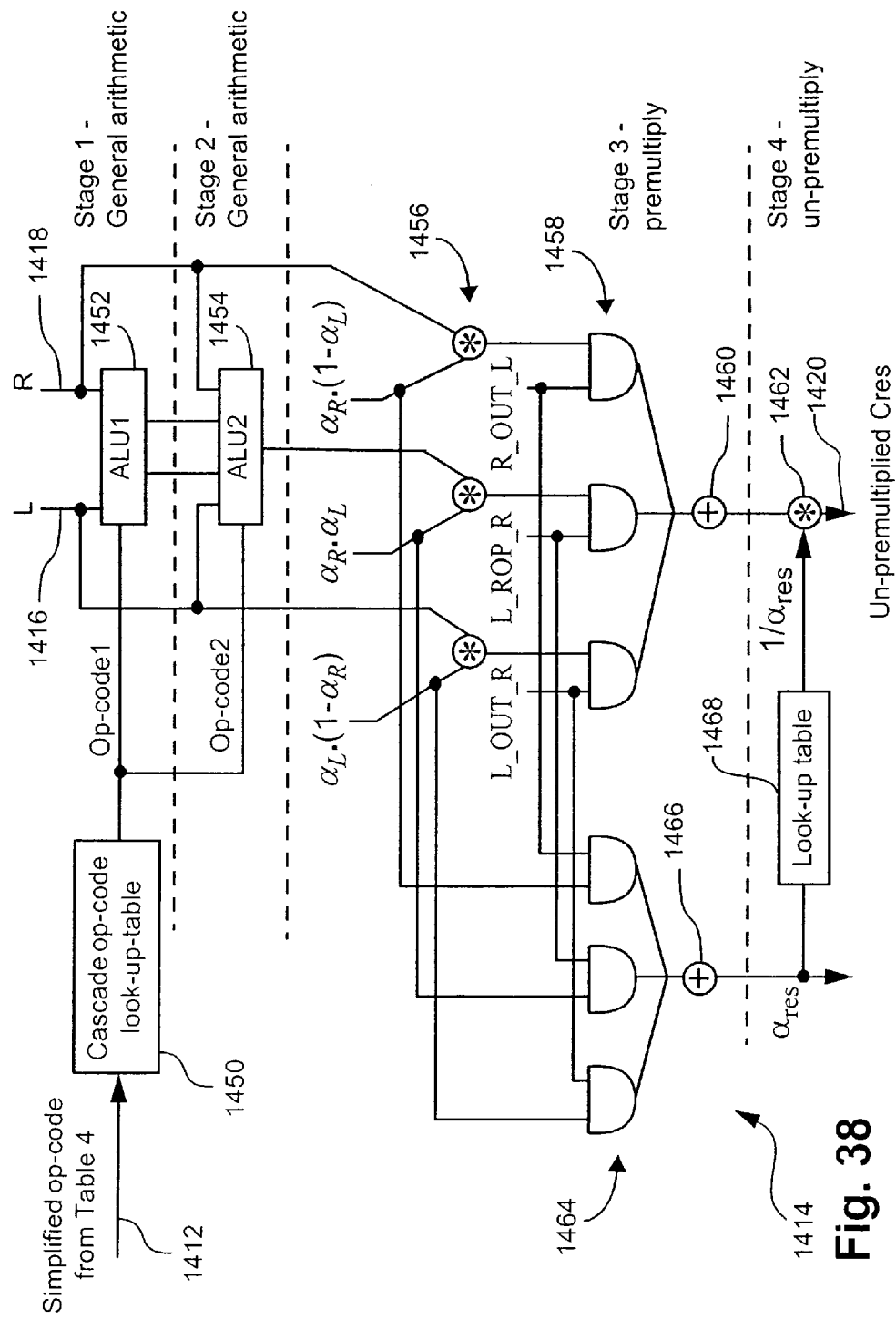
FIG. 38 is a schematic representation of the 4 stages compositing unit of FIG. 37.

Compositing as performed by the compositing unit 1414 is done in 4 stages as shown in FIG. 38. Stages 1 and 2 are general arithmetic stages and implement the blend function. Stage 3 is a multiply stage and combines the contributions from the 3 compositing regions to produce the pre-multiplied resultant color and the resultant opacity $\alpha_{res}$. Stage 4 operates to un-premultiply the resultant color by multiplying it with the reciprocal of the resultant opacity $\alpha_{res}$, obtained from a lookup table. To make adding new functions possible, a loadable cascade op-code look-up-table 1450, as shown in Table 4, is configured to receive the simplified op-code 1412. The input 1412 to the table 1450 is defined according to operators as shown in Table 4. The compositing unit 1414 then, via the table 1450, outputs 2 cascade op-codes to each arithmetic logic unit (ALU) 1452 and 1454, which form the first and second stages respectively.

The premultiply stage 1456 multiplies the transparency values (α) over the three compositing regions with the left and right operands. The results are logically combined with the corresponding operation in respective banks of AND gates 1458 and 1464 and summed by adders 1460 and 1466. The output of the adder 1466 is provided to a look-lip table 1468 to calculate $(1/\alpha_{res})$. This, together with the output of the adder 1460, are input to a multiplier 1462 to perform an un-premultiply operation, which results in an un-premultiplied composited result 1420, which can be pushed to the stack.

The 4 stages can be pipelined in various clock cycles depending on the technology used and input color depth (ie. 8 bits per channel or 16 bits per channel).

4.10.2 Multi-Pass Compositing

As the number of operand queues between the Pixel Generation Module 1200 and the Pixel Compositing Module 1400 is limited to 4, there will be problems in compositing a tree, which has more than 4 leaf nodes. This problem can be overcome by multiple compositing passes where the intermediate compositing results are stored into the temporary stack storage 1424 and combined with more leaves later.

As shown in FIG. 37, the Pixel Compositing Module 1400 has 2 operands—L & R. Each or either of those operands can be from a leaf (ie. the queue 1300), the flat color array 1310, the current stack 38 or previous composited intermediate result from the multi-pass stack 1422. The transcoding unit 1404 operates to send the correct L & R operands for each operator to the compositing unit 1414.

If an expression tree requires multiple passes in compositing, the intermediate result between passes is written into a temporary buffer (temp1 and temp2) formed as the multi-pass stack storage 1422 as shown in FIG. 37. Such an arrangement enables limiting a size of the current pixel stack 38, in this present example to depth of 2. The stack 38 stores the compositing result of the on-last operator within a pass. The result of the last operator of a non-final pass is written into the stack storage 1422 (Temp1 or Temp2). In the example expression tree shown in FIG. 39A, the result of op1, op2, op4, op5, op7 and op8 is stored in the current pixel stack 38. The result of op3 and op6 is stored into Temp 1 and Temp2 1422 respectively, as these two operators are the last operator of Pass 1 and Pass 2 illustrated in FIG. 39A.

The number of operations that can be performed within a pass is limited by the number of leaf nodes of a sub-branch, the depth of the operator queue, and if the operator has a break point. The number of leaf nodes in the present example is limited to 4, as the number of operand queues is 4. The depth of the operator queue is unlikely to be a limitation as long as it has a reasonable size, such as 8 or more. When an operator is a right operand of another operator and its parent also has a left non-leaf operand (operator), it is necessary to mark a break point on this operator. This enables the intermediate compositing result to bc stored in the temporary storage 1422 and used as a right operand when its parent's left operand is calculated. Such examples are op3 in FIG. 39A and op3, op6 and op7 in FIG. 40.

4.11 When the Expression Tree is Complicated

Figure 39A:
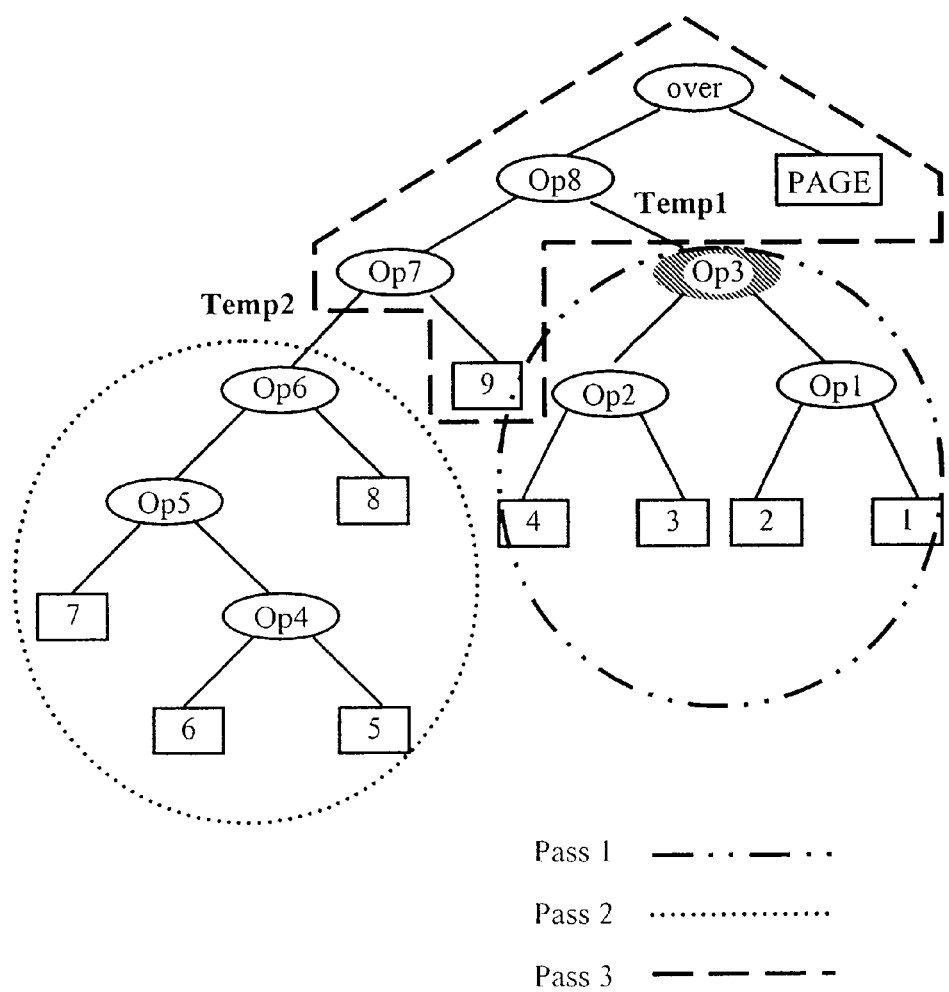
FIGS. 39A and 39B represent expression trees of a first comparative Example 1.
Figure 39B:
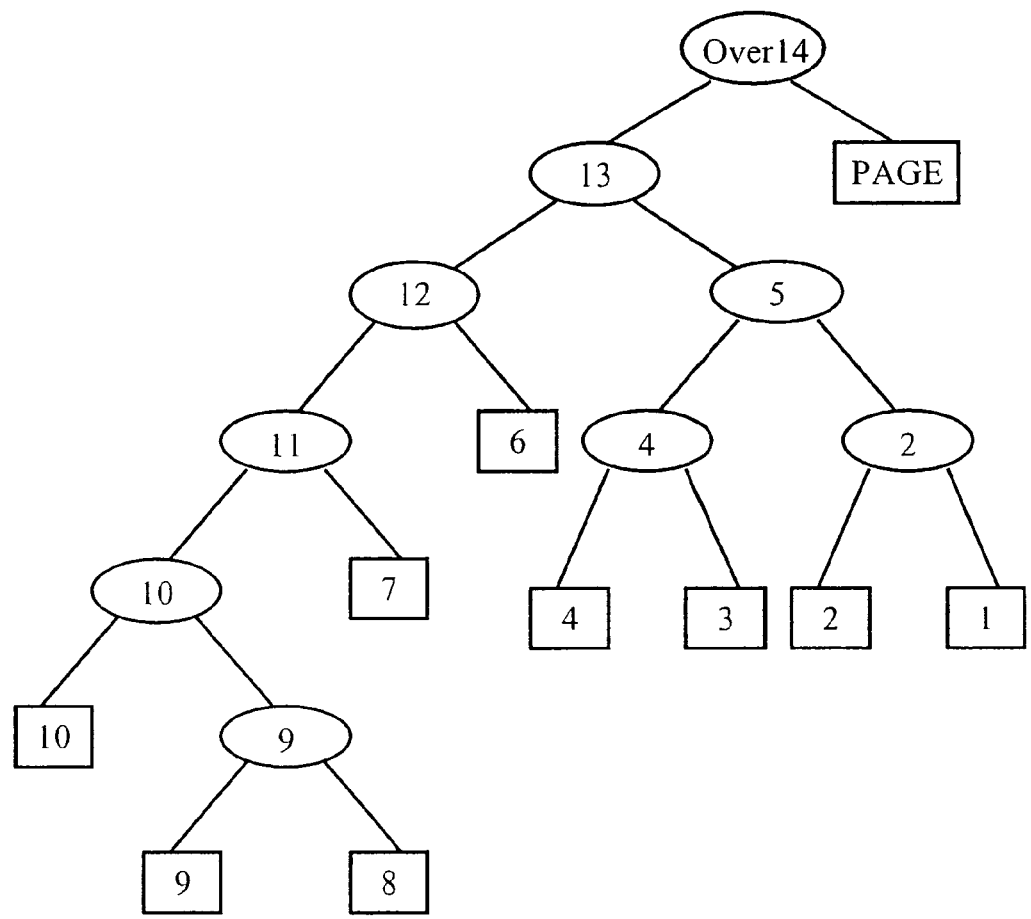
Figure 40:
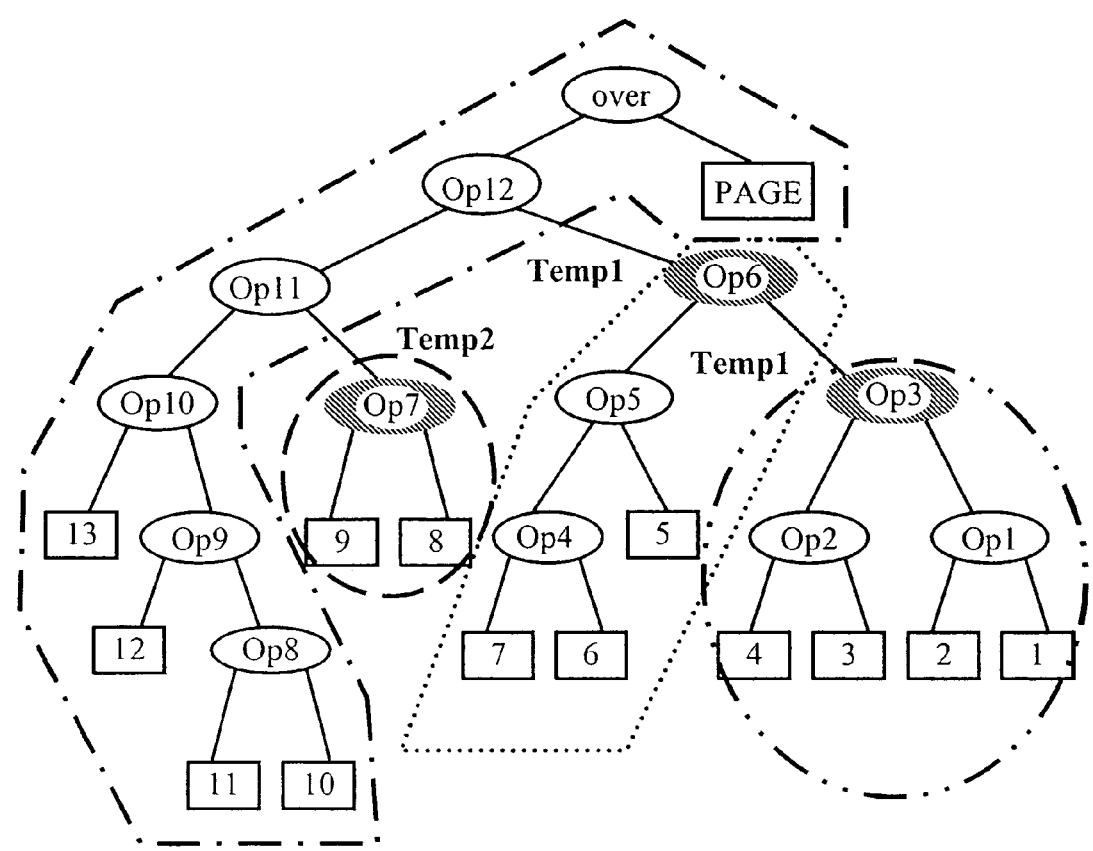
FIG. 40 is an expression tree of a second Example 2.

FIGS. 39A and 40 are examples of complicated expression trees, which need multiple passes for compositing. The shaded operators are break points. The number of clock cycles to complete one pixel compositing is indicated provided all leaf nodes are cached. The number of clock cycles required for compositing is the number of operators in this new method (ie. FIG. 39A=9 clock cycles, FIG. 40=13 clock cycles) while the prior art arrangement requires the number of clock cycles equivalent to the number of levels. This is seen in FIG. 39B which has the same expression tree of FIG. 39A, but requires 14 clock cycles.

When all objects in the expression tree are all in the same shape, the number of cycles saved is the number of cycles for pushing a right operand to the stack. In FIG. 39A, the saving is 5 clock cycles. However when the objects in the tree have different shape, the saving is increased because the left operand cannot share the same level with the operator and thus requires an extra level. With respect to the example of FIG. 40, the present arrangement will require 18 clock cycles when the left operands do not share the same level with the operators, whereas the prior art would need 26 clock cycles.

4.12 Breadth First Approach v. Depth First Approach

The prior art approach to compositing described above is a depth first approach, which composites all active levels in bottom up order within a pixel before it continues to the next pixel. The compositing approach of the presently described optimisations is a breadth first approach, which composites only a limited number of active objects from the bottom before it moves on to the next pixel. The present approach then combines another new limited set of objects with the intermediate result of the objects below in a few subsequent passes. The pros and cons of the current approach are discussed below in comparison to the prior art approach.

Pros:

1. The Pixel Generation Module 1200 can have an accurate pre-fetch. The cache size for each bitmap can be increased and big bursts of bitmap data can be sourced whenever possible to make good use of memory bandwidth. The total cache size does not need to increase as it only needs to accommodate a lesser number of bitmaps as the maximum number of bitmaps in a pass is limited to four. In the prior art arrangements, a significant memory latency can eventually make pre-fetch useless as the cache size is small for each bitmap. When the memory latency is greater than the speed in which data is consumed, the accelerating effect of pre-fetch vanishes. Also when the number of overlapped bitmaps exceeds the number of bitmaps the Pixel Generation Module 600 of the prior art can cache, the performance drops significantly. The performance of breadth first approach does not affected by the number of bitmaps the Pixel Generation Module 1200 can cache.

2. Enable pipelining: When both L&R operands are leaves, pipelining is easy as there is no feedback in the data path. However when one of L or R operands is not a leaf, there exists feedback in the data path. The breadth first approach still makes pipelining possible. This can be achieved by marking a break point on the operator, which is also an operand of another operator. This way its parent operator will have both operands ready before the operation starts and thus pipelining is not a problem. Such an approach will require more passes, however such will guarantee a speed of one clock cycle per operator, no matter how complicated the operation.

3. Rendering speed is proportional to number of operators because of the above factors.

4. Only need a current pixel stack 38 of depth of two.

Cons:

1. Small regions may create substantial overheads: When compositing changes passes or regions, there will be a few clock cycles delay to allow the pipeline to flush properly. If a region is small, a few clock cycles may become significant. Generally small regions congregate together compounding his problem.

2. Temporary storage is required to store the intermediate compositing result between passes.

4.13 Possible Further Speed-Up

The presence of the operator queue 1402 gives the Pixel Compositing Module 1400 a full view of all the operators that are to be performed in a region, and the state of each operand. The Pixel Compositing Module 1400 can therefore take time to optimise these operators before it starts compositing as it will take time for the Pixel Generation Module 1200 to deliver pixels into the Operand Queue 1300. There are 4 kinds of optimisation—operator reduction, X-independent repeat, Flat color bypass and operand comparison.

4.13.1 Operator Reduction

Figure 41A:
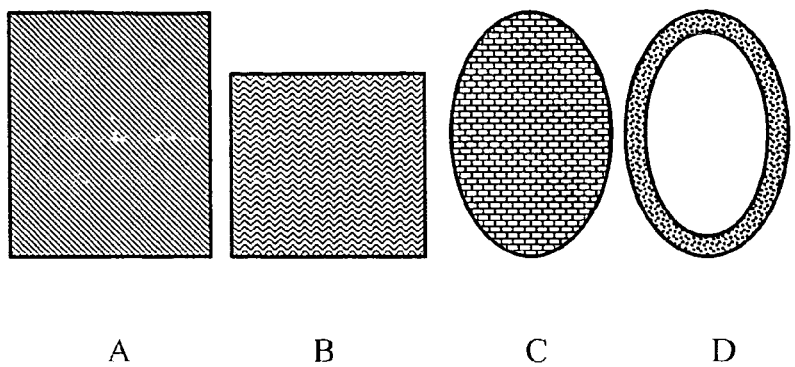
FIGS. 41A-41D illustrate rendering of an expression tree in 3 regions.
Figure 41B:
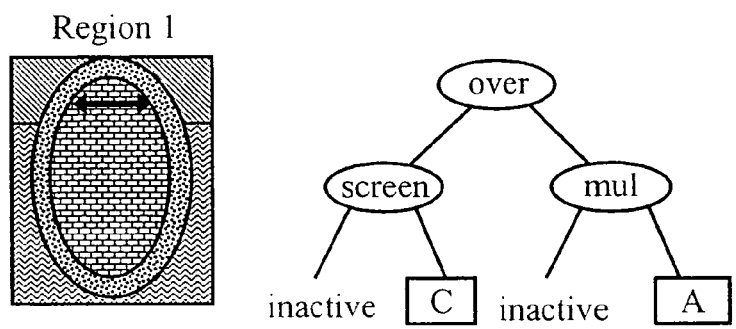
Figure 41C:
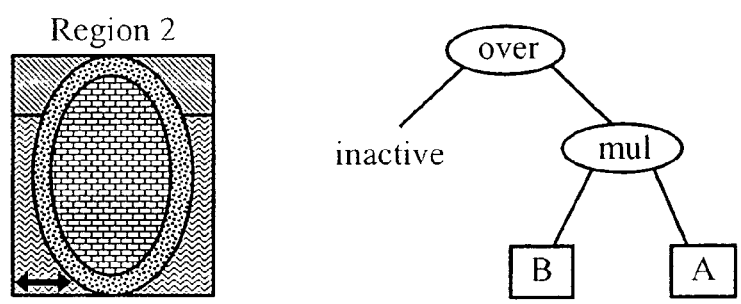
Figure 41D:
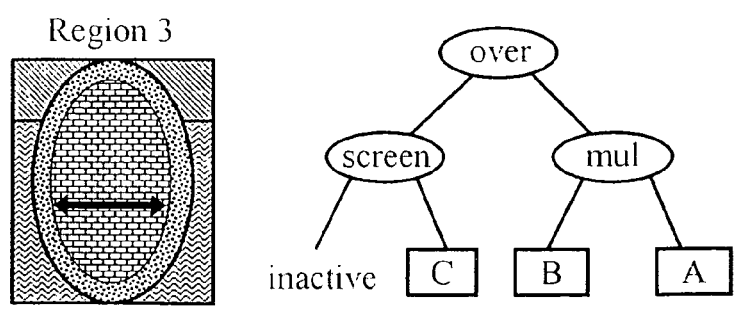

When an operator has an inactive operand, the operator can be removed. Referring again to the example of FIG. 33, the expression tree changes in 3 regions as shown in FIGS. 41A to 41D. FIG. 41A shows the leaf objects and in region 1, indicated in the composited result of FIG. 41B, the operator queue will have entries as in Table 9.1. Because an operator returns the active operand without any operation when one of its operands is inactive, it is possible to reduce the number of operators by removing the operators with one inactive operand. To perform this, the L/R child flag in the Operator Table needs to be passed to the operator queue 1402.

The removal starts from the $1^{st}$ entry and continues to the last in order. First, the Pixel Compositing Module 1400, which performs the removal optimisation, detects L operand of op_queue(0) is inactive. Because op_queue(0) is a R child, the removal process then searches for the next operator with a R operand state of "stack" and replaces that operand state with the state of the active operand of op_queue(0). Op_queue(0) then can be removed (just by marking it invalid). The removal process then continues to op_queue(1) which is removed using the same procedure as op_queue(0). The final operator queue will look like Table 9.2.

Region 3 can be optimised using the same technique as shown in Table 11.1 and Table 11.2 respectively.

In region 2, since op_queue(1) has an inactive operand and a stack operand, and also it is the last operator in the queue, it can be removed. The original queue is shown in Table 10.1 and the optimised op_queue is shown in Table 10.2.

4.13.2 X-Independent Repeat

When all leaf objects are X-independent, it is only necessary to composite the $1^{st}$ pixel and repeat the compositing result for the rest of the region. A repeat command can either be initiated by the Compositing Instruction Generator 1100 or operator optimisation module in the Pixel Compositing Module 1400.

4.13.3 Flat Color Bypass

When flat colors are used in a region, the operand queue can become much more complicated than is necessary. Flat colors can be separated from the operand queue using a dedicated flat color array 1310, seen in FIG. 37, and the operand queue 1300 then can be reserved for non-flat colors only. Thus the operand can be provided with some extra states such as F1, F2, F3 etc as illustrated. When the Compositing Instruction Generator 1100 generates a compositing instruction, it checks the X-independent flag of the operand and dispatches the operand to the flat color array 1310 or operand queue 1300 accordingly.

Figure 42:
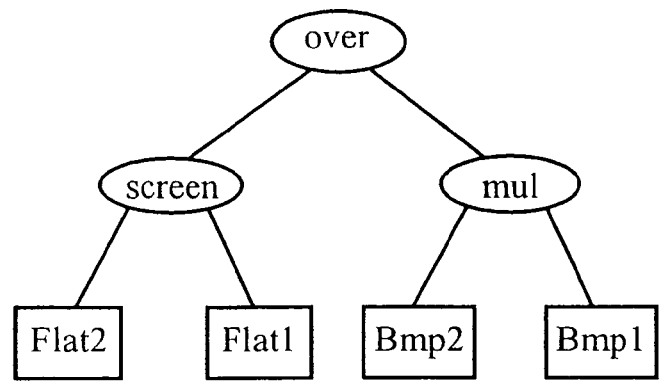
FIG. 42 shows an expression tree illustrating compositing with flat colors.

When compositing flat colors over a region, the operation should only need to be done once. Consider the expression tree in FIG. 42. In FIG. 42, the Screen operator has 2 flat color operands F1 and F2, and this operation should only be done for the first pixel in a region as the result be used for the consecutive pixels. The operator queue 1402 is shown in Table 12 when all objects are active. When a Screen operation is done for the $1^{st}$ pixel in a region, the result is written back to the flat color array 1310 at location F3. The L operand of the operator (over), to which the result of Screen is used, is changed to F3. The op-queue entry 1 needs to be marked invalid and is then bypassed for the consecutive pixels. Compositing will save a clock cycle from the $2^{nd}$ pixel on. Table 13 shows the updated operator queue after compositing the first pixel.

Figure 44:
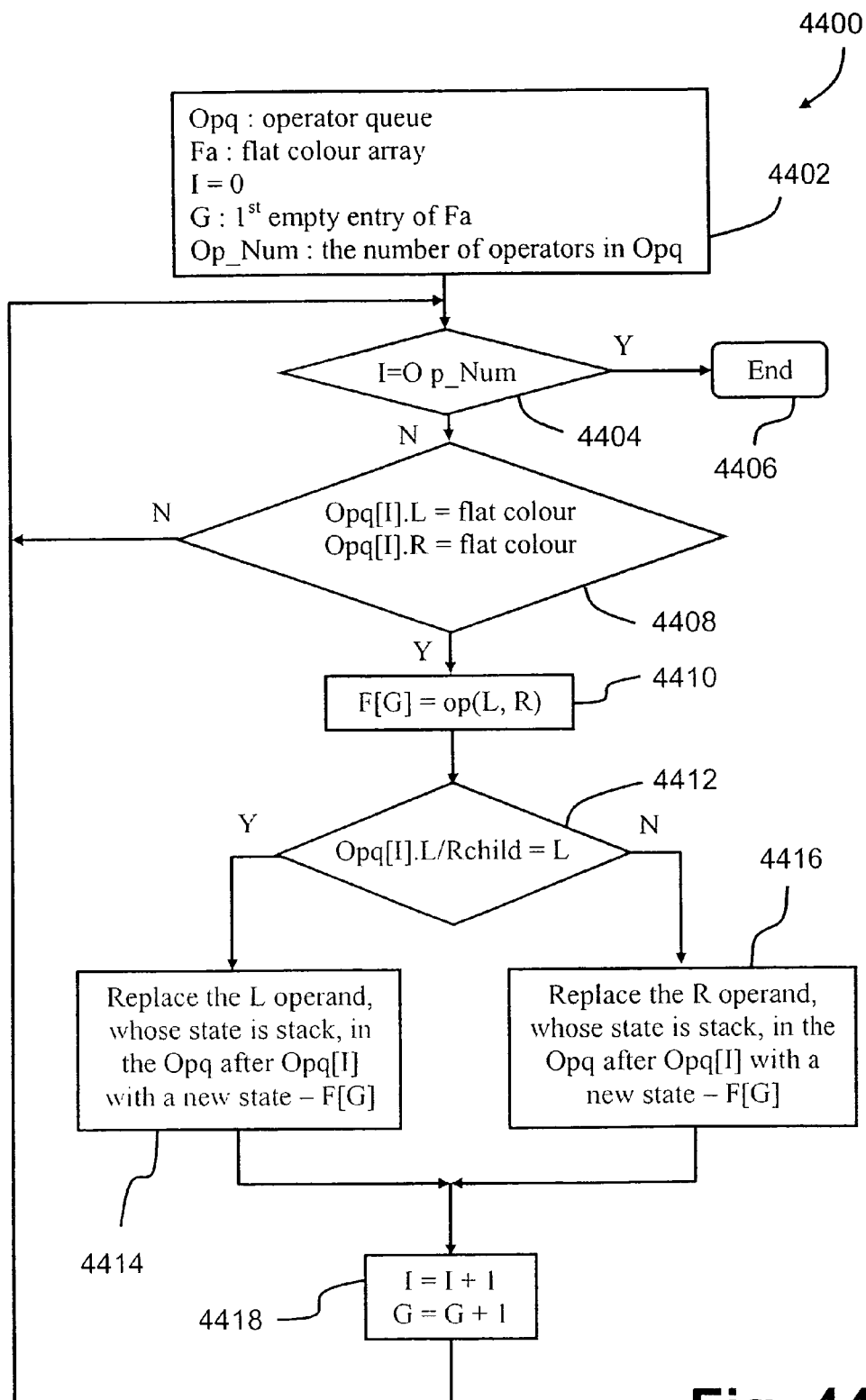
FIG. 44 is a flow chart depicting a processing of Flat color bypass.

FIG. 44 shows the procedure 4400 for flat color bypass in compositing the $1^{st}$ pixel in the region. The procedure 4400 commences with an initialization step 4402 where G, which represents the index of the first empty entry of Flat Array is read in from the Compositing Instruction Generator 100. The variable Opq denotes the operator queue (1402), whilst the variable Fa denotes flat color array (1310). Op_Num denotes the number of operators in the operator queue (1402). The variable I is used to index the operator queue (1402) and is set to zero initially. Initially in step 4404, the counter I is compared with Op_Num and if these are equal, the procedure 4400 ends at step 4406. Otherwise, whilst there remain entries in the operator queue 1402, step 4408 checks if both the left and right operands of operator in Opq[I] are flat color. In step 4410, the compositing operation is performed and the resulting flat color is stored in the entry F[G] of flat color array 1310. Step 4412 then checks if the operator in Opq[I] is a left child of the next operator in the operator queue. When the L/Rchild field of the operator equals L, it is a left child of the next operator in the operator queue. When the operator is a left child, it will search the operator in the operator queue after Opq[I] and replace the first operator whose L operand has a state of stack with the state of F[G]. When the operator is a right child, it will search the operator in the operator queue after Opq[I] and replace the first operator whose R operand has a state of stack with the state of F[G]. Step 4418 then updates the counter I and index G and control returns to step 4404.

4.13.4 Operand Comparison

Figure 43:
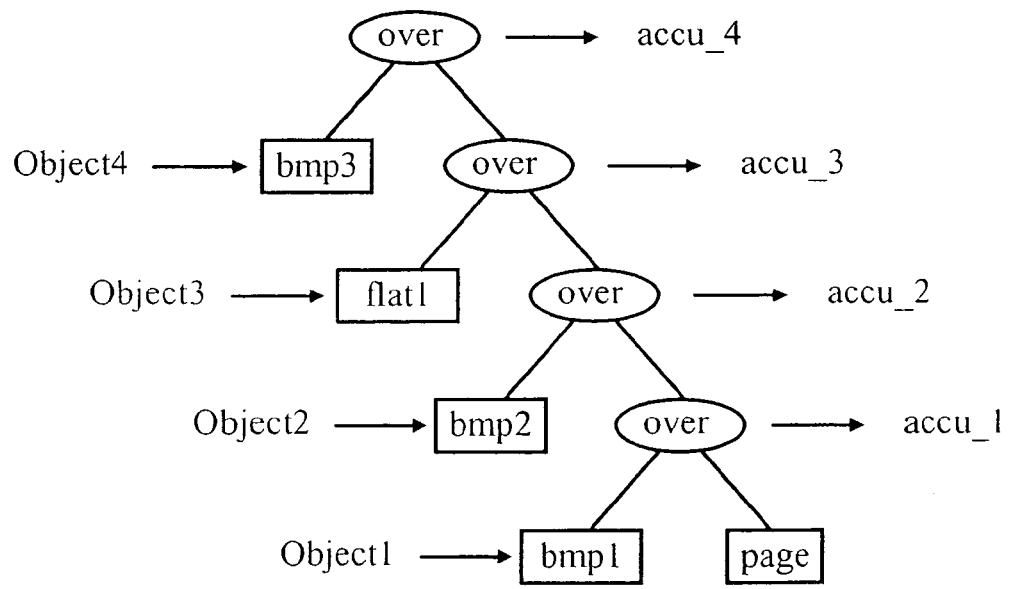
FIG. 43 shows an expression tree rendered using Painter's algorithm.

The Pixel Compositing Module 1400 can skip some operations if the operands for the current pixel are all or partially the same as the previous pixel. This will be the most efficient optimisation when the expression tree uses Painter's algorithm (ie. every operation is OVER) as shown in FIG. 43. In FIG. 43, bmp1 is the bottom layer and cannot benefit from flat color bypass optimisation There is normally significant duplication between neighbouring pixels when a bitmap is rendered in high resolution. In this example, there are 4 operations in a pixel. Some compositing steps can be skipped if all or some of the current input fill data is the same as the input fill data of the previous pixel.

A fill compositing is performed on the $1^{st}$ pixel. Suppose there are 4 accumulative registers, such as in the temporary storage 1422, one used after compositing a new object—accu_1, accu_2, accu_3, accu_4. From the $2^{nd}$ pixel on, compositing will be optimised in the following steps, which are illustrated collectively in FIG. 43.

(i) If the fill data for each object is the same as previous pixel, no compositing is required. Output accu_4.

(ii) Else, if the fill data from object1 to object3 is the same as previous pixel, composite accu_3 with the current fill data in object4 and store the result to accu_4. Output accu_4.

(iii) Else, if the fill data from object1 to object2 is the same as previous pixel, composite accu_2 with the current fill data in object3 and store the result to accu_3. Then composite accu_3 with fill data in object4 and store the result to accu_4. Output accu_4.

(iv) Else if the fill data in object1 is the same as previous pixel, composite accu_1 with the current fill data in object2 and store the result to accu_2. Then composite accu_2 with fill data in object3 and store the result to accu_3. Then composite accu_3 with fill data in object4 and store the result to accu_4. Output accu_4.

(v) Otherwise do a full compositing and store each intermediate result to accu_1, accu_2, accu_3 and accu_4.

(vi) Store the current fill data for each object.

5.0 Conclusion

It should be apparent to the person skilled in the art that any of these modules may be used in a software implementation of a pixel-sequential renderer, without departing from the principles of this invention.

The aforementioned processes implemented by the computer system 1 comprise a particular control flow. There are many other variants of the preferred processes, which use different control flows without departing from the spirit or scope of the invention. Furthermore one or more of the steps of the described method(s) may be performed in parallel rather than sequentially.

INDUSTRIAL APPLICABILITY

It is apparent from the above that the arrangements described are applicable to computer graphics and printing industries.

The foregoing describes only some arrangements of the present invention, and modifications and/or changes can be made thereto without departing from the scope and spirit of the invention, the arrangements being illustrative and not restrictive.

TABLE 1

| | Operator activation groups | |
|---|---|---|
| Operator | Group | Operator activation condition |
| All operators | Raster, arithmetic, PDF | Either L: active or |
| XOR, OVER, ROVER | Porter &Duff | R: active or both |
| IN, RIN | Porter &Duff | Only if L: active &R: active |
| OUT, RATOP | Porter &Duff | Only if L: active |
| ROUT, ATOP | Porter &Duff | Only if R: active |

TABLE 2

Compositing Primitives

| Primitives | Operators | Operands | Clippers |
|---|---|---|---|
| Activated by | Active operand and valid activation condition | Edge tracking and Clippers | Edge tracking and Fill_rule |
| Function | Define the operation to be performed on graphic objects | Graphic objects | Affect the activation of graphic objects |
| Associated with edges | No | Yes | Yes |
| Sub-types | | Flat<br>Bitmap<br>Linear Ramp | Clip_in<br>Clip_out |
| Fields required | Op_code<br>Attribute_from(L, R or ROP)<br>Parent(Operator_level_number)<br>L/R operand<br>Break_point | Fill_type<br>Clip_count<br>Level_need_below<br>X_independent<br>Fill_rule<br>Attribute<br>Fill_index<br>Parent(Operator_level_number)<br>L/R operand | Operand_level_number/<br>Operand_level_list<br>Clip_in/Clip_out<br>Fill_rule |
| Record kept in | Priority Determination Module 1000 | Priority Determination Module 1000 | Edge Processing Module 400 |

TABLE 3

Operator activation look-up-table

| Operator Group | Operator | Active Region | $L \cap \bar{R}$ | $\bar{L} \cap R$ |
|---|---|---|---|---|
| Porter& Duff | L over R | $L \cup R$ | 1 | 1 |
| | L rover R | $L \cup R$ | 1 | 1 |
| | L in R | $L \cap R$ | 0 | 0 |
| | L rin R | $L \cap R$ | 0 | 0 |
| | L out R | L | 1 | 0 |
| | L rout R | R | 0 | 1 |
| | L atop R | R | 0 | 1 |
| | L ratop R | L | 1 | 0 |
| | L xor D | $L \cup R$ | 1 | 1 |
| Raster | black | L | 1 | 0 |
| | white | | | |
| | Return_L(copypen) | | | |
| | Return_nL(notcopypen) | | | |
| | Return_R(nop) | R | 0 | 1 |
| | Return_nR(not) | | | |
| | Maskpen | $L \cup R$ | 1 | 1 |
| | Maskpennot | | | |
| | Masknotpen | | | |
| | Xorpen | | | |
| | Mergepen | | | |
| | Notmergepen | | | |
| | Notxorpen | | | |
| | Mergepennot | | | |
| | Mergenotpen | | | |
| | Notmaskpen | | | |

TABLE 3-continued

Operator activation look-up-table

| Operator Group | Operator | Active Region | $L \cap \bar{R}$ | $\bar{L} \cap R$ |
|---|---|---|---|---|
| Arithmetic | Min | $L \cup R$ | 1 | 1 |
| | Max | | | |
| | Plus | | | |
| | L_minus_R(src_minus_dest) | | | |
| | Plus_uncorrelated | | | |
| | Thresh_L_R(thresh_src_dest) | | | |
| | Difference | | | |
| Image Processing | Luminance<br>Ckey | $L \cap R$ | 0 | 0 |
| PDF | Normal | $L \cup R$ | 1 | 1 |
| | Multiply | | | |
| | Screen | | | |
| | Overlay | | | |
| | Darken | | | |
| | Lighten | | | |
| | ColorDoge | | | |
| | ColorBurn | | | |
| | HardLight | | | |
| | SoftLight | | | |
| | Difference | | | |
| | Exclusion | | | |

*White and black actually don't need data from the L operand. However we need a dummy L operand to define the boundary in which we want the operation to be applied.

TABLE 4

Alpha flags and trans-coded op code look-up-table for compositing

| Operator | Active Region | L_ROP_R | L_OUT_R | R_OUT_L | Trans-coded op |
|---|---|---|---|---|---|
| L over R | $L \cap R$ | 1 | 1 | 1 | Return_L |
| | $L \cap \bar{R}$ | 1 | 1 | 0 | Return_L |
| | $\bar{L} \cap R$ | 1 | 0 | 1 | Return_R |
| L rover R | $L \cap R$ | 1 | 1 | 1 | Return_R |
| | $L \cap \bar{R}$ | 1 | 1 | 0 | Return_L |
| | $\bar{L} \cap \bar{R}$ | 1 | 0 | 1 | Return_R |
| L in R | $L \cap R$ | 1 | 0 | 0 | Return_L |

TABLE 4-continued

Alpha flags and trans-coded op code look-up-table for compositing

| Operator | Active Region | L_ROP_R | L_OUT_R | R_OUT_L | Trans-coded op |
|---|---|---|---|---|---|
| L rin R | L ∩ R | 1 | 0 | 0 | Return_R |
| L out R | L ∩ R | 0 | 1 | 0 | X |
|  | L ∩ R̄ | 1 | 1 | 0 | Return_L |
| L rout R | L ∩ R | 0 | 0 | 1 | X |
|  | L̄ ∩ R | 1 | 0 | 1 | Return_R |
| L atop R | L ∩ R | 1 | 0 | 1 | Return_L |
|  | L̄ ∩ R | 1 | 0 | 1 | Return_R |
| L ratop R | L ∩ R | 1 | 1 | 0 | Return_R |
|  | L ∩ R̄ | 1 | 1 | 0 | Return_L |
| L xor R | L ∩ R | 0 | 1 | 1 | X |
|  | L ∩ R̄ | 1 | 1 | 0 | Return_L |
|  | L̄ ∩ R | 1 | 0 | 1 | Return_R |
| Raster | L ∩ R | 1 | 1 | 1 | Raster |
|  | L ∩ R̄ | 1 | 1 | 0 | Return_L |
|  | L̄ ∩ R | 1 | 0 | 1 | Return_R |
| Arithmetic | L ∩ R | 1 | 1 | 1 | Arithmetic |
|  | L ∩ R̄ | 1 | 1 | 0 | Return_L |
|  | L̄ ∩ R | 1 | 0 | 1 | Return_R |
| PDF | L ∩ R | 1 | 1 | 1 | PDF |
|  | L ∩ R̄ | 1 | 1 | 0 | Return_L |
|  | L̄ ∩ R | 1 | 0 | 1 | Return_R |

TABLE 5

Operator Table Cache - initial state of example 1

| operator_level_number | break_point | active | Lchild* | L_is_leaf | Rchild* | R_is_leaf | Op-code | Lactive | Ractive | parent | L/R |
|---|---|---|---|---|---|---|---|---|---|---|---|
| 9 | 0 | 1 |  |  |  |  | over | 0 | 1 | — |  |
| 8 | 0 | 0 |  |  |  |  | Op8 | 0 | 0 | 9 | L |
| 7 | 0 | 0 |  |  |  |  | Op7 | 0 | 0 | 8 | L |
| 6 | 0 | 0 |  |  |  |  | Op6 | 0 | 0 | 7 | L |
| 5 | 0 | 0 |  |  |  |  | Op5 | 0 | 0 | 6 | L |
| 4 | 0 | 0 |  |  |  |  | Op4 | 0 | 0 | 5 | R |
| 3 | 1 | 0 |  |  |  |  | Op3 | 0 | 0 | 8 | R |
| 2 | 0 | 0 |  |  |  |  | Op2 | 0 | 0 | 3 | L |
| 1 | 0 | 0 |  |  |  |  | Op1 | 0 | 0 | 3 | R |

*Lchild and Rchild is the operand's entry number in the Operand table cache. They are initialised when Lactive or Ractive become true.

TABLE 6

Operand Table cache - initial state of Example 1

| Operand_level_number | Fill_index | Fill_type | Parent | L/R | active | All other fields |
|---|---|---|---|---|---|---|
| 9 |  |  | 7 | R | 0 |  |
| 8 |  |  | 6 | R | 0 |  |
| 7 |  |  | 5 | L | 0 |  |
| 6 |  |  | 4 | L | 0 |  |
| 5 |  |  | 4 | R | 0 |  |
| 4 |  |  | 2 | L | 0 |  |
| 3 |  |  | 2 | R | 0 |  |
| 2 |  |  | 1 | L | 0 |  |
| 1 |  |  | 1 | R | 0 |  |

TABLE 7.1

Operand Table after LOAD OPERAND command

| Operand_level_number | Fill_index | Fill_type | Parent | L/R | active | All other fields |
|---|---|---|---|---|---|---|
| 4 | D | Flat | 2 | L | 0 | |
| 3 | C | Bitmap | 2 | R | 0 | |
| 2 | B | Linear_ramp | 1 | L | 0 | |
| 1 | A | Bitmap | 1 | R | 0 | |

TABLE 7.2

Operator Table after LOAD OPERATOR command

| operator_level_number | break_point | active | Lchild | L_is_leaf | Rchild | R_is_leaf | Op-code | Lactive | Ractive | parent | L/R |
|---|---|---|---|---|---|---|---|---|---|---|---|
| 3 | 0 | 0 | — | — | — | — | over | 0 | 0 | — | |
| 2 | 0 | 0 | — | — | — | — | screen | 0 | 0 | 3 | L |
| 1 | 0 | 0 | — | — | — | — | mul | 0 | 0 | 3 | R |

TABLE 8.1

Operand Table when all leaves are active

| Operand_level_number | Fill_index | Fill_type | Parent | L/R | active | All other fields |
|---|---|---|---|---|---|---|
| 4 | D | Flat | 2 | L | 1 | |
| 3 | C | bitmap | 2 | R | 1 | |
| 2 | B | Linear_ramp | 1 | L | 1 | |
| 1 | A | bitmap | 1 | R | 1 | |

TABLE 8.2

Operator Table when all 3 operators are active

| operator_level_number | break_point | active | Lchild | L_is_leaf | Rchild | R_is_leaf | Op-code | Lactive | Ractive | parent | L/R |
|---|---|---|---|---|---|---|---|---|---|---|---|
| 3 | 0 | 1 | — | 0 | — | 0 | over | 1 | 1 | — | |
| 2 | 0 | 1 | 4 | 1 | 3 | 1 | screen | 1 | 1 | 3 | L |
| 1 | 0 | 1 | 2 | 1 | 1 | 1 | mul | 1 | 1 | 3 | R |

TABLE 9.1

Initial operator queue in region 1

| Op-queue entry | L/R child | Op-code | L operand | R operand |
|---|---|---|---|---|
| 2 | — | Over | Stack | Stack |
| 1 | L | Screen | Inactive | Q2 |
| 0 | R | Mul | Inactive | Q1 |

TABLE 10.1

Initial operator queue in region 2

| Op-queue entry | L/R child | Op-code | L operand | R operand |
|---|---|---|---|---|
| 1 | — | Over | Inactive | Stack |
| 0 | R | Mul | Q2 | Q1 |

TABLE 9.2

Optimised operator queue in region 1

| Op-queue entry | Op-code | L operand | R operand |
|---|---|---|---|
| 2 | Over | Q2 | Q1 |

TABLE 10.2

Optimised operator queue in region 2

| Op-queue entry | Op-code | L operand | R operand |
|---|---|---|---|
| 0 | Mul | Q2 | Q1 |

TABLE 11.1

Initial operator queue in region 3

| Op-queue entry | L/R child | Op-code | L operand | R operand |
|---|---|---|---|---|
| 2 | — | Over | Stack | Stack |
| 1 | L | Screen | Inactive | Q3 |
| 0 | R | Mul | Q2 | Q1 |

TABLE 11.2

Optimised operator queue in region 3

| Op-queue entry | Op-code | L operand | R operand |
|---|---|---|---|
| 2 | Over | Q3 | Stack |
| 0 | Mul | Q2 | Q1 |

TABLE 12

Initial operator queue for FIG. 42

| Op-queue entry | L/R child | Op-code | L operand | R operand |
|---|---|---|---|---|
| 2 | — | Over | Stack | Stack |
| 1 | L | Screen | F2 | F1 |
| 0 | R | Mul | Q2 | Q1 |

TABLE 13

Updated operator queue after compositing the 1$^{st}$ pixel

| Entry valid | Op-queue entry | L/R child | Op-code | L operand | R operand |
|---|---|---|---|---|---|
| 1 | 2 | — | Over | F3 | Stack |
| 0 | 1 | L | Screen | F2 | F1 |
| 1 | 0 | R | Mul | Q2 | Q1 |

I claim:

1. A method of rendering a graphical image described by an expression tree in scan line raster order, said expression tree comprising one or more parent nodes and one or more leaf nodes, each said parent node representing a graphical operator and each said leaf node representing a graphic object, said method comprising the steps of:

(a) for each scan line, detecting one or more leaf nodes which intersect with a current scan line, updating an activity state of said leaf nodes stored in an operand table, and determining spans of one or more pixel locations each said span being contributed to by a unique combination of one or more said graphical objects;

(b) determining, for each said span, the activity state in the updated operand table and a predefined function for each corresponding said operator;

(c) generating for each active one of said operators, optimized compositing instructions and pixel generation instructions for a plurality of graphic objects that contribute to said span, said optimized compositing instructions being stored in an operator queue;

(d) concurrently generating pixel colors for the plurality of graphic objects that contribute to said span, said pixel colors being buffered in an operand queue; and (e) compositing the generated pixel colors from the operand queue, for each pixel in said span, using the operators defined in the operator queue to output a composited pixel value for each pixel in said span, wherein said steps (a), (b), (c), (d) and (e) are performed by a computer processor.

2. A method as claimed in claim 1, wherein an activity state of said parent nodes is stored in an operator table.

3. A method as claimed in claim 2, wherein said instructions are generated during rasterized rendering of said image, and the operand table is updated when a scan line crosses into a region of different ones of said leaf objects.

4. A method as claimed in claim 3, wherein a change of activity state in the operand table updates a corresponding child activity state in the operator table and said predefined function is called to determine if the corresponding operator is activated.

5. A method as claimed in claim 2, wherein said compositing of step (e) is performed using a stack, and generation of said optimized compositing instructions in step (c) comprises the steps of (ca) outputting the number of pixels in said span;

(cb) outputting, for each active operator, an operator with a L and R operand definition;

(cc) determining the state of the R operand using the state of Ractive and R_is_leaf in the operator table and assigning:

(i) inactive to the R operand state if Ractive is not set;

(ii) the stack to the R operand state if R_is_leaf is not set; or otherwise (iii) a queue to the R operand state; and (cd) determining the state of L operand using the state of Lactive and L_is_leaf in the operator table and assigning:

(i) inactive to the L operand state if Lactive is not set;

(ii) the stack to the L operand state if L_is_leaf is not set; or otherwise (iii) a queue to the L operand state.

6. A method as claimed in claim 1, wherein said compositing of step (e) is performed using a stack, and generation of said pixel generation instructions in step (c) comprises the steps of:

(ce) outputting the number of pixels in said span;

(cf) dispatching, for each active operator, the active R operand to a queue with a fill index and fill type; and (cg) dispatching, for each active operator, the active L operand to a queue with a fill index and fill type.

7. A method as claimed in claim 1 wherein step (e) comprises transcoding said operators and corresponding alpha flags depending on the activity state of the corresponding operand using a preloaded look-up table.

8. A method as claimed in claim 1 wherein step (d) comprises continuously generating pixels of each fill type required for said span after receiving the pixel generation instructions.

9. A method as claimed in claim 1 wherein step (a) comprises collapsing said expression tree to reduce complexity when at least one of the leaf nodes represents a graphic object that is not active.

10. A method as claimed in claim 1 wherein step (e) comprises noting operators associated with a rendering of a previous rendered pixel and for an immediately following pixel in said span advancing compositing on along said expression tree to the 1$^{st}$ operator in the operator queue, which has at least one operand value that is different when compared with the same operator in the previous rendered pixel.

11. A method of rendering a graphical image described by an expression tree in scan line raster order, said expression tree comprising one or more parent nodes and one or more leaf nodes, each said parent node representing a graphical operator and having branches to respective descendent nodes, and each said leaf node representing a graphic object, said method comprising the steps of:

(a) for each scan line, detecting one or more leaf nodes which intersect with a current scan line, updating an activity state of said leaf nodes stored in an operand table, and determining spans of one or more pixel locations in said image, each said span being contributed to by a unique combination of one or more said graphical objects, said determining comprising, when at least one of the leaf nodes represents a graphic object that is not active, collapsing said expression tree to reduce complexity;

(b) determining, for each said span, the activity state in the updated operand table and a predefined function for each corresponding said operator;

(c) generating for each active one of said operators optimized compositing instructions and pixel generation instructions for a plurality of graphic objects that contribute to said span, said optimized compositing instructions being stored in an operator queue;

(d) concurrently generating pixel colors for the plurality of graphic objects that contribute to said span, said pixel colors being buffered in an operand queue; and (e) compositing the generated pixel colors from the operand queue, for each pixel in a span, using the optimized compositing instructions to output a composited pixel value for each pixel in said span, wherein said steps (a), (b), (c), (d) and (e) are performed by a computer processor.

12. A method of rendering a graphical image described by an expression tree in scan line raster order, said expression tree comprising one or more parent nodes and one or more leaf nodes, each said parent node representing a graphical operator and having branches to respective descendent nodes, and each said leaf node representing a graphic object, said method comprising the steps of:

(a) for each scan line, detecting one or more leaf nodes which intersect with a current scan line, updating an activity state of said leaf nodes stored in an operand table, and determining spans of one or more pixel locations in said image, each said span being contributed to by a unique combination of one or more said graphical objects, said determining comprising, removing from said expression tree an operator with two flat-colored operands and substituting therefore a corresponding new leaf object;

(b) determining, for each said span, the activity state in the updated operand table and a predefined function for each corresponding said operator;

(c) generating, for each said operator, optimized compositing instructions and pixel generation instructions for a plurality of graphic objects that contribute to said span, said optimized compositing instructions being stored in an operator queue;

(d) concurrently generating pixel colors for the plurality of graphic objects that contribute to said span, said pixel colors being buffered in an operand queue; and (e) compositing the generated pixel colors from the operand queue, for each pixel in a span, using the optimized compositing instructions to output a composited pixel value for each pixel in said span, wherein said steps (a), (b), (c), (d) and (e) are performed by a computer processor.

13. A method of rendering a graphical image described by an expression tree in scan line raster order, said expression tree comprising one or more parent nodes and one or more leaf nodes, each said parent node representing a graphical operator and having branches to respective descendent nodes, and each said leaf node representing a graphic object, said method comprising the steps of:

(a) for each scan line, detecting one or more leaf nodes which intersect with a current scan line, updating an activity state of said leaf nodes stored in an operand table, and determining spans of one or more pixel locations in said image, each said span being contributed to by a unique combination of one or more said graphical objects;

(b) determining, for each said span, the activity state in the updated operand table and a predefined function for each corresponding said operator;

(c) generating, for each active one of said operators, optimized compositing instructions and pixel generation instructions for a plurality of graphic objects that contribute to said span, said optimized compositing instructions being stored in an operator queue;

(d) concurrently generating pixel colors for the plurality of graphic objects that contribute to said span, said pixel colors being buffered in an operand queue; and (e) compositing the generated pixel colors, for each pixel in a span, using the optimized compositing instructions to output a composited pixel value for each pixel in said span, said compositing comprising noting operators associated with a rendering of a previous rendered pixel and for an immediately following pixel in said span advancing compositing on along said expression tree to the $1^{st}$ operator in the operator queue, which has at least one operand value that is different when compared with the same operator in the previous rendered pixel, wherein said steps (a), (b), (c), (d) and (e) are performed by a computer processor.

14. Apparatus for rendering a graphical image described by an expression tree in raster scan order, said expression tree comprising one or more parent nodes and one or more leaf nodes, each said parent node representing a graphical operator and each said leaf node representing a graphic object, said apparatus comprising:

a priority determination module configured to, for each scan line, detect one or more leaf nodes which intersect with a current scan line, update an activity state of said leaf nodes stored in an operand table using a predefined function for each corresponding said operator, and determine spans of one or more pixel locations, each said span being contributed to by a unique combination of one or more of said graphical objects;

a compositing instruction generator configured to generate, for each active one of said operators, optimized compositing instructions and pixel generation instructions for a plurality of graphic objects that contribute to said span, said optimized compositing instructions being stored in an operator queue;

a pixel generation module configured to receive said pixel generation instructions and to concurrently generate pixel colors for the plurality of graphic objects that contribute to said span;

an operand queue arranged to buffer pixel color values output from said pixel generation module; and a pixel compositing module configured to composite the generated pixel colors from said operand queue for each pixel in said span using the operators defined in the operand queue, to output a composited pixel value for each pixel in said span, wherein said priority determination module, said compositing instruction generator, said pixel generation module, said operand queue, and said pixel compositing module are controlled by a computer processor.

15. Apparatus as claimed in claim 14, further comprising an operator table for storing an activity state of said parent nodes.

16. Apparatus as claimed in claim 15, wherein said instructions are generated during rasterized rendering of said image and the operand table is updated when a scan line crosses into a region of different ones of said leaf objects.

17. Apparatus as claimed in claim 16, wherein a change of activity state in the operand table updates a corresponding child activity state in the operator table and said priority determination module implements said predefined function to determine if the corresponding operator is activated.

18. Apparatus as claimed in claim 15, wherein said pixel compositing module operates using a stack, and generation of said optimized compositing instructions comprises:
   (a) outputting the number of pixels in said span;
   (b) outputting for each active operator, an operator with a L and R operand definition;
   (c) determining the state of the R operand using the state of Ractive and R_is_leaf in the operator table and assigning:
      (i) inactive to the R operand state if Ractive is not set;
      (ii) the stack to the R operand state if R_is_leaf is not set; or otherwise
      (iii) a queue to the R operand state; and
   (d) determining the state of L operand using the state of Lactive and L_is_leaf in the operator table and assigning:
      (i) inactive to the L operand state if Lactive is not set;
      (ii) the stack to the L operand state if L_is_leaf is not set; or otherwise
      (iii) a queue to the L operand state.

19. Apparatus as claimed in claim 14, wherein said pixel compositing module operates using a stack, and generation of said pixel generation instructions comprises the steps of
   (e) outputting the number of pixels in said span;
   (f) dispatching, for each active operator, the active R operand to a queue with a fill index and fill types; and
   (g) dispatching, for each active operator, the active L operand to a queue with a fill index and fill type.

20. Apparatus as claimed in claim 14 wherein said pixel compositing module transcodes said operators and corresponding alpha flags depending on the activity state of the corresponding operand using a preloaded look-up table.

21. Apparatus as claimed in claim 14, wherein said pixel generation module continuously generates pixels of each fill type required for said span after receiving the pixel generation instructions.

22. Apparatus as claimed in claim 14 wherein said compositing instruction generator collapses said expression tree when at least one of the leaf nodes represents a graphic object that is not active, thereby reducing complexity of the expression tree.

23. Apparatus as claimed in claim 14 wherein the pixel compositing module identifies operators associated with a rendering of a previous rendered pixel and for an immediately following pixel in said span advancing compositing on along said expression tree to the $1^{st}$ operator in the operator queue, which has at least one operand value that is different when compared with the same operator in the previous rendered pixel.

24. A computer readable storage medium, having a program recorded thereon, where the program is configured to make a computer execute a procedure to render a graphical image described by an expression tree in raster scan line order, said expression tree comprising one or more parent nodes and one or more leaf nodes, each said parent node representing a graphical operator and each said leaf node representing a graphic object, said program comprising:
   code, operative for each scan line, for detecting one or more leaf nodes which intersect with a current scan line, updating an activity state of said leaf nodes stored in an operand table, and first determining spans of one or more pixel locations, each said span being contributed to by a unique combination of one or more said graphical objects;
   code for secondly determining, for each said span, the activity state in the updated operand table and a predefined function for each corresponding said operator;
   code for generating for each active one of said operators, optimized compositing instructions and pixel generation instructions for a plurality of graphic objects that contribute to said span, said optimized compositing instructions being stored in an operator queue;
   code for concurrently generating pixel colors for the plurality of graphic objects that contribute to said span, said pixel colors being buffered in an operand queue; and
   code for compositing the generated pixel colors from the operand queue, for each pixel in said span, using the operators defined in the operator queue to output a composited pixel value for each pixel in said span.

25. A computer readable storage medium as claimed in claim 24, wherein an activity state of said parent nodes is stored in an operator table, said instructions are generated during rasterized rendering of said image and the operand table is updated when a scan line crosses into a region of different ones of said leaf objects, and a change of activity state in the operand table updates a corresponding child activity state in the operator table and said predefined function is called to determine if the corresponding operator is activated.

26. A computer readable storage medium as claimed in claim 25, wherein said compositing is performed using a stack, and said code for generation of said optimized compositing instructions comprises:
   code for outputting the number of pixels in said span;
   code for outputting, for each active operator, an operator with a L and R operand definition;
   code for determining the state of the R operand using the state of Ractive and R_is_leaf in the operator table and assigning:
      (i) inactive to the R operand state if Ractive is not set;
      (ii) the stack to the R operand state if R_is_leaf is not set; or otherwise
      (iii) a queue to the R operand state; and
   code for determining the state of L operand using the state of Lactive and L_is_leaf in the operator table and assigning:
      (i) inactive to the L operand state if Lactive is not set;
      (ii) the stack to the L operand state if L_is_leaf is not set; or otherwise
      (iii) a queue to the L operand state.

27. A computer readable storage medium as claimed in claim 24, wherein said compositing is performed using a stack, and said code for generation of said pixel generation instructions comprises:
   code for outputting the number of pixels in said span;
   code for dispatching, for each active operator, the active R operand to queue with a fill index and fill type; and
   code for dispatching, for each active operator, the active L operand to a queue with a fill index and fill type.

28. A computer readable storage medium according to claim 24 wherein:
- (i) said code for compositing comprises code for transcoding said operators and corresponding alpha flags depending on the activity state of the corresponding operand using a preloaded look-up table;
- (ii) said code for generating comprises code for continuously generating pixels of each fill type required for said span after receiving the pixel generation instructions; and
- (iii) said code for first determining comprises code for collapsing said expression tree to reduce complexity when at least one of the leaf nodes represents a graphic object that is not active.

29. A computer readable storage medium according to claim 24 wherein said code for compositing further comprises code for noting operators associated with a rendering of a previous rendered pixel and for an immediately following pixel in said span advancing compositing on along said expression tree to the $1^{st}$ operator in the operator queue, which has at least one operand value that is different when compared with the same operator in the previous rendered pixel.

30. A computer readable storage medium, having a program recorded thereon, where the program is configured to make a computer execute a procedure to render a graphical image described by an expression tree in scan line raster order, said expression tree comprising one or more parent nodes and one or more leaf nodes, each said parent node representing a graphical operator and having branches to respective descendent nodes, and each said leaf node representing a graphic object, said program comprising:
- code, operative for each scan line, for detecting one or more leaf nodes which intersect with a current scan line, updating an activity state of said leaf nodes stored in an operand table, and determining spans of one or more pixel locations in said image, each said span being contributed to by a unique combination of one or more said graphical objects, said determining comprising, when at least one of the leaf nodes represents a graphic object that is not active, collapsing said expression tree to reduce complexity;
- code for determining, for each said span, the activity state in the updated operand table and a predefined function for each corresponding said operator;
- code for generating, for each active one of said operators, optimized compositing instructions and pixel generation instructions for a plurality of graphic objects that contribute to said span, said optimized compositing instructions being stored in an operator queue;
- code for concurrently generating pixel colors for the plurality of graphic objects that contribute to said span, said pixel colors being buffered in an operand queue; and
- code for compositing the generated pixel colors from the operand queue, for each pixel in a span, using the optimized compositing instructions to output a composited pixel value for each pixel in said span.

31. A computer readable storage medium, having a program recorded thereon, where the program is configured to make a computer execute a procedure to render a graphical image described by an expression tree in scan line raster order, said expression tree comprising one or more parent nodes and one or more leaf nodes, each said parent node representing a graphical operator and having branches to respective descendent nodes, and each said leaf node representing a graphic object, said program comprising:
- code, operative for each scan line, for detecting one or more leaf nodes which intersect with a current scan line, updating an activity state of said leaf nodes stored in an operand table, and determining spans of one or more pixel locations in said image, each said span being contributed to by a unique combination of one or more said graphical objects, said determining comprising, removing from said expression tree an operator with two flat-colored operands and substituting therefore a corresponding new leaf object;
- code for determining, for each said span, the activity state in the updated operand table and a predefined function for each corresponding said operator;
- code for generating, for each said operator, optimized compositing instructions and pixel generation instructions for a plurality of graphic objects that contribute to said span, said optimized compositing instructions being stored in an operator queue;
- code for concurrently generating pixel colors for the plurality of graphic objects that contribute to said span, said pixel colors being buffered in an operand queue; and
- code for compositing the generated pixel colors from the operand queue, for each pixel in a span, using the optimized compositing instructions to output a composited pixel value for each pixel in said span.

32. A computer readable storage medium, having a program recorded thereon, where the program is configured to make a computer execute a procedure to render a graphical image described by an expression tree in scan line raster order, said expression tree comprising one or more parent nodes and one or more leaf nodes, each said parent node representing a graphical operator and having branches to respective descendent nodes, and each said leaf node representing a graphic object, said program comprising:
- code, operative for each scan line, for detecting one or more leaf nodes which intersect with a current scan line, updating an activity state of said leaf nodes stored in an operand table, and for determining spans of one or more pixel locations in said image, each said span being contributed to by a unique combination of one or more said graphical objects;
- code for determining, for each said span, the activity state in the updated operand table and a predefined function for each corresponding said operator;
- code for generating, for each active one of said operators, optimized compositing instructions and pixel generation instructions for a plurality of graphic objects that contribute to said span, said optimized compositing instructions being stored in an operator queue;
- code for concurrently generating pixel colors for the plurality of graphic objects that contribute to said span, said pixel colors being buffered in an operand queue; and
- code for compositing the generated pixel colors, for each pixel in a span, using the optimized compositing instructions to output a composed pixel value for each pixel in said span, said compositing comprising noting operators associated with a rendering of a previous rendered pixel and for an immediately following pixel in said span advancing compositing on along said expression tree to the $1^{st}$ operator in the operator queue, which has at least one operand value that is different when compared with the same operator in the previous rendered pixel.

* * * * *